US011213771B2

(12) United States Patent
Hicks et al.

(10) Patent No.: US 11,213,771 B2
(45) Date of Patent: Jan. 4, 2022

(54) ROTARY VACUUM AND SCREEN SYSTEM AND METHODS FOR SEPARATING SOLIDS AND LIQUIDS

(71) Applicants: Andrew Richard Hicks, Canmore (CA); Hugues Wanlin, Canmore (CA)

(72) Inventors: Andrew Richard Hicks, Canmore (CA); Hugues Wanlin, Canmore (CA)

(*) Notice: Subject to any disclaimer, the term of this patent is extended or adjusted under 35 U.S.C. 154(b) by 1031 days.

(21) Appl. No.: 15/148,163

(22) Filed: May 6, 2016

(65) Prior Publication Data

US 2016/0243473 A1   Aug. 25, 2016

Related U.S. Application Data

(63) Continuation of application No. PCT/CA2014/051012, filed on Oct. 20, 2014.

(60) Provisional application No. 61/940,097, filed on Feb. 14, 2014, provisional application No. 61/901,671, filed on Nov. 8, 2013.

(51) Int. Cl.
| | |
|---|---|
| *B01D 33/54* | (2006.01) |
| *B01D 33/11* | (2006.01) |
| *B01D 33/72* | (2006.01) |
| *B01D 33/76* | (2006.01) |
| *B01D 33/17* | (2006.01) |
| *B01D 33/48* | (2006.01) |

(52) U.S. Cl.
CPC ............ *B01D 33/54* (2013.01); *B01D 33/11* (2013.01); *B01D 33/17* (2013.01); *B01D 33/48* (2013.01); *B01D 33/72* (2013.01); *B01D 33/76* (2013.01); *B01D 2201/204* (2013.01)

(58) Field of Classification Search
None
See application file for complete search history.

(56) References Cited

U.S. PATENT DOCUMENTS

| | | | |
|---|---|---|---|
| 828,838 A | 8/1906 | Chambers | |
| 2,525,135 A | 10/1950 | Huff | |
| 2,588,912 A | 3/1952 | Denhard | |
| 2,798,612 A | 7/1957 | Crumb | |
| 3,361,262 A | 1/1968 | Orr et al. | |
| 4,236,999 A | 12/1980 | Burgess et al. | |
| 4,266,413 A * | 5/1981 | Yli-Vakkuri | D21C 9/06 68/158 |

(Continued)

FOREIGN PATENT DOCUMENTS

| | | |
|---|---|---|
| CA | 1320148 | 7/1993 |
| CA | 2109492 | 10/1994 |

(Continued)

OTHER PUBLICATIONS

European Exam Report dated Jun. 9, 2020 for European Application No. EP14860251.9.

(Continued)

*Primary Examiner* — Robert J Popovics
(74) *Attorney, Agent, or Firm* — Whitmyer IP Group LLC

(57) ABSTRACT

The invention describes separation systems and methods for separating solids and liquids from one another. The system includes a rotating screen for supporting a slurry of solids and liquid. A fluid manifold is configured to the lower surface of the screen for applying a downward vacuum force through the screen. A cleaning manifold is configured to the screen for cleaning the screen.

14 Claims, 45 Drawing Sheets

(56) References Cited

U.S. PATENT DOCUMENTS

| | | | |
|---|---|---|---|
| 4,529,509 | A | 7/1985 | Nilsson |
| 4,655,937 | A | 4/1987 | Hendrix |
| 4,692,248 | A | 9/1987 | Stannard et al. |
| 7,807,060 | B2 | 10/2010 | Schmid |
| 2013/0074360 | A1 | 3/2013 | Pomerleau |
| 2013/0240417 | A1 | 9/2013 | Kelly |
| 2016/0243473 | A1* | 8/2016 | Hicks .................. B01D 33/48 |

FOREIGN PATENT DOCUMENTS

| | | |
|---|---|---|
| CA | 2638922 | 3/2009 |
| CA | 2732065 | 8/2011 |
| CA | 2775434 | 11/2012 |
| CA | 2893076 | 5/2015 |
| DE | 3625848 | 2/1988 |
| EP | 1170280 | 1/2002 |
| FR | 1528213 | 6/1968 |
| FR | 2770578 | 5/1999 |
| GB | 1060367 | 3/1967 |
| GB | 1184066 | 3/1970 |
| WO | 2007103068 | 9/2007 |
| WO | 2012030282 | 3/2012 |

OTHER PUBLICATIONS

Office Action issued by Canadian Intellectual Property Office for CA 2,893,076, dated Jun. 19, 2015.

Office Action issued by Canadian Intellectual Property Office for CA 2,893,076, dated Oct. 29, 2015.

Extended European Search Report for EP Application No. 14860251.9, dated May 29, 2017.

Office Action issued by Canadian Intellectual Property Office for CA 2,927,961, dated Oct. 7, 2016.

\* cited by examiner

ROTARY VACUUM AND SCREEN SYSTEM AND METHODS FOR SEPARATING SOLIDS AND LIQUIDS

CROSS REFERENCE TO RELATED APPLICATIONS

This application is a continuation of PCT/CA2014/051012 which claims priority to U.S. provisional patent application 61/901,671 filed on Nov. 8, 2013 and U.S. Provisional Patent Application No. 61/940,097 filed on Feb. 14, 2014, all of which are incorporated herein by reference.

FIELD OF THE INVENTION

The invention describes rotary vacuum and screen systems and methods for separating solids and liquids from one another and in particular drill cuttings from drilling fluid. The systems include a rotating screen that rotates about an axis of rotation. A fluid manifold is configured to a lower surface of the rotating screen for applying a vacuum force through the screen. A waste and/or cleaning manifold is configured to an opposite surface of the screen for removing solid materials and/or to continuously clean the screen during operation.

BACKGROUND OF THE INVENTION

In the drilling industry, there are various systems used to separate drilling fluids from drill cuttings that are recovered from rock formations such as an oil well during drilling.

Shale shakers are the primary solids separation tool on a drilling rig. After returning to the surface of the well, the used drilling fluid which contains drill cuttings is directed to the shale shakers where the mixture of solid cuttings and liquid drilling fluid is processed. A typical shale shaker includes one or more generally horizontal screens supported by a frame that is made to vibrate to encourage the separation of drilling fluid from the drill cuttings. The drilling fluid passes through the screen where it is deposited into mud tanks either for return to the drilling rig for drilling and/or the drilling fluid may be subjected to additional treatment by other solids control equipment to remove finer solids from the recovered drilling fluid. The solids (i.e. drill cuttings) removed by the shale shaker are discharged out of the discharge port from the top of the screen into a separate holding tank where they await further treatment or disposal.

While effective, shale shakers are limited in a number of ways and most particularly with respect to the effectiveness of vibration induced separation. Under the normal action of a shaker, it is difficult to remove drilling fluid below a level of about 15% wt % of drilling fluid on the cuttings. That is, drill cuttings exiting the shaker will typically still retain 15-30 wt % of the total mass of recovered drill cuttings as drilling fluid. This amount of drilling fluid not only represents a significant volume of drilling fluid, it also has considerable value. As a result, it is desirable to minimize the drilling fluid retained on cuttings at the rig. That is, not only is recovery of expensive drilling fluid desirable, drill cuttings containing a substantial proportion of drilling fluid will require additional remediation (and costs) to be incurred prior to final disposal. Moreover, drilling fluid that is recovered from drill cuttings can be returned to the well and can otherwise reduce the overall costs of the drilling fluid program if additional fluid does not have to be purchased. With costs running in the range of $1000/m^3$, recovery of an additional drilling fluid can have significant cost benefits to an operator.

In addition, the high forces imparted on the drill cuttings by the rapid reciprocating motion of a typical screen bed impart high impact forces to the cuttings whilst they are on the shaker bed. High impact forces can cause a degradation of the drill cuttings that will create finer particles that, depending on their size, will pass through the processing screens with the recovered drilling fluid. This creation of finely dispersed particles within the recovered drilling fluid can have various adverse affects including increasing the density of the drilling fluid as well as adversely affecting the rheological properties of the drilling fluid. If the drilling fluid becomes badly degraded, this then requires additional solids control processing to remove the fine particles from the drilling fluid which again adds to the costs of a drilling program.

In the past, vacuum systems have been applied to shale shakers to provide an additional separation force to the drill cuttings on a shaker bed that has led to improvements in the amount of drilling fluid removed from the drill cuttings as well as improving the quality of the recovered drilling fluid. That is, the application of a vacuum force can be effectively used to remove more drilling fluid and allow the use of finer screens that reduces the amount of fines in the recovered fluid.

However, there continues to be a need for improved separation equipment and particularly equipment that does not subject the cuttings to the high impact forces of a vibrating shaker. In addition, there has been a need for an effective system to enable separation screens to be effectively cleaned during use. More specifically, there has been a need for drilling fluid/drill cuttings separation systems that provide an effective means of applying a high vacuum pressure to drill cuttings without subjecting the drill cuttings to the high impact forces of a vibrating screen while continuously cleaning the screen.

SUMMARY OF THE INVENTION

In accordance with the invention, there are provided systems and methods for separating solids and liquids from one another and in particular drill cuttings from drilling fluid.

More specifically, in a first aspect, the invention describes a solids/liquid separation system for separating solids and liquids within a slurry from one another, the separation system including: a screen operatively connected to a supporting frame, the screen for supporting the slurry when the screen rotates about an axis of rotation; a fluid manifold operatively connected to a lower surface of the screen and wherein the fluid manifold is configured to enable a vacuum pressure to be applied in a first direction and to a first portion of the screen while the screen is rotating; and a cleaning manifold operatively connected to the screen and wherein the cleaning manifold is configured to enable an air flow pressure to be applied to a second portion of the screen in a second direction generally opposite to the first direction while the screen is rotating; wherein the vacuum pressure in a first direction draws fluid through the screen into the fluid manifold and the air flow pressure in the second direction induces air flow through the screen in the second direction to clean the rotating screen.

In one embodiment, the screen is operatively supported by a drum and the axis of rotation is substantially horizontal and corresponds to a central axis of the drum and the drum has an upstream end and a downstream end and the screen is configured to the drum between the upstream end and the downstream end.

In one embodiment, the fluid manifold is operatively connected to an outer surface of the drum and the fluid manifold is configured to apply an outward vacuum pressure to a lower portion of the screen while the drum is rotating about the substantially horizontal axis.

In one embodiment, the cleaning manifold includes a waste manifold operatively connected to an inner surface of the drum and the waste manifold is configured to apply an inward vacuum force to a higher portion of the drum relative to a position of the fluid manifold while the drum is rotating about the substantially horizontal axis.

In one embodiment, the outward vacuum pressure draws fluid through the screen into the fluid manifold and stalls solids on the screen and the inward vacuum force through the waste manifold draws stalled solids away from the screen and induces air flow through the screen to clean the screen.

In another embodiment, the separation system includes a cradle and a drive system for operatively supporting and rotating the drum on the cradle.

In one embodiment, the fluid manifold extends 90-180 degrees around the outer surface of the screen and the screen is operatively connected to an outside surface of the drum or the screen is operatively connected to an inside surface of the drum and the separation system further includes a screen biasing system for biasing the screen against the drum.

In one embodiment, the waste manifold partially overlaps with the fluid manifold such that during rotation, as a position on the drum moves past the fluid manifold, the waste manifold captures material from the inner surface of the drum.

In one embodiment, the separation system includes at least one vacuum system operatively connected to each of the fluid and waste manifolds, a gas/liquid separator operatively between the fluid manifold and the vacuum system and a gas/solids separator operatively connected between the waste manifold and the vacuum system.

In one embodiment, the separation system includes a pressurized air system operatively connected to the fluid manifold for jetting compressed air against an inner surface of the fluid manifold to assist in the movement of material from inner surfaces of the fluid manifold.

In one embodiment, the separation system includes a pressurized air system operatively connected to the waste manifold for jetting compressed air against an inner surface of the waste manifold to assist in the movement of material from the inner surfaces of the waste manifold.

In one embodiment, the waste manifold is tapered and wherein the upstream end of the waste manifold has a narrower cross-section and the downstream end of the waste manifold has a wider cross-section, and the taper facilitates movement of material through the waste manifold by gravity.

In another embodiment, the cleaning manifold is configured to an outer surface of the drum and a waste manifold is configured to an inner surface of the drum and where the waste manifold is configured to either a) a downstream portion of the drum and where the waste manifold extends towards an upstream end from a downstream end of the drum to a position 75% or less of the length of the drum or b) a downstream portion of the drum and where the waste manifold extends towards an upstream end from a downstream end of the drum to a position 50% or less of the length of the drum.

In one embodiment, the cleaning manifold is operatively connected to 100% of the length of the drum.

In one embodiment, the separation system includes a downstream drum cover operatively connected to the downstream end of the drum and an upstream drum cover operatively connected to the upstream end of the drum where each of the downstream drum cover and upstream drum cover include sealing systems to seal each of the downstream drum cover and upstream drum cover with respect to the drum.

In one embodiment, the system includes an outer cover surrounding the outer surface of the drum wherein each of the cleaning manifold, fluid manifold and outer cover fully collectively surround the screen and substantively seal the drum from the atmosphere.

In one embodiment, exhaust air from the vacuum system is operatively connected to the cleaning manifold to provide a source of air to the cleaning manifold.

In one embodiment, the cleaning manifold is open to the atmosphere and air flow into to the cleaning manifold is induced by vacuum pressure through the fluid manifold.

In one embodiment, the downstream drum cover includes a solids outlet located at a bottom location of the downstream drum cover.

In one embodiment, the solids outlet includes at least one baffle within the drum operatively positioned to direct solids within the drum to the solids outlet.

In one embodiment, the downstream drum cover supports a waste manifold having an inner drum portion configured for operative engagement with an inner surface of the drum and an outer conveying portion for configuration to a vacuum source.

In another embodiment, the drum is supported by an upstream support ring and a downstream support ring and wherein each of the upstream support ring and downstream support ring include support wheels for engagement with an outer surface of the drum when the drum is rotating within each of the upstream and downstream support rings.

In one embodiment, the drum includes an upstream flange and the upstream support ring includes at least one flange support wheel for engagement with the upstream flange.

In one embodiment, the separation includes at least one upstream drive wheel and at least one downstream drive wheel operatively connected to the upstream and downstream support rings respectively for engagement with an outer surface of the drum and for providing a drive force to rotate the drum.

In one embodiment, the separation system includes a support frame operatively connected to the drum and the support frame includes a tilting system to enable the drum to be tilted with respect to a horizontal axis.

In one embodiment, the screen is a rectangular screen having a size for covering engagement with an outer surface of the drum and wherein the screen has first and second connecting edges enabling interconnection of the first and second connecting edges to tightly engage the screen to the drum.

In one embodiment, the screen includes at least one screen tie extending circumferentially around the drum when the screen is configured to the drum.

In one embodiment, the drum has at least one recess extending circumferentially around the drum and is configured to enable a screen tie to engage with the recess when attaching a screen to the drum.

In one embodiment, the separation system includes a distribution plate operatively connected to the upstream end cover and downstream end cover to enable movement of material within the drum across the drum when the drum is rotating. The distribution plate may vibrate within the drum.

In one embodiment, the drum includes: a plurality of scoops distributed about an inner surface of the drum, the scoops being generally parallel to the central axis of the drum for capturing and lifting solids and fluids while the drum is rotating, the drum also including a perforated section within each scoop for supporting a screen; and a waste manifold operatively connected to an inner surface of the drum and positioned to capture solids falling from each scoop when a scoop is in an inverted position within the drum;

In one embodiment, the scoops are substantially longitudinal with respect to the drum extending from an upstream end of the drum to a downstream end.

In one embodiment, the fluid manifold includes a series of slots generally corresponding in size to each perforated section and wherein during rotation of the drum each perforated section progressively passes each slot.

In one embodiment, each scoop has an open end and a longitudinal side wall having a plurality of perforations, the plurality of perforations for providing an additional path to air flow through the scoop.

In one embodiment, the axis of rotation is a substantially vertical axis and the screen is generally horizontal while rotating.

In one embodiment, the screen is circular and the fluid manifold is configured to an underside of the screen and extends at least 270 degrees around an area of the screen.

In one embodiment, the cleaning manifold is configured to an upper surface of the screen and removes solid material on the upper surface of the screen.

In one embodiment, the separation system includes a drive system operatively connected to the screen and frame to effect rotation of the screen relative to the frame.

In one embodiment, the screen includes a screen support operatively connected to the drive system and a replaceable screen adapted for placement on top of the screen support.

In one embodiment, the screen support includes an outer support flange adapted for rolling contact with the frame, an inner ring and a plurality of ribs connecting the outer support flange and inner ring and wherein the plurality of ribs support the screen at a level below upper edges of the outer support flange and inner ring to contain the slurry on the replaceable screen during operation.

In one embodiment, the cleaning manifold includes a waste manifold operatively connected to an upper surface of the screen and the waste manifold includes an inlet plenum and a conveying plenum configured together so as to induce cyclonic flow within the conveying plenum during operation.

In one embodiment, the separation system includes at least one vacuum system operatively connected to the fluid and waste manifolds.

In one embodiment, the fluid manifold includes at least one baffle for sectioning the fluid manifold into zones enabling the application of different vacuum pressures into each zone during operation.

In one embodiment, each baffle includes an upper horizontal plate adapted for sealing with an underside of the screen during rotation of the screen with respect to the fluid manifold.

In one embodiment, the fluid manifold includes at least two zones having separate outlets and each outlet can include a throttle enabling the adjustment of vacuum pressure within at least one zone.

In one embodiment, the separation system includes a venturi plenum operatively connected to a lower surface of the screen for directing airflow to a position underneath the waste manifold.

In one embodiment, the system includes an inlet sluice for introducing a slurry of solid/liquid onto the screen. The inlet sluice can include a sloping pan for the distribution of slurry across the width of the screen.

In one embodiment, the inlet sluice includes a large particle entrapment system (LPES) adapted for connection to a lower end of the sloping pan.

In one embodiment, the LPES includes a plurality of parallel tines and a stopper bar.

In one embodiment, the separation system includes a cover operatively connected to an upper side of the screen.

In one embodiment, the cover includes at least one fluid venturi plenum within the cover for directing airflow against a position above the fluid manifold downwardly against the screen.

In one embodiment, the fluid venturi plenum is adjustable with respect to the screen to adjust the separation between the fluid venturi and the screen.

In one embodiment, the separation system includes a vibration system operatively connected to the screen to effect vibration of the screen. In one embodiment, during vibration no vacuum pressure is applied to the screen.

In another embodiment, a method of separating solid and liquids from within a slurry is provided, includes the steps of: a) introducing the slurry to an upper surface of a screen while the screen is rotating about an axis of rotation; b) applying a vacuum force to a portion of the lower surface of the screen and in a direction generally perpendicular to a surface of the screen to draw fluids through the screen; and, c) applying an air flow pressure to the screen at a second position of the screen and in a direction generally opposite to the direction of flow as defined in step b) relative to the screen to induce air flow through the screen and effect cleaning of the screen.

In one embodiment, the vacuum force is applied to the fluid manifold by a vacuum system, and the method further includes the step of utilizing exhaust air from the vacuum system as a source of air for step c).

In one embodiment, the method includes the step of introducing a portion of the exhaust air from the vacuum system to a burner to effect VOC removal from the exhaust air.

In one embodiment, the method includes the step of vibrating the screen.

In one embodiment, the separation process defined by steps a)-c) is conducted within a closed system to enable control of heat within the system.

In one embodiment, the method includes the step of introducing heat into the closed system.

In one embodiment, the slurry is a slurry of drilling fluid and drill cuttings and the vacuum force of step b) is sufficient to draw air through the rotating screen and effective to reduce drilling fluid retained on drill cuttings to less than 15 wt % (wt. of drilling fluid relative to wt. of drill cuttings) or to less than 10 wt % (wt. of drilling fluid relative to wt. of drill cuttings) or to less than 5 wt % (wt. of drilling fluid relative to wt. of drill cuttings).

In one embodiment, the axis of rotation is generally horizontal, and the screen is configured to a drum and the method includes the step of applying the air flow pressure through a cleaning manifold configured to an outer surface of the drum.

In one embodiment, the vacuum force is applied to the screen by a fluid manifold operatively connected to an outer surface of the drum and the method includes the step of applying an outward vacuum pressure to a lower portion of the screen while the drum is rotating about the generally horizontal axis.

In one embodiment, the cleaning manifold includes a waste manifold operatively connected to an inner surface of the drum and the method includes the step of applying an inward vacuum force to a higher portion of the drum relative to a position of the fluid manifold while the drum is rotating about the generally horizontal axis.

In one embodiment, the outward vacuum pressure is applied to draw fluid through the screen into the fluid manifold and to stall solids on the screen and the inward vacuum force through the waste manifold draws stalled solids away from the screen and induces air flow through the screen to clean the screen.

In one embodiment, the vacuum pressure through the fluid manifold is applied to 90-180 degrees around the outer surface of the screen.

In one embodiment, the method includes the step of jetting compressed air against an inner surface of the fluid manifold to assist in the movement of material from the inner surfaces of the fluid manifold and/or the step of jetting compressed air against an inner surface of the waste manifold to assist in the movement of material from the inner surfaces of the waste manifold.

In one embodiment, the method includes the step of utilizing exhaust air from a vacuum system operatively connected to the fluid manifold as a source of air to the cleaning manifold to clean the screen.

In one embodiment, the method includes the step of tilting the separation system with respect to a horizontal axis during steps a) to c).

In one embodiment, the method includes the step of providing a distribution plate within the drum to enable movement of material within the drum across the drum when the drum is rotating.

In one embodiment, the method includes the step of vibrating the distribution plate within the drum.

In one embodiment, the axis of rotation is substantially vertical and the screen is substantially horizontal.

In one embodiment, the air flow force of step c) is sufficient to draw air through the screen to effect solids removal from an upper surface of the rotating screen and cleaning of the screen.

In another aspect, the invention provides a screen assembly for operative connection to a separation system, the screen assembly including: an inner support rod for supporting the screen in a roll about the support rod, the support rod adapted for connection to an exterior surface of the separation system adjacent the drum.

In one embodiment, the screen has first and second connecting edges enabling interconnection of the first and second connecting edges to tightly engage the screen to the drum.

In one embodiment, the screen includes at least one screen tie operatively connected between the first and second connecting edges and extending circumferentially around the drum when the screen is configured to the drum.

In yet another aspect, the invention provides method of replacing a screen in a separation system including the steps of: a) attaching a rolled screen assembly having a screen to the separation system adjacent the outer drum surface; b) attaching a first connecting edge of the screen to the rotating drum; c) rotating the drum to unroll the rolled screen assembly; and d) when a second connecting edge of the screen is reached, attaching the second connecting edge of the screen to any one of or a combination of the first connecting edge and drum such that the screen is tightly engaged to the outer surface of the drum.

In another aspect, the invention provides a screen assembly for operative connection to a separation system, the screen assembly including: a screen disk adapted for use on the separation system wherein the screen has outer dimensions to engage with an outer ring of the screen support.

In one embodiment, the screen disk has an inner edge adapted for engagement with the inner ring of the screen support.

In one embodiment, the screen disk includes an upper screen and a lower support screen and wherein the upper screen has a smaller pore size compared to the lower support screen.

BRIEF DESCRIPTION OF THE DRAWINGS

The invention is described with reference to the accompanying figures in which.

DETAILED DESCRIPTION OF THE INVENTION

Figure 1:
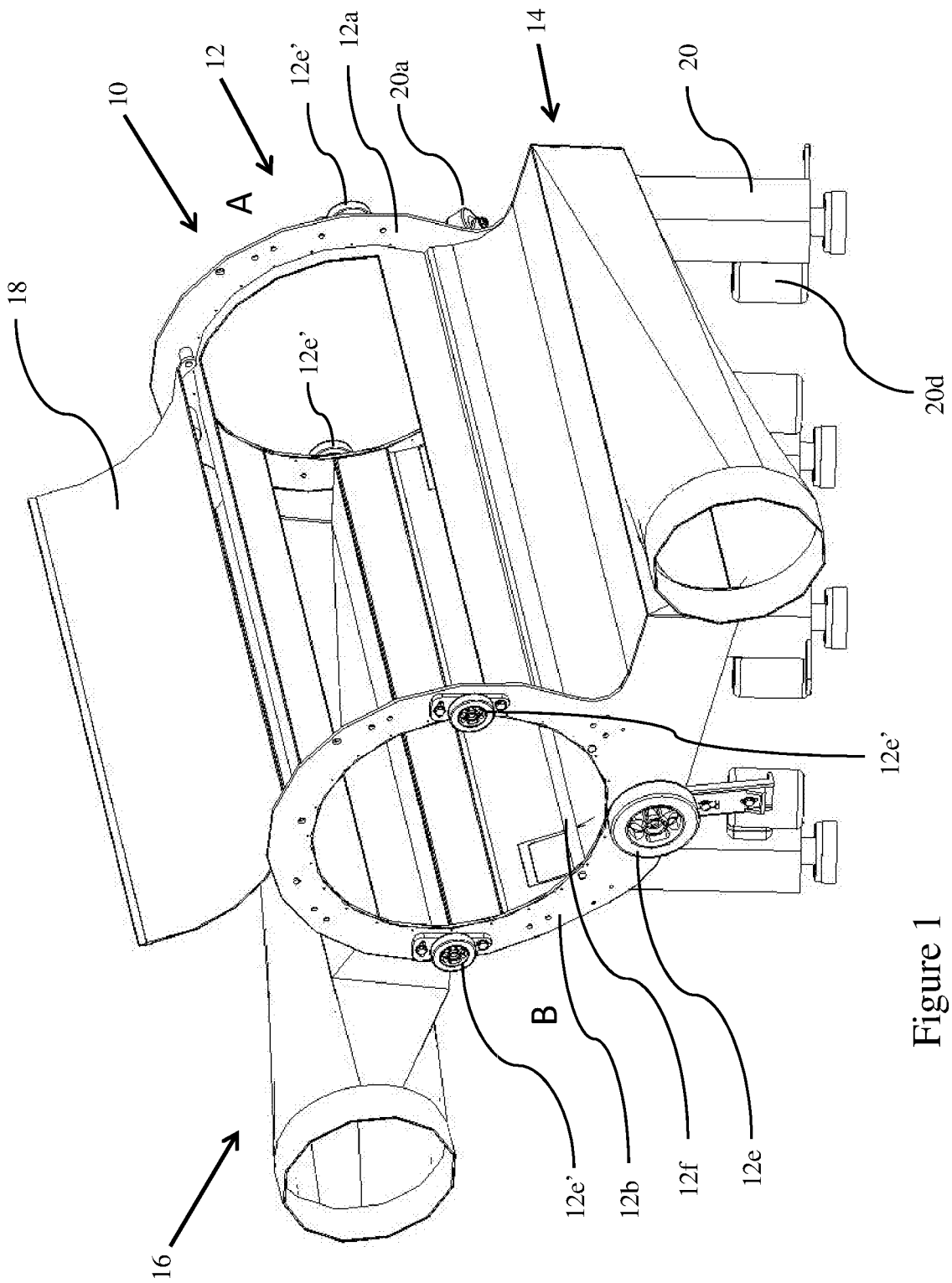
FIG. 1 is a front perspective view of a rotary tube vacuum (RTV) system in accordance with one embodiment of the invention without a drum installed.

With reference to the figures, embodiments of a rotating vacuum system are described including a rotating vacuum tube (RVT) system and rotating vacuum table (RVTA) are described. While the RVT and RVTA are described as a system for separating drilling fluid and drill cuttings, it is understood that the systems may be used to separate other fluids/solids from one another. Other embodiments of related separation systems are described in Applicants' applications including U.S. patent application 61/901,671 filed Nov. 8, 2013 and U.S. patent application 61/940,097 filed Feb. 14, 2014, incorporated herein by reference.

RVT General Design and Operation

As shown in FIGS. 1-14, a rotating vacuum tube (RVT) system 10 generally includes a drum support system 12, a fluid manifold 14, a cleaning manifold 16 and a cover 18 collectively supporting and covering a drum 26. The drum 26 supports a screen and the drum and screen are able to rotate together within the system. The system 10 has an upstream end A and a downstream end B. In the context of this description, a "manifold" is a means for conveying fluids (liquids or gases) from one location to another. A manifold may have a single inlet or outlet through which the fluids are conveyed or multiple inlets or outlets.

Figure 7:
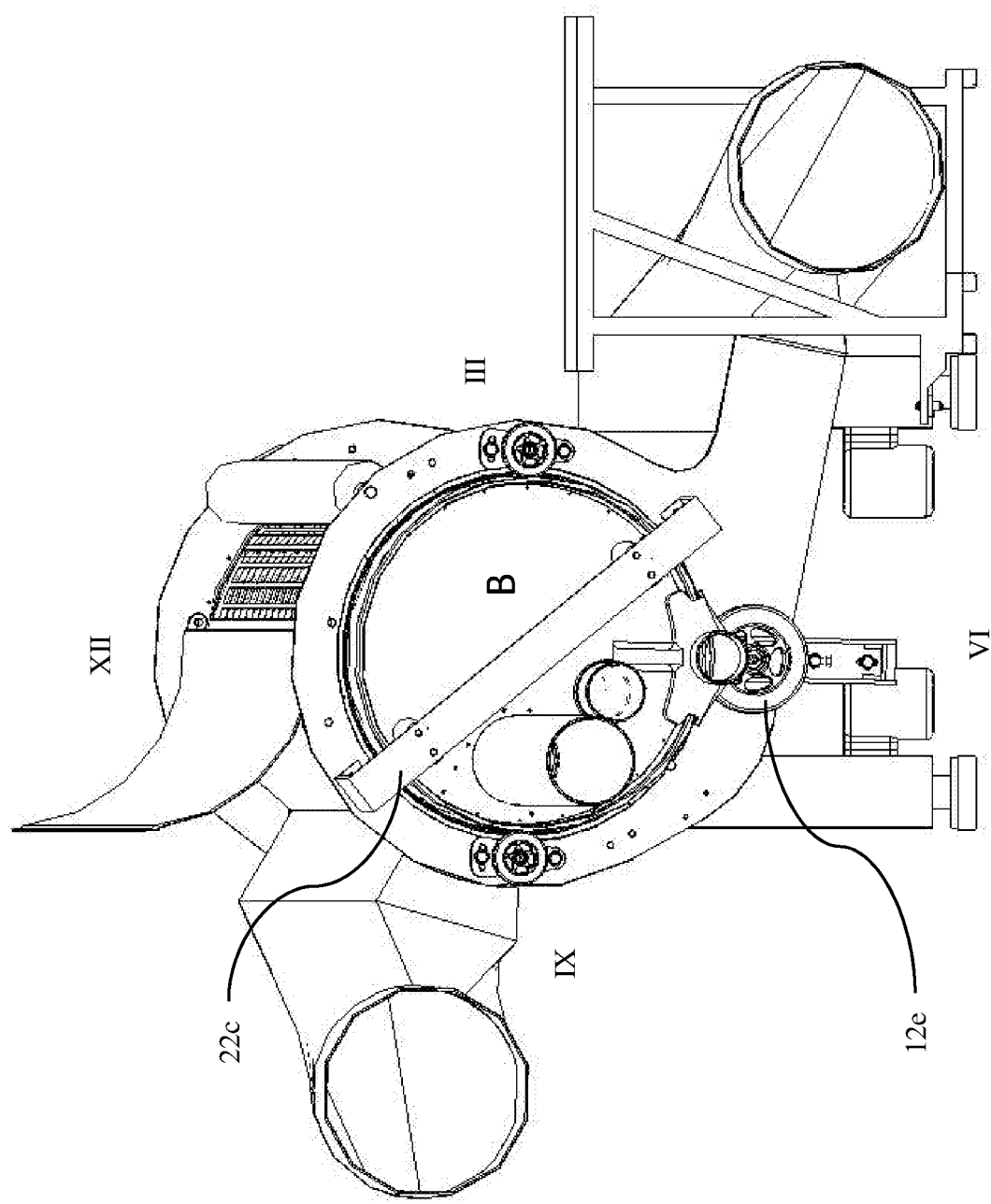
FIG. 7 is a front view of a RTV system in accordance with one embodiment of the invention with a drum and end covers installed and showing a drum cover in an open position with a screen replacement roll configured.

For the purposes of description, positions of the various components in relation to an end view of the drum, viewed from end B, are described in relation to clock positions with the topmost position referred to as the 12 o'clock position, the bottommost position referred to as the 6 o'clock position and the side positions referred to as the 3 o'clock (right) and 9 o'clock (left) positions respectively, shown in roman numerals in FIG. 7.

In operation, a slurry of drill cuttings and drilling fluid is introduced into the upstream end A of the drum while the drum and screen are rotating. Vacuum pressure is applied to an outside and lower surface of the drum/screen through the fluid manifold (typically configured from about the 4 o'clock to 9 o'clock positions) so as to draw fluid through the screen into the fluid manifold 14. Thus, as the slurry progresses within the drum from A to B, fluid is withdrawn from the slurry such that solids within the slurry generally become drier as they progress towards the downstream end B of the drum.

The cleaning manifold 16 is configured to the outside surface of the drum at approximately the 9-10 o'clock position and applies an air pressure force outside and through the screen and drum during rotation. The cleaning manifold is preferably configured to the full length of the drum. As such, the entire surface of the screen is subjected to a cleaning force with each revolution of the drum.

In one embodiment, a waste manifold 22a (FIG. 2) is configured to an inside surface of the drum at approximately the 9-10 o'clock position at the downstream end B of the drum. The waste manifold applies an inward vacuum pressure to a portion of the screen such that air is drawn through the screen and to convey solids away from the inner drum/screen surface. The waste manifold is preferably configured to a portion of the length of the drum and will therefore only overlap with a portion of the cleaning manifold.

As noted above, while the drum is rotating, the solids will become progressively drier as they move from A to B. Moreover, as they become drier, it is desirable to increase the effect of the fluid manifold vacuum pressure as they travel to maximize fluid removal. In addition, increase fluid manifold vacuum pressure will increase the tendency for the solids to adhere to the screen and hence be drawn upwardly within the drum due to the effect of the fluid manifold vacuum applying an outward radial pressure to the drier particles. At approximately the 9 o'clock position, the fluid manifold vacuum pressure will cease and the material will be subjected to forces from the cleaning manifold 16. In addition, material on the screen which will also be affected by gravity and will have a tendency to fall away from the screen and roll downwards to the bottom of the drum. Preferably, the drum is tilted such that particles will generally move in the downstream direction. This rolling action will also have a tendency to prevent the adherence of particles to one another and thereby enable a more effective removal of drilling fluid through multiple rolling cycles. As a particle reaches a downstream position where the waste manifold 22a is configured, as the particle is drawn up the side of the drum due to the rotation of the drum, it will enter the waste manifold 22a where under the influence of a radially inward vacuum pressure being applied through the waste manifold be removed from the system. Other embodiments position a single or additional waste manifold 22b at the downstream end of the drum in the approximate 6 o'clock position.

Further details on the operation and design of the RVT system are described below.

Unibody Design

In a preferred embodiment, the RVT system 10 is a unibody design. The unibody design generally reduces the number of components in the system such that various sub-systems may have multiple functionalities so as to improve the efficiency of manufacture. In particular, one objective of the unibody design is to provide both a sub-system's function while also providing structural strength to the system while also reducing weight.

Figure 8:
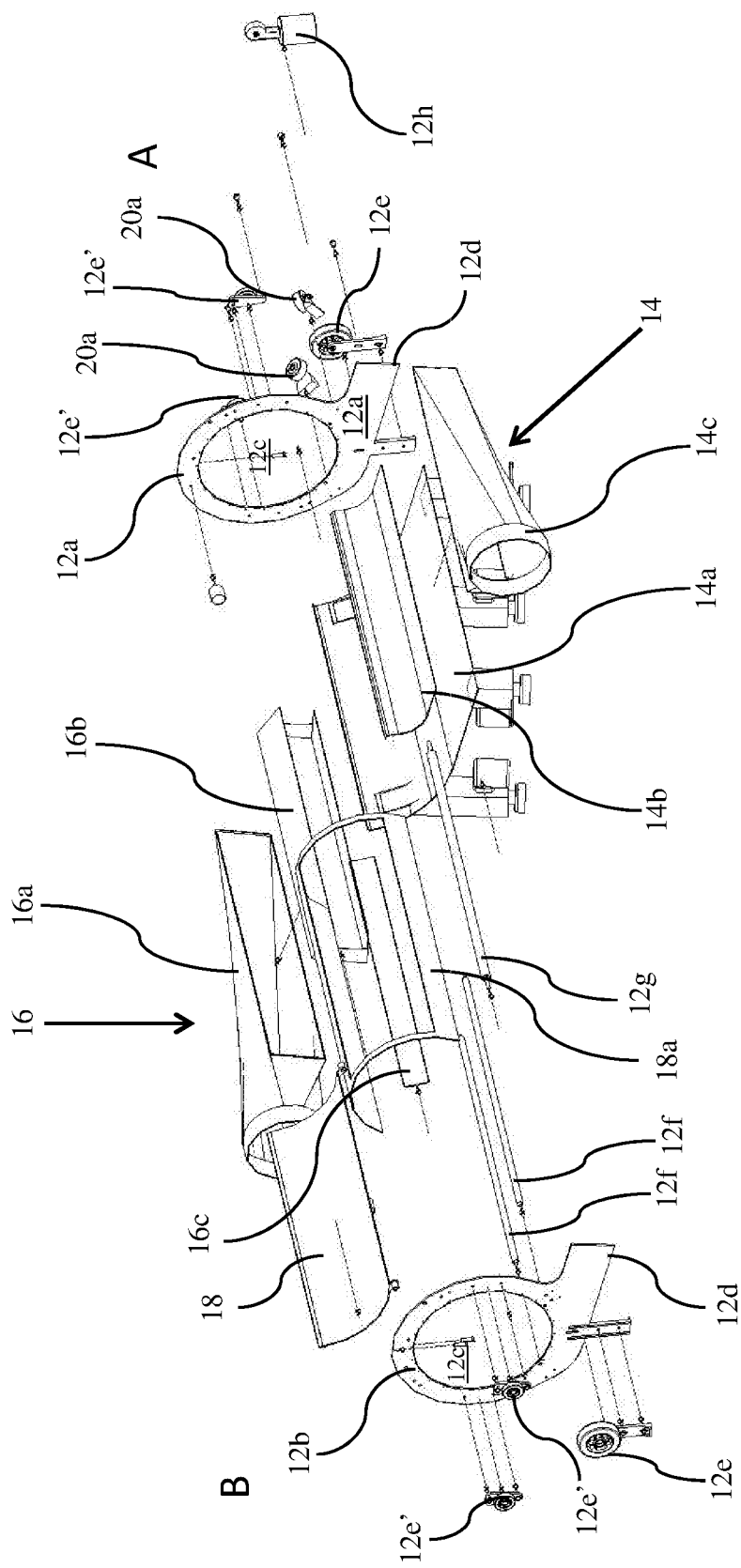
FIG. 8 is an exploded view of an RTV system in accordance with one embodiment of the invention showing the primary drum supporting and manifold components.

As shown in FIG. 8, individual components of a unibody design are shown in an exploded diagram.

Drum supports 12a, 12b are end plates defining openings for supporting and guiding a rotating drum. As shown, each drum support has a circular opening 12c and a tab 12d. The tab 12d forms an end wall of the fluid manifold as described below. The drum supports 12a, 12b also support a drum rotation system including at least one drive wheel 12e and guide wheels 12e' that are positioned adjacent the opening 12c to provide supporting and guide surfaces to a drum 26 (see FIG. 2). The drive and guide wheels are preferably adjustable to ensure alignment.

The two drum supports are interconnected by rods 12f that provide appropriate spacing between the drum supports and which also assist in the insertion of a drum within the drum supports during system assembly.

In addition, drive shaft 12g interconnects drive wheels 12e such that a driving force is applied simultaneously to both ends of the drum. A motor 12h is configured to one end of the drive shaft 12g.

In the unibody design, the fluid manifold 14 includes bottom panel 14a, top panel 14b and outlet manifold 14c. As shown, the bottom panel 14a and top panel 14b are connected to tab 12d of the drum supports 12a, 12b to define the structure of the fluid manifold. The outlet manifold 14c connects to the fluid manifold structure to provide a connection point to a vacuum source, preferably through hose connections. The fluid manifold 14 may also include internal partitions and/or baffles to enable different vacuum pressures to be applied to different zones of the fluid manifold (not shown). For example, it may be desired to apply a vacuum pressure at the downstream end of the system sufficient to cause particle adhesion to the screen in order that such particles are drawn upwardly to the waste manifold. In other zones, baffling may be used primarily to maximize the movement of fluid through the screen.

The cleaning manifold 16 is configured to the outer surface of the drum supports 12a, 12b and includes a cleaning plenum 16b and inlet manifold 16a. Preferably the inlet plenum is inwardly tapered towards its point of contact with the screen/drum so as to induce a venturi effect (ie. increased air speed and pressure decrease) as air moves through the inlet plenum. The inlet manifold 16a provides a connection point to an air pressure supply. The system may also include a spacer panel 16c to ensure that the entire outer surface of the drum is covered and to enable spacing between the top of the fluid manifold and the cleaning manifold if desired.

A cover 18 and cover support panel 18a are configured to the drum support from the cleaning manifold through the 12 o'clock position to the upper position of the fluid manifold (i.e. at the 4 o'clock position). The cover may pivotally connect to the cover support so as to allow access to the outer surface of the drum. The cover support panel 18a will include an opening substantially corresponding to the length of the drum and sufficiently wide to enable screen replacement, as is explained in greater detail below. The cover support panel 18a also ensures that the portion of the drum from the cleaning manifold through to the fluid manifold is covered.

End Covers

Figure 3:
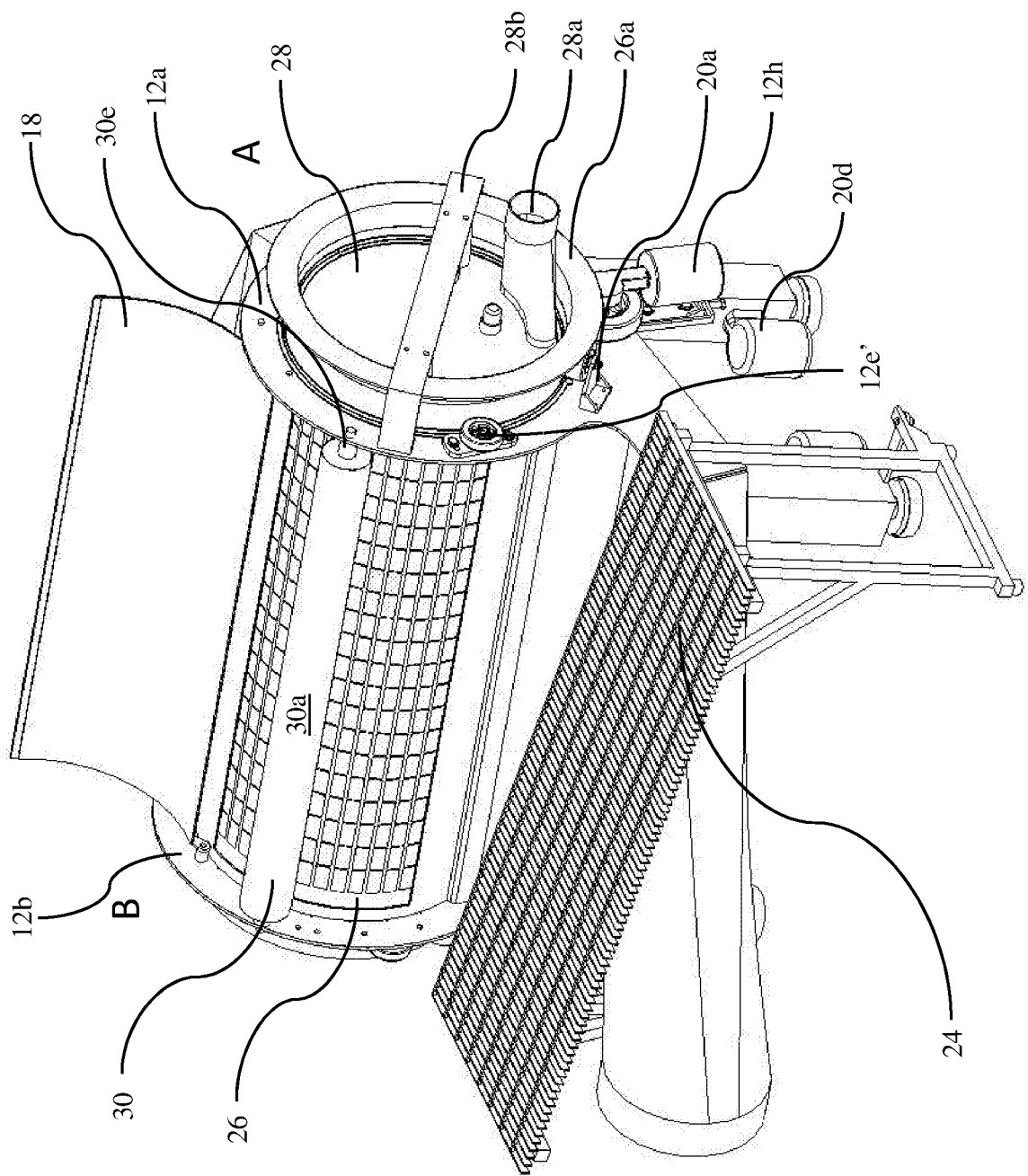
FIG. 3 is a side perspective view of a RTV system in accordance with one embodiment of the invention with a drum and end covers installed and a drum cover in an open position.
Figure 4:
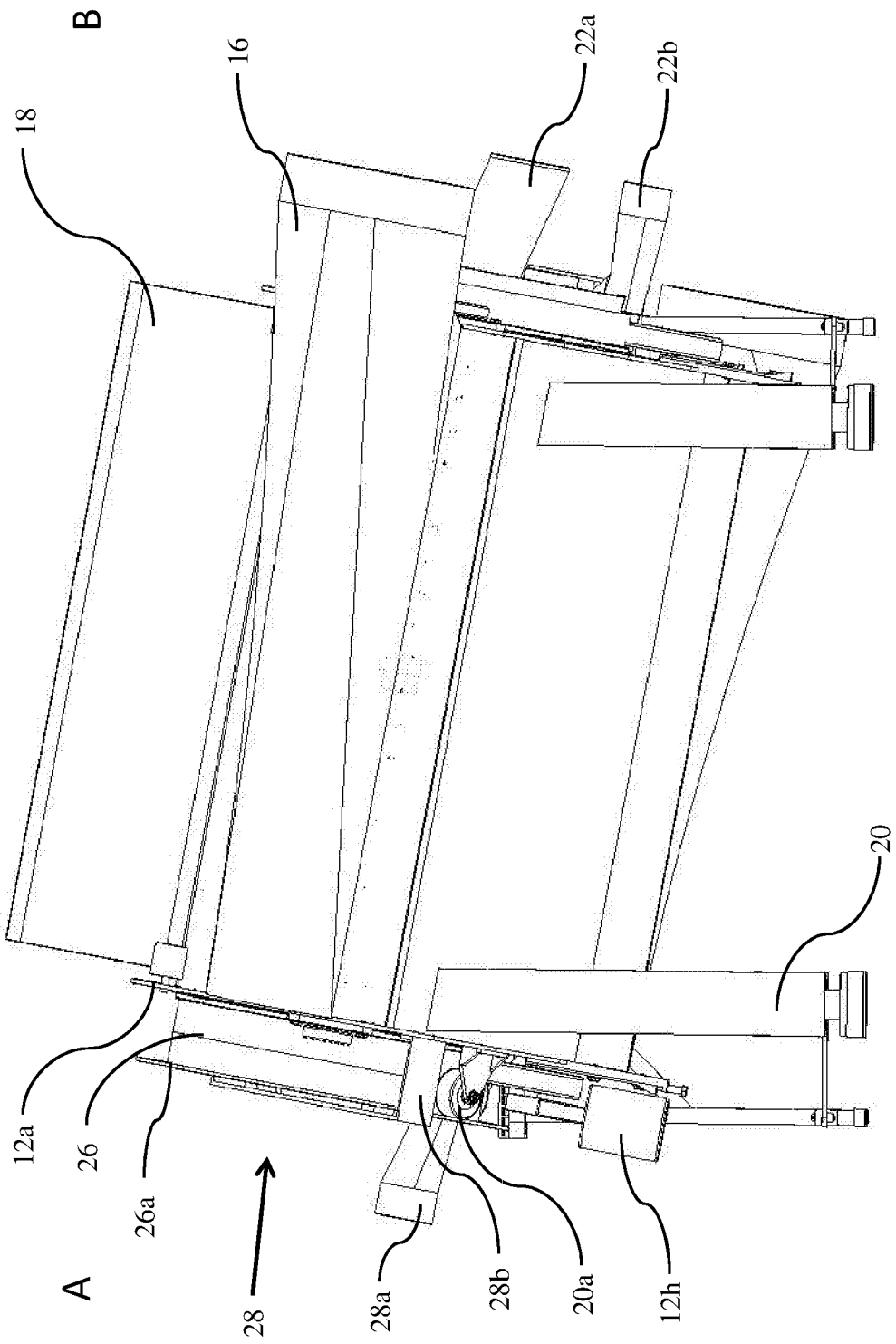
FIG. 4 is a side view of a RTV system in accordance with one embodiment of the invention with a drum and end covers installed.
Figure 5:
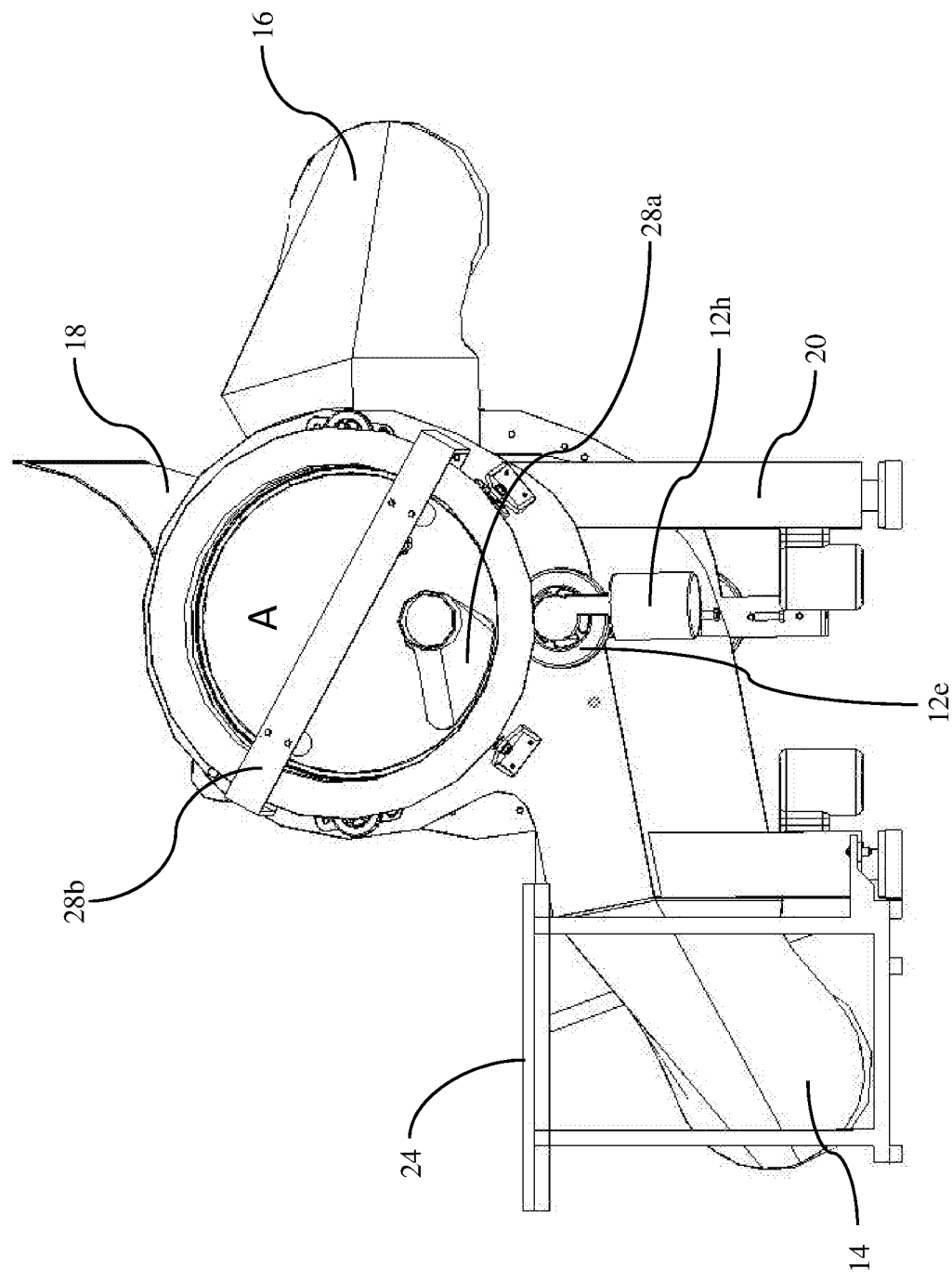
FIG. 5 is a rear view of an RTV system in accordance with one embodiment of the invention with a drum and end covers installed.
Figure 6:
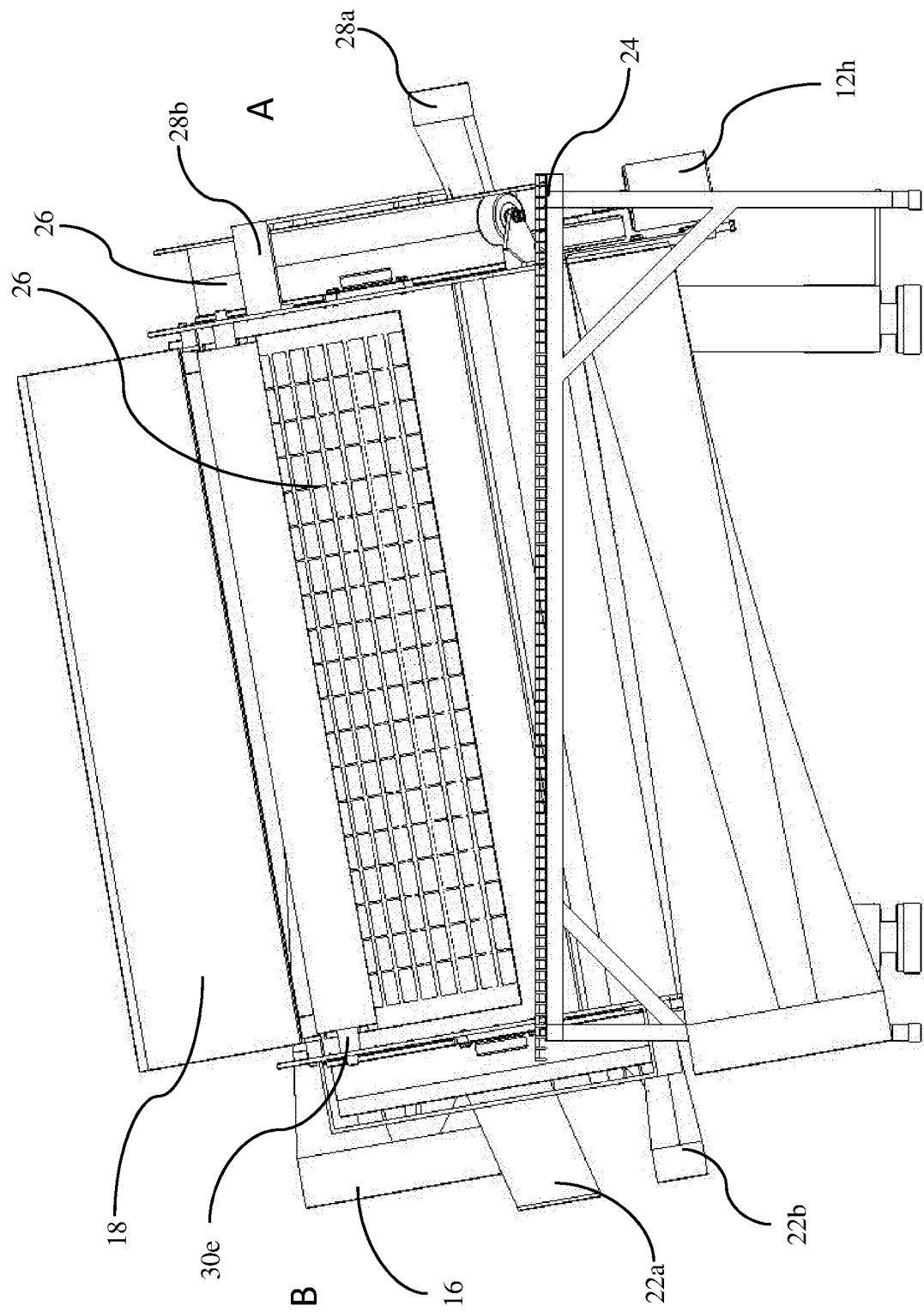
FIG. 6 is a side view of an RTV system in accordance with one embodiment of the invention with a drum and end covers installed and showing a drum cover in an open position with a screen replacement roll configured.

As shown in FIGS. 3 and 5, at the upstream end A, an inflow cover assembly 28 covers the upstream end of the drum. The inflow cover is designed to seal against the rotating drum and support an inflow sluice 28a for the slurry of materials to be introduced into the rotating drum. As shown, the inflow cover assembly is connected to the drum support 12a via an inflow mount 28b that extends over and around the drum 26. The inflow cover assembly is shown slightly recessed within the drum 26. Appropriate gaskets (not shown) may be provided to improve sealing. In addition, as shown in FIG. 5, the inflow sluice 28a may be offset with respect to the bottom of the drum in a direction opposite to the direction of drum rotation in order to deliver slurry as close to the upstream edge of the fluid manifold as possible to maximize slurry residence time over the fluid manifold.

Figure 2:
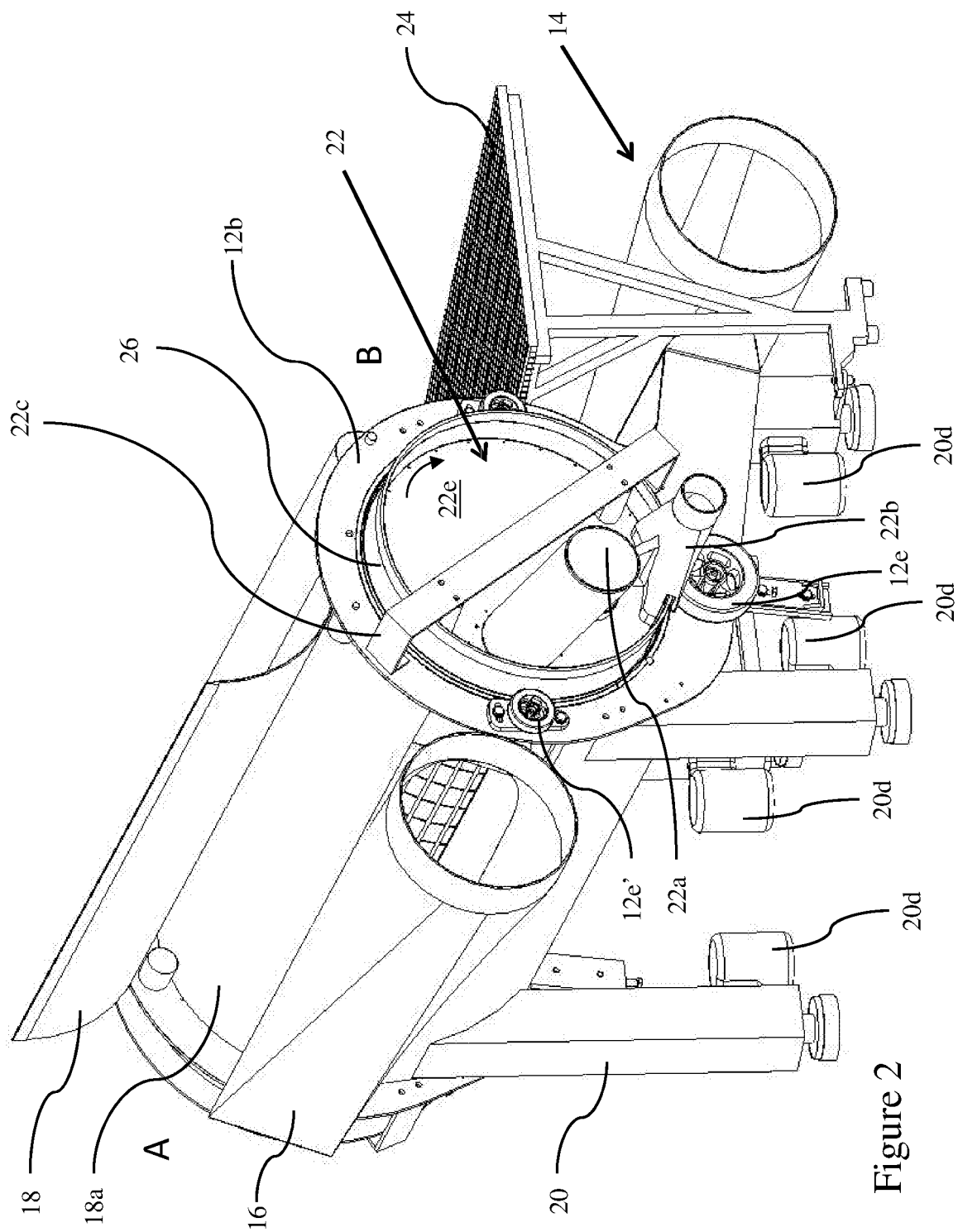
FIG. 2 is a second front perspective view of a RTV system in accordance with one embodiment of the invention with a drum and end covers installed.

As shown in FIG. 2, at the downstream end B, a waste manifold assembly 22 covers the downstream end of the drum 26. The waste manifold assembly 22 is designed to seal against the rotating drum 26 and to support a waste manifold 22a and overflow waste manifold 22b. As shown, the waste manifold assembly is connected to the drum support 12b via a waste manifold mount 22c. Each of the waste manifold 22a and overflow waste manifold 22b are designed for connection to a vacuum system.

Figure 9:
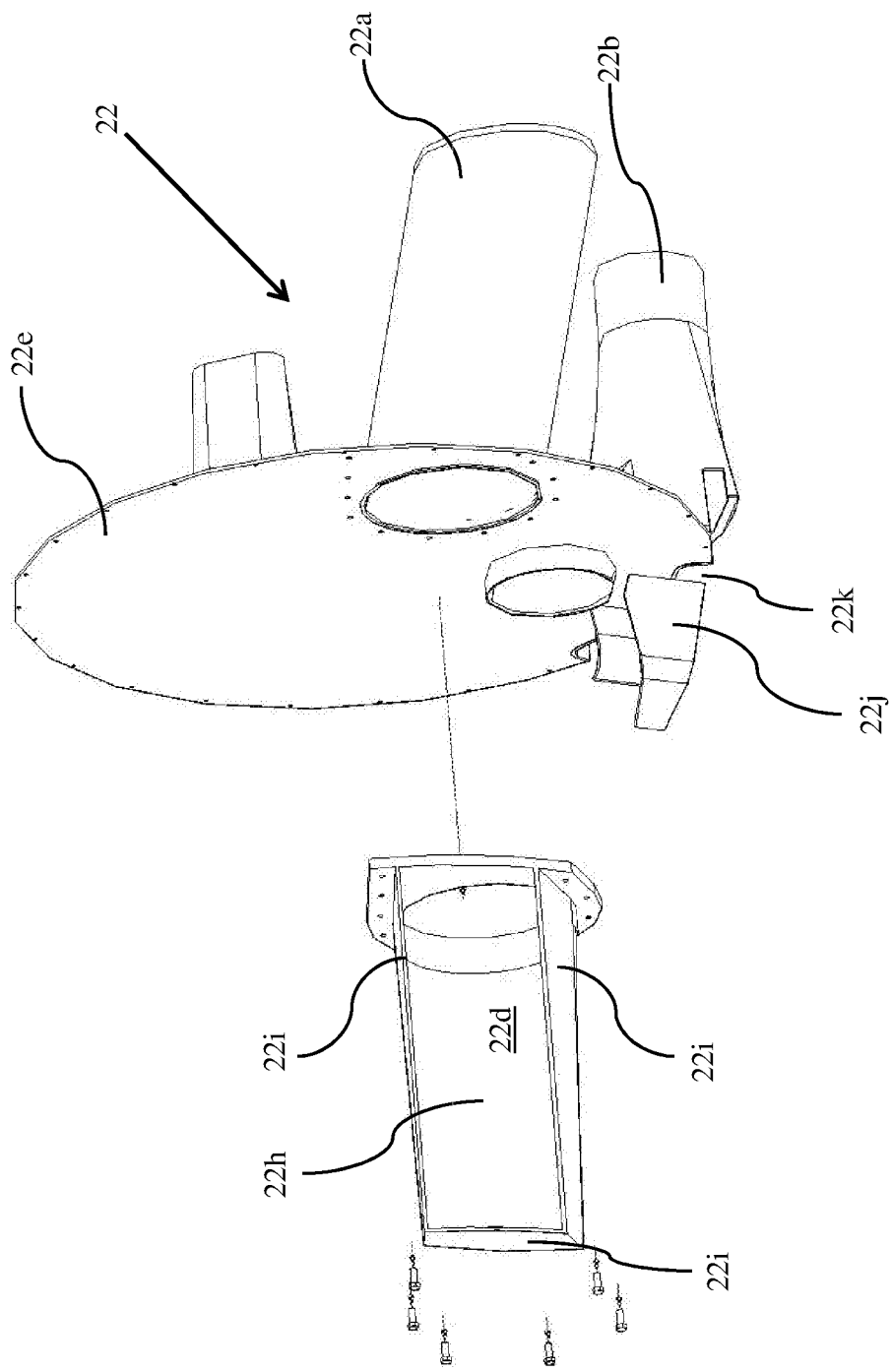
FIG. 9 is an exploded view of a waste manifold assembly in accordance with one embodiment of the invention.

As shown in FIG. 9, the waste manifold assembly 22 may include an inner waste manifold 22d connected to the waste manifold 22a through the downstream cover 22e. The inner waste manifold is positioned to be operatively located adjacent the inner surface of the drum 26 such that solids on the drum may be removed from the drum through inner waste manifold 22d and waste manifold 22a under vacuum. As such, the inner waste manifold 22d has an opening 22h and surfaces 22i for placement near the inner surface of the drum (i.e. generally convex at the ends). The spacing between inner waste manifold 22d and the inner surface of the drum should be great enough to allow drill cutting particles to enter the drum while minimizing vacuum losses. Appropriate gaskets may be provided on the inner waste manifold on the downstream surfaces to minimize these losses.

The overflow waste manifold 22b includes an opening 22k in the lower part of the downstream cover 22e to enable larger particles that may not be drawn up to inner waste manifold to be removed at a lower position of the drum. The overflow waste manifold is designed for connection to a vacuum system and may also include one or more directing baffles 22j for directing larger particles through the opening in the downstream cover to overflow waste manifold 22b. In one embodiment, the system is only provided with the overflow waste manifold.

Drum

Figure 10:
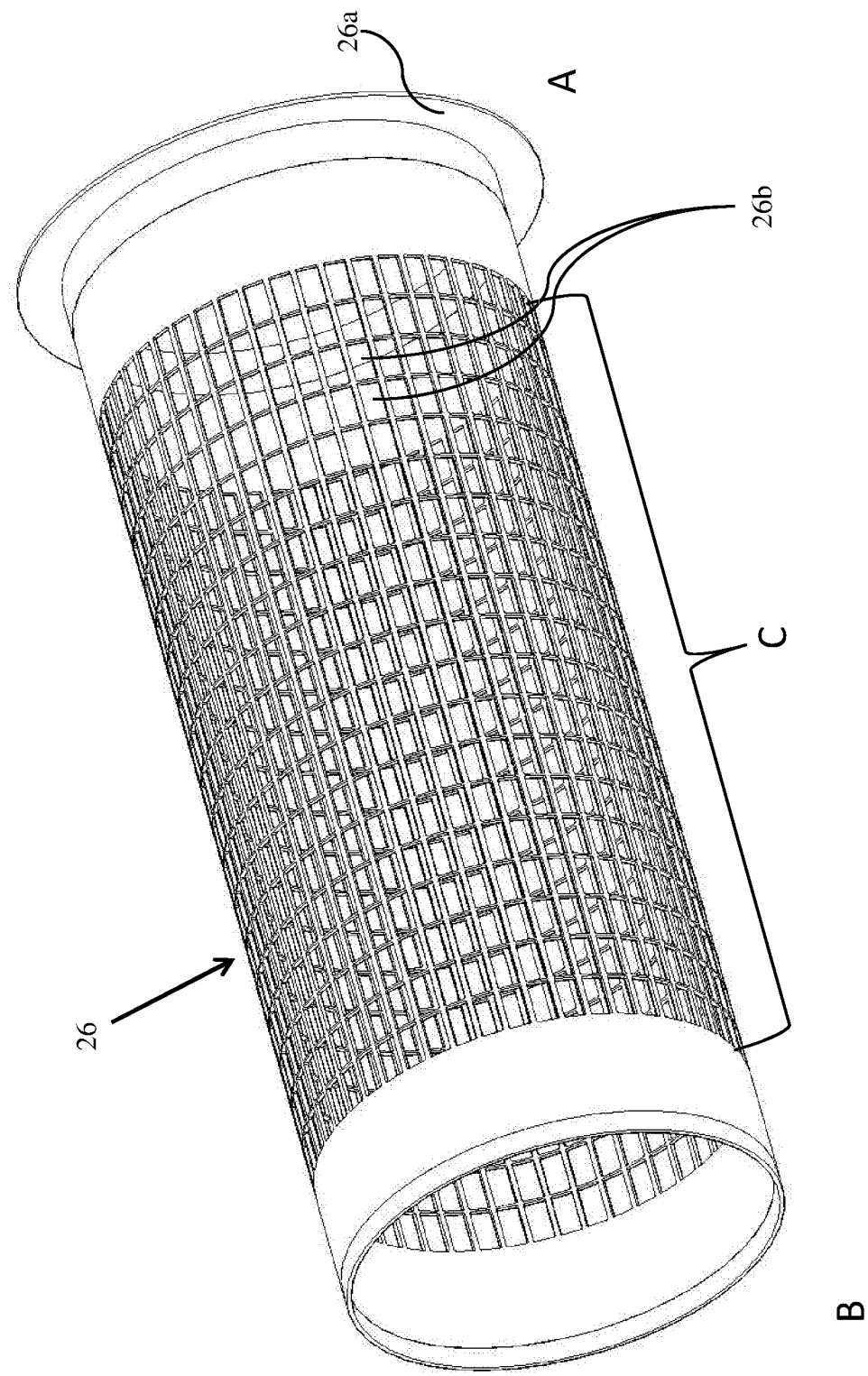
FIG. 10 is a perspective view of a drum in accordance with one embodiment of the invention.

As shown in FIG. 10, the drum 26 is a cylindrical tube having an upstream end A and downstream end B with a plurality of openings 26b interspersed throughout a middle section of the drum. The upstream end includes a flange 26a for engagement with axial support wheels 20a connected to the drum support 12a that engage with the flange when the drum is within the RVT system. Radial support wheels 12e' connected to the drum supports 12a, 12b are provided at both the upstream and downstream ends of the drum to provide radial support to the drum when the drum is within the RVT system.

As shown, the openings 26b extend substantially across the length of the drum and provide a surface to which a screen assembly 30 is connected to as described below.

The drum may be manufactured from metal, plastic or composite materials. In one method of manufacturing the drum, a pre-formed tube may be cut (eg. by laser or water cutting) to form the openings within the tube within the middle section C of the drum. Thereafter, a flange 26a may be attached to the upstream end A of the drum. The shape of the openings and void space may be chosen to optimize both void space and structural integrity of the drum.

Screen and Screen Replacement

Figures 10A, 10B:
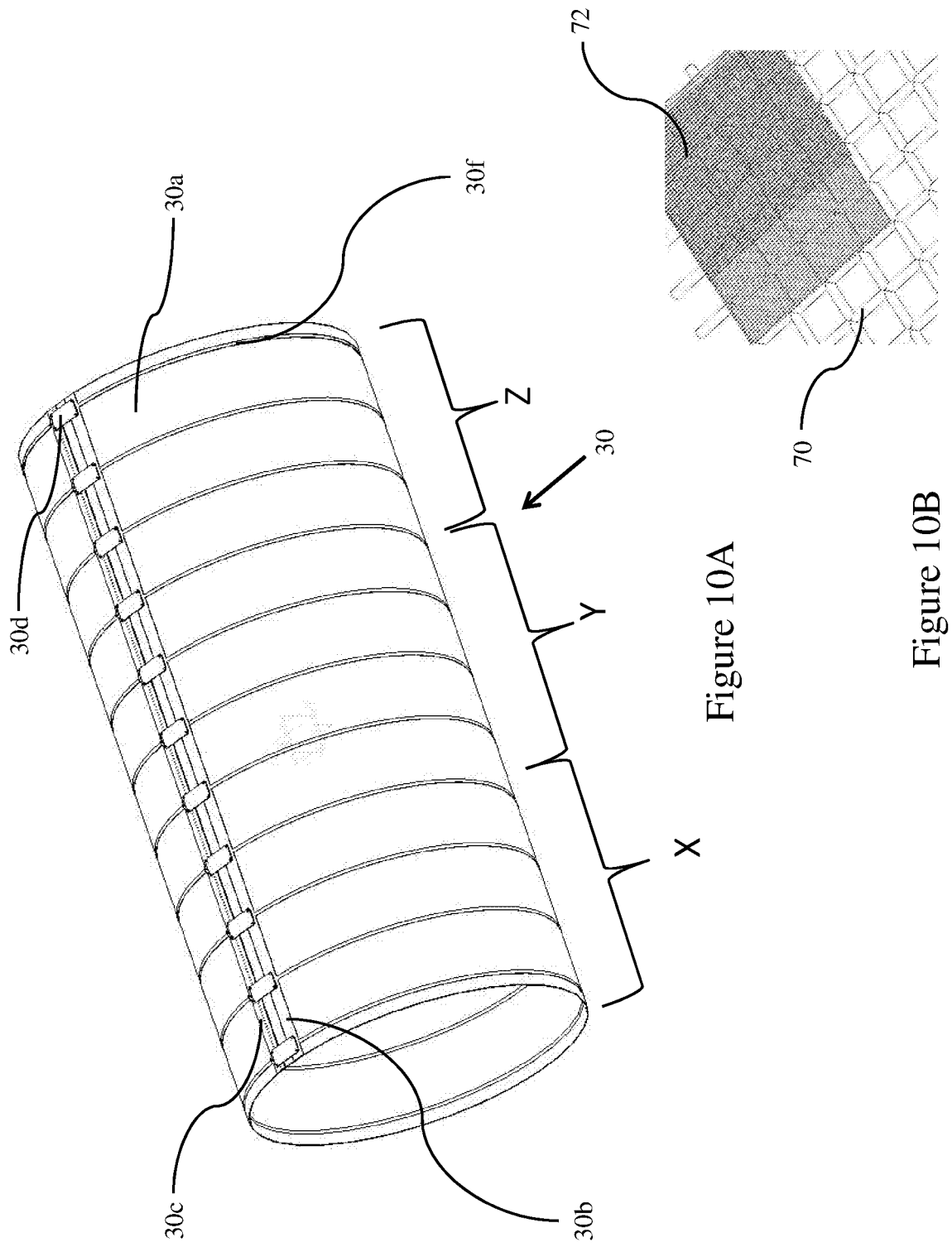
FIG. 10A is a perspective view of a screen assembly in accordance with one embodiment of the invention.
FIG. 10B is a schematic view of a screen assembly showing a finer screen overlaying a coarser screen.
Figure 10C:
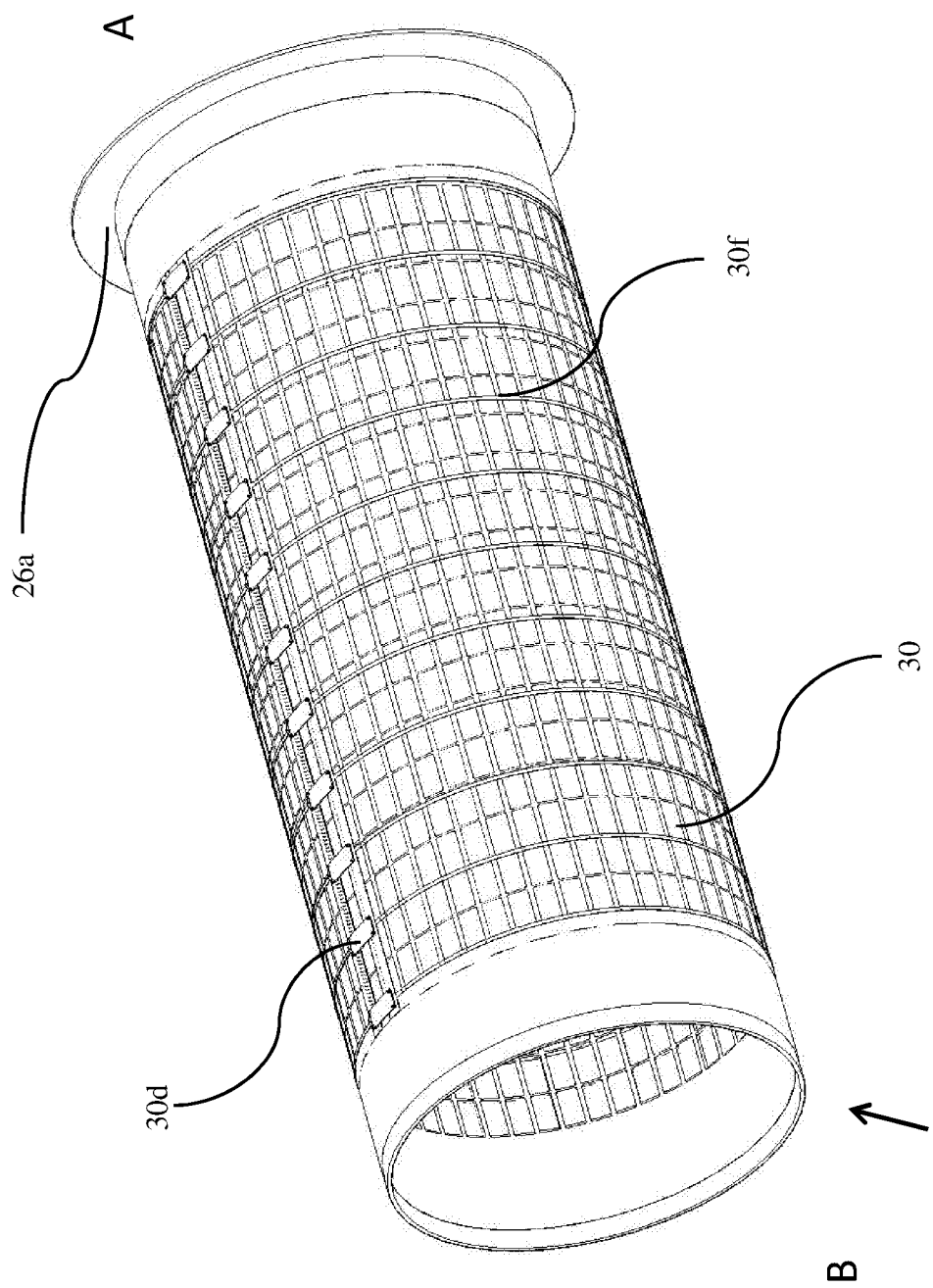
FIG. 10C is a perspective view of a screen assembly configured to a drum.
Figure 10D:
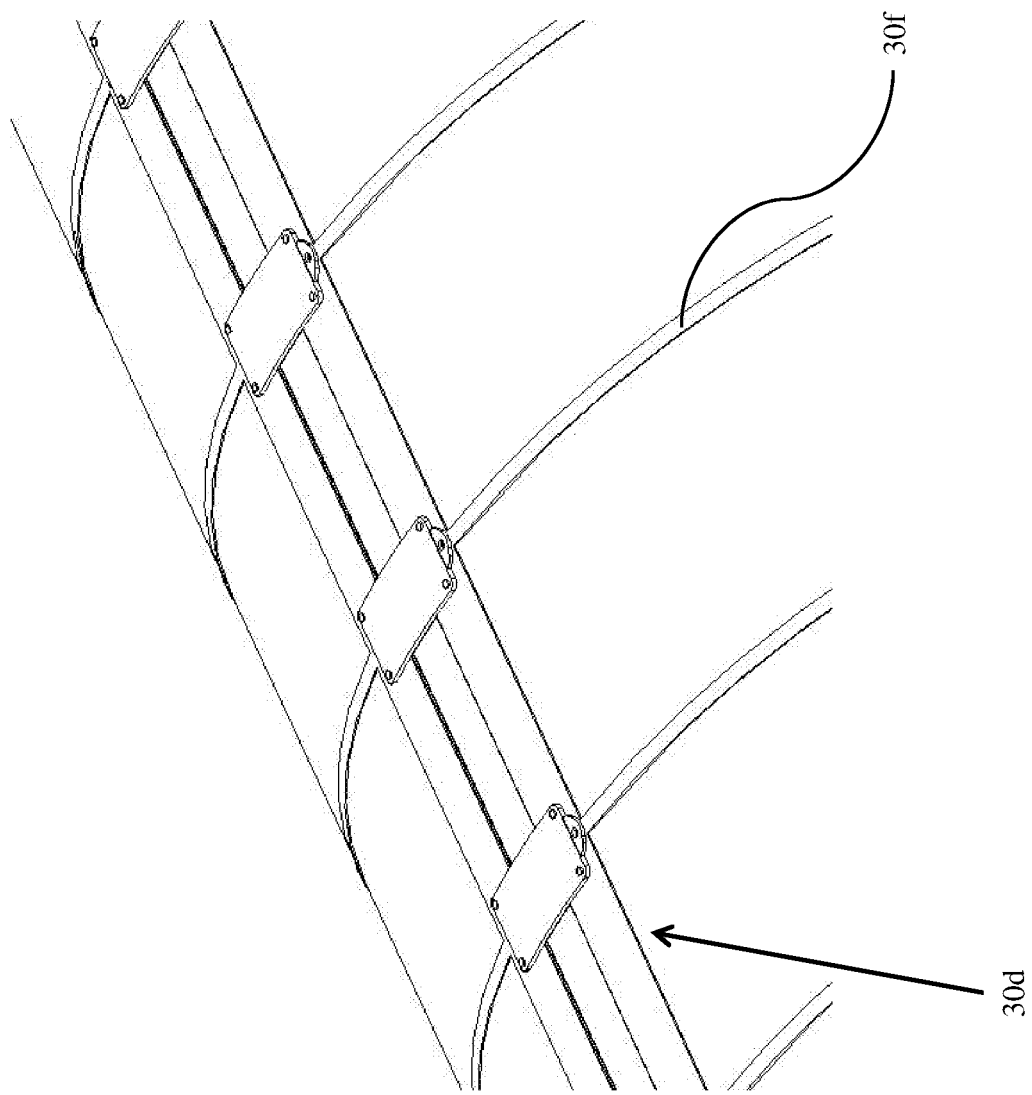
FIG. 10D is a perspective view of a connection system used in configuring a screen to a drum in accordance with one embodiment of the invention.

As shown in FIG. 10A, a screen assembly 30 is shown. In one embodiment, the screen assembly includes a screen 30a, tensioning support connectors 30b, 30c and tensioning connectors 30d (FIG. 10d). As shown in FIG. 3, a screen assembly may be connected to the drum through cover 18. As shown, a rolled screen assembly 30 is mounted on drum supports 12a, 12b via a support rod 30e. The screen 30a is partially unrolled such that one of the tensioning support connectors (eg. 30b) is placed flush against the drum. One or more tensioning connectors 30d are connected to the tensioning support connectors (preferably pre-attached) to secure the tensioning support connector against the drum. The drum is then rotated such that the screen 30a is unrolled and thereby covers the outer surface of the drum. As the drum completes a full rotation, the second tensioning support connector (eg. 30c) will be reached whereupon the two tensioning support connectors 30b, 30c are connected together via the tensioning connectors 30d to secure the screen tightly against the drum.

In one embodiment, the screen may be provided with a plurality of tensioning bands 30f that may provide additional support to the screen and minimize separation of the screen from the drum during use. The tensioning bands and/or the tensioning connectors may include appropriate mechanical tensioning systems such as a turnbuckle or lever system (not shown) to provide further tensioning to the screen assembly.

As shown in FIG. 10B, the screen assembly may also comprise a plurality of layers to provide structural support to a finer screen. For example, a base screen 70 of a coarser and stronger material may be used to support a finer screen 72 (shown only partially covering a coarse screen) in order to prevent distortion and/or promote longevity in the finer screen. The base screen 70 and finer screen 72 may be bonded together using appropriate adhesives.

After a screen assembly 30 has been configured to the drum and the screen roll is removed, the cover 18 is closed and the RVT system may be operated.

After a period of use, the screen will have to be replaced. The screen assembly 30 is removed from the drum by reversing the procedure followed to attach the screen assembly to the drum. An old screen may be rolled onto an empty screen roll for disposal. Access to the cover 30 may be gained from a stand 24.

Screens may be substantively a single mesh size or may be different mesh sizes that are positioned in different sections on the drum. That is, to the extent that the system is configured to apply different vacuum pressures to different zones of the rotating drum, it may be desirable to have different screen sizes in those different zones. Accordingly, a screen assembly may have different mesh sizes configured to an underlying coarse screen in bands X, Y, Z as shown in FIG. 10A.

Distribution Plate

Figure 11:
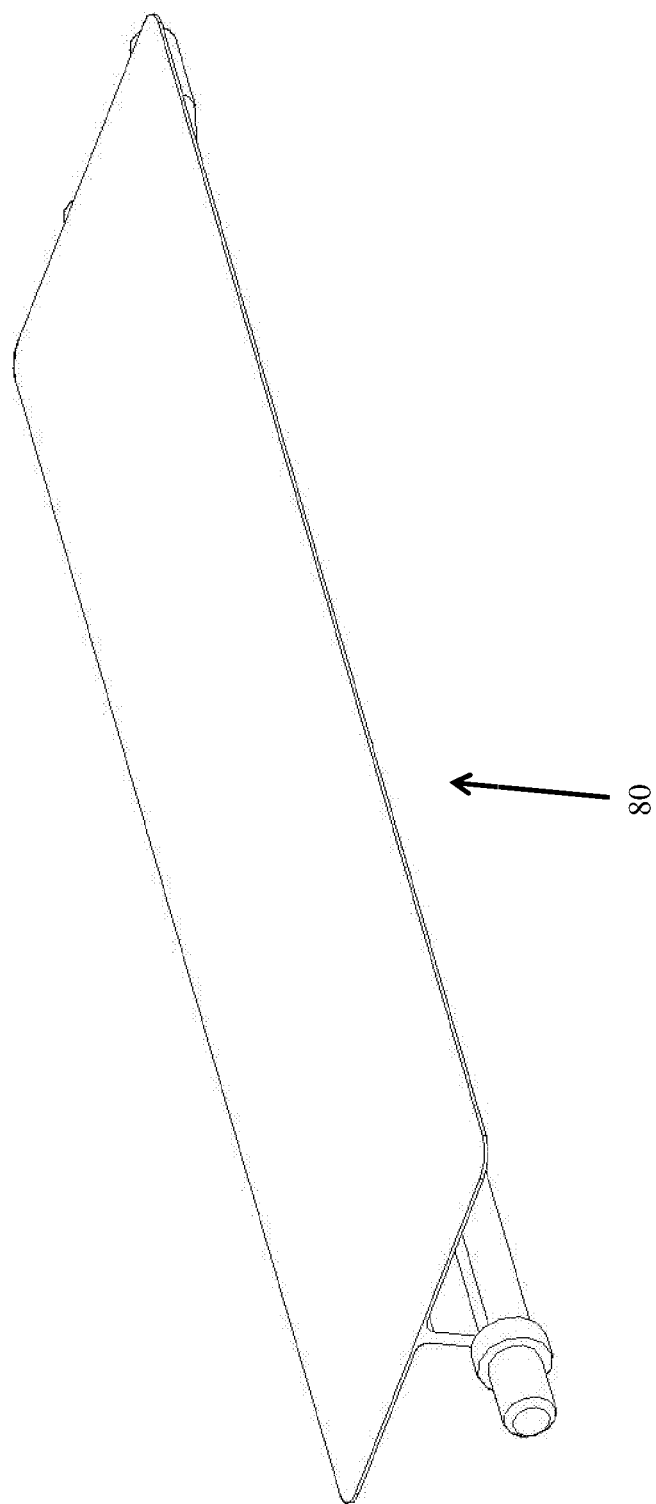
FIG. 11 is a perspective view of a distribution plate in accordance with one embodiment of the invention.
Figure 11A:
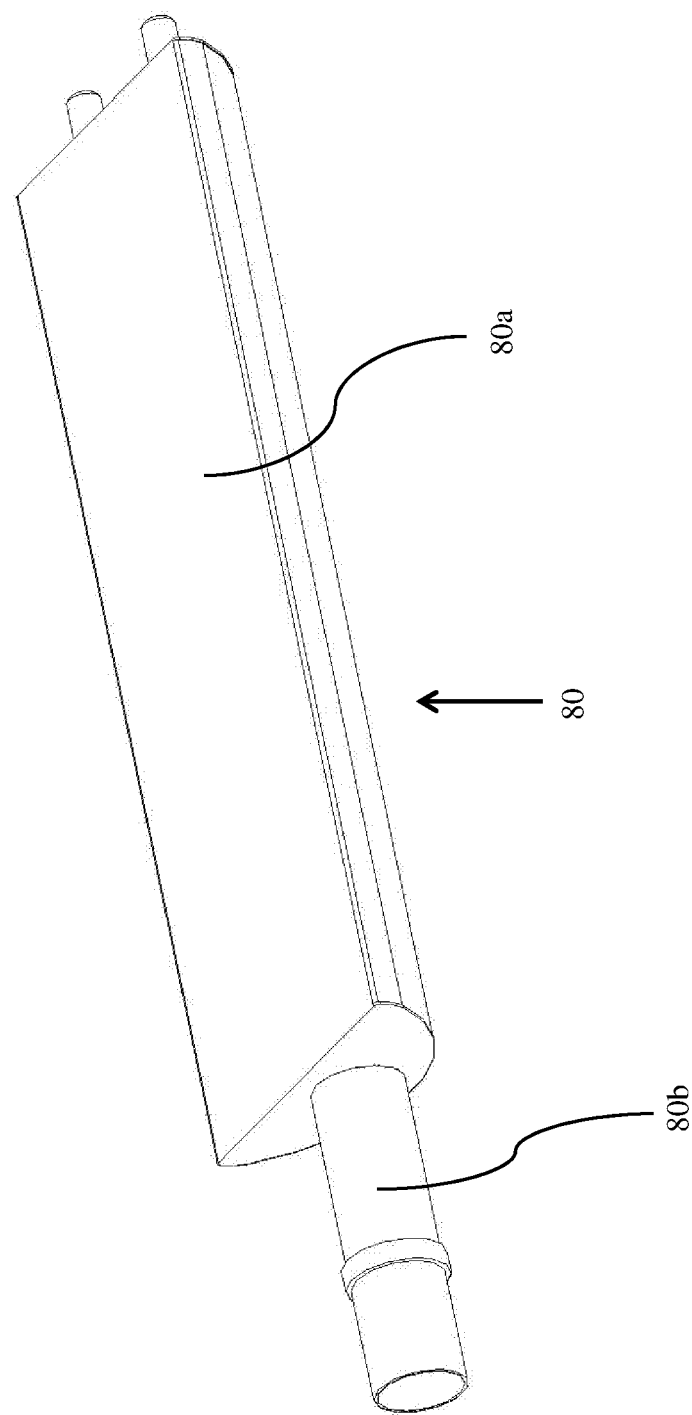
FIG. 11A is a perspective view of a distribution plate in accordance with one embodiment of the invention.
Figure 11B:
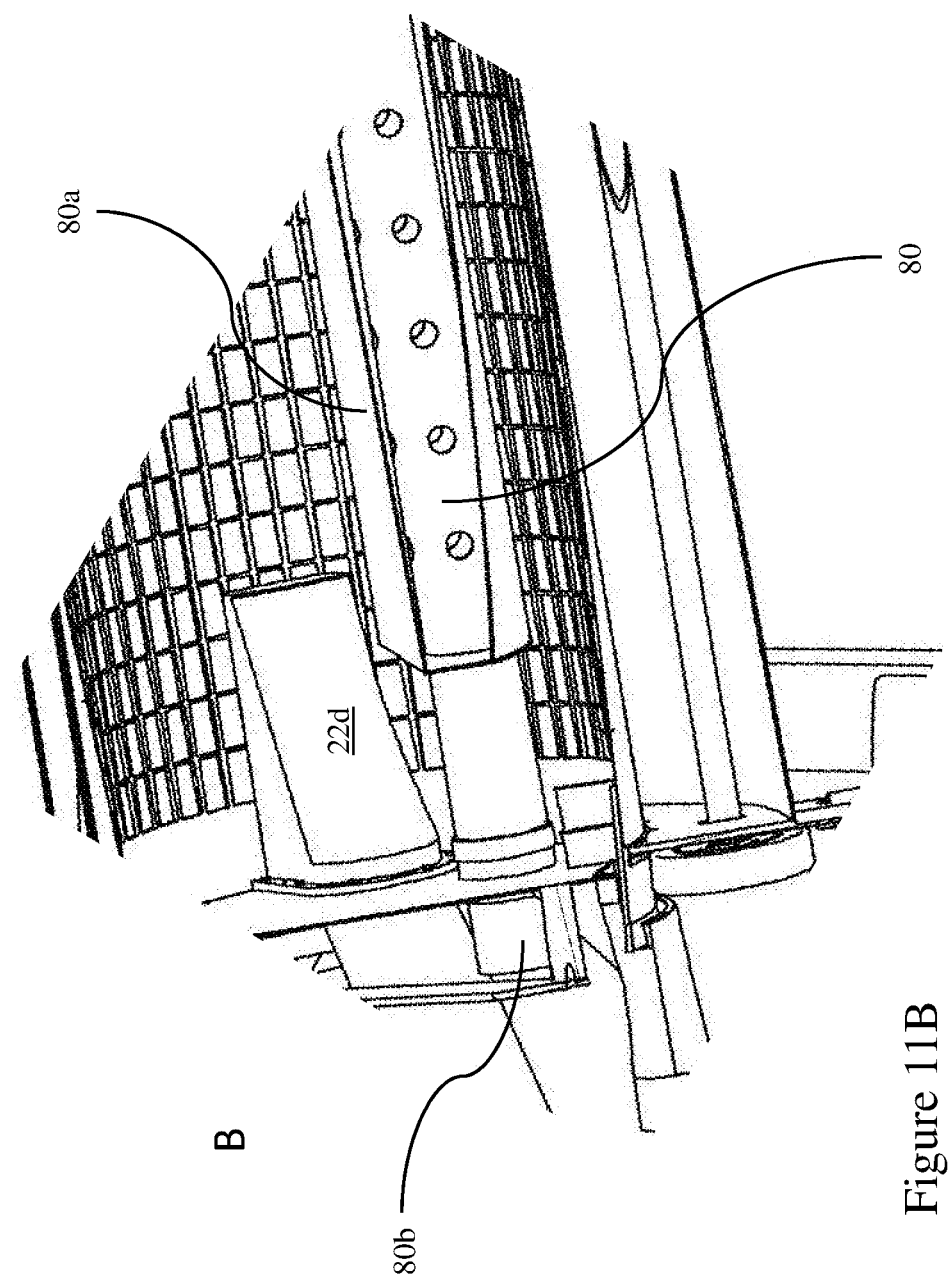
FIG. 11B is a cross-sectional view of a distribution plate configured within a drum in accordance with one embodiment of the invention.

As shown in FIGS. 11, 11A and 11B, the RVT may be configured with a distribution plate 80 within the drum that can be used to facilitate movement of material from one side of the drum to the other as well as to minimize the impact of solid materials dropping within the drum. That is, as material may rise up the drum before dropping, a distribution plate spanning a portion of the interior of the drum will enable this material to move directly from approximately the 10 o'clock position back to the 4 o'clock position. In one embodiment, as shown in FIG. 11, the distribution plate is a simple flat plate that extends between ends A,B of the drum and is mounted within the end covers of the waste manifold assembly and inflow cover assembly. The distribution plate may be vibrated by an appropriate vibration source such as an unbalanced motor to effect vibration across the distribution plate 80. In another embodiment as shown in FIGS. 11A and 11B, the distribution plate 80 has a hollow interior with a pliable upper surface 80a. In this embodiment, a vibration source such as a pulsed air pressure may be introduced into the interior of the plate so as to introduce a mild vibration to particles on the surface 80a to facilitate their movement across the surface and to prevent clumping. Pulsed air pressure may be introduced through one or more conduits 80b.

System Frame 20 and Drive System

As shown in FIGS. 1 and 2 for example, the RVT will include a support system 20 to elevate the system from a work surface. In one embodiment, the system may be actively tilted so as to enable control of the angle of the drum to the horizontal and thereby control the relative speed by which material may move from the upstream A to the downstream end B of the drum. Similarly, the support system can be used to level the system. Appropriate linear motion actuators and motors 20d and control systems may be provided to effect this control.

The drum 26 is rotated within the RVT system by a drive system that includes a drive motor 12h and radial drive and support wheels 12e. Wheels 12e are interconnected via drive rod 12g such that drive motor 12h rotates both wheels 12e simultaneously as best seen in FIG. 8. The drive system includes an appropriate power source and controller to enable speed control of the drum although variable speed control is not necessary for the operation of the system.

Assembly

Figure 12:
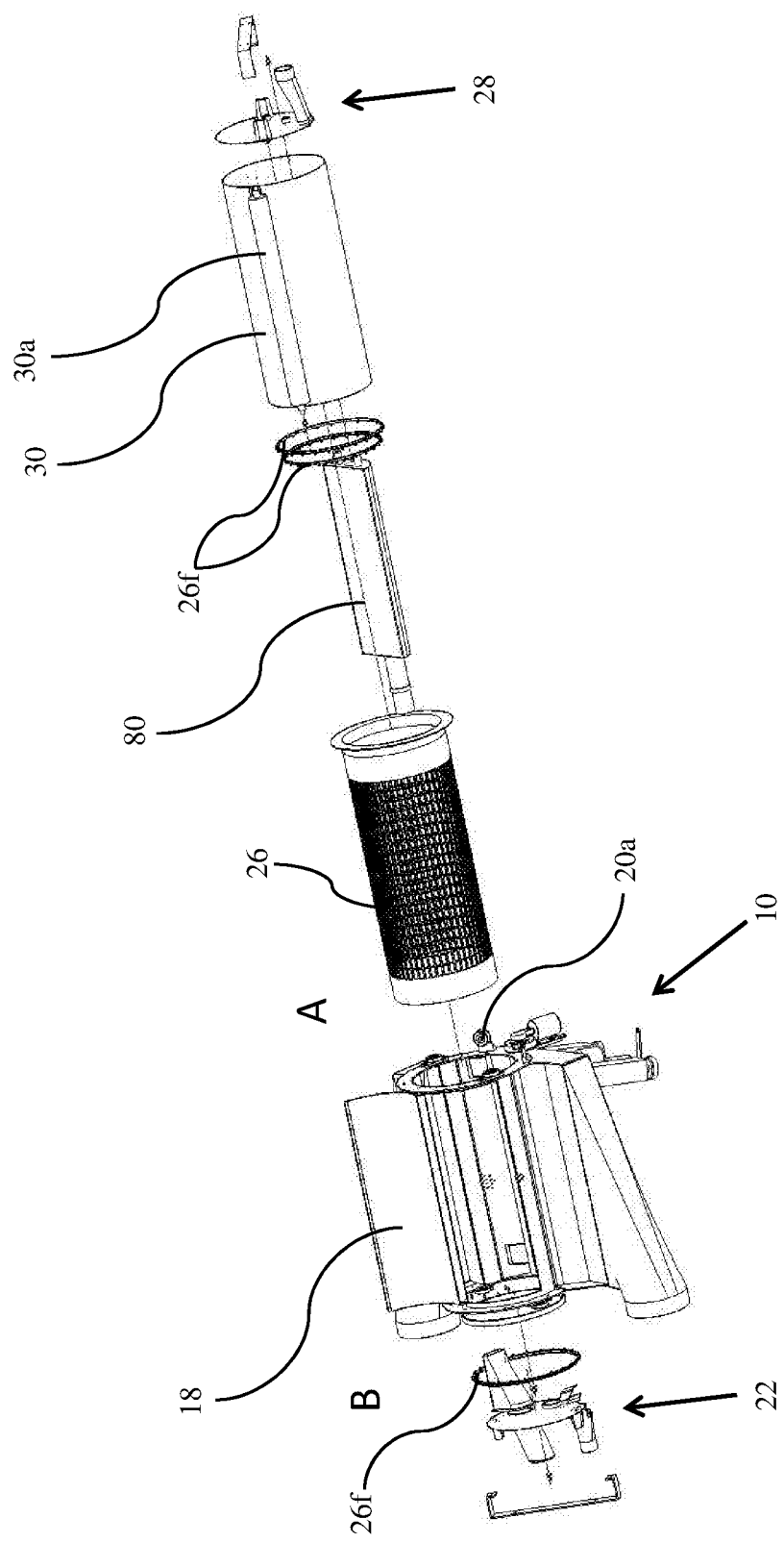
FIG. 12 is an exploded view of the assembly of components in accordance with one embodiment of the invention.

FIG. 12 is an exploded view of the system and shows how a drum 26 is configured to the system during system assembly. As shown, an RVT 10 will be typically angled downwardly from the upstream end A to the downstream end B. The drum 26 is inserted into the upstream end of the RVT such that the flange 26a rests upon the axial load wheels 20a. Guide rods 12f ensure alignment as the drum is inserted. As such, in this embodiment, due to the angle of the RVT, the drum maintains its position within the RVT due to gravity. If it is desirable to run the RVT in a fully horizontal position, a second set of wheels (not shown) may be engaged with the flange to prevent axial movement of the drum within the RVT.

After the drum has been located, the waste manifold assembly 22 and inflow cover assembly may be configured to the RVT; however, in some embodiments, the waste manifold assembly may remain fixed. The inflow cover assembly is then connected to drum support 12a. Appropriate gaskets 26f may be operatively configured to the inflow cover assembly, waste manifold assembly and drum supports for sealing. Prior to closing, a distribution plate may be inserted if the system is so configured.

The screen 30 is connected to the drum 26 as described above through cover 18.

Vacuum Equipment

Figure 14:
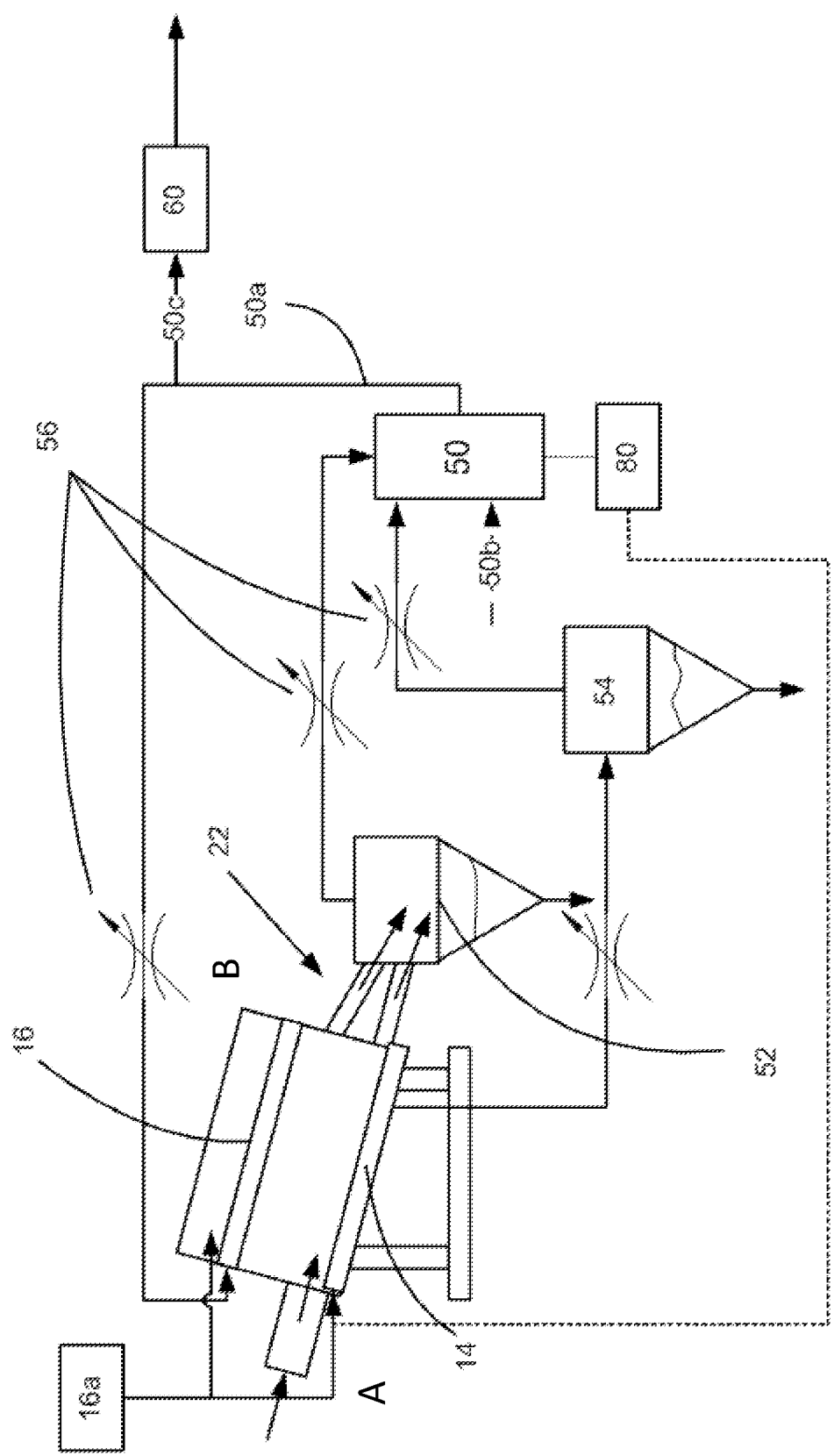
FIG. 14 is a schematic view of a complete RVT and vacuum system in accordance with one embodiment of the invention.

As shown in FIG. 14, the system is configured to appropriate vacuum equipment to enable separation of the solid and liquid components of the slurry. One or more vacuum sources 50 are configured to the fluid manifold 14 and waste manifold assembly 22 in order to apply vacuum pressure to these systems. In addition, the waste manifold assembly is connected to a solids/gas separator 52 and the fluid manifold is connected to a liquid/gas separator 54.

In operation, as fluid is recovered from the fluid manifold, the fluid will pass into the liquid/gas separator 54 where liquid will collect for removal. In the case of drilling fluid, the drilling fluid will generally be recovered for return to the drilling operations.

Similarly, as solids are recovered from the waste manifold assembly 22, the solids will pass into the solids/gas separator 52 where solids will collect for removal. In the case of drill cuttings, the drill cuttings will be recovered for further treatment and/or disposal.

As shown in FIG. 14, each of the liquid/gas 54 and solids/gas 52 separators are connected to the vacuum source 50, however, separate vacuum systems may be utilized. Appropriate valves 56 may be configured to the piping system to individually control air flow through each piping system. Further, in order to preserve heat within the system, outflow 50a from the vacuum 50 may be used as the air supply for the cleaning manifold 16. Thus, in this embodiment, the vacuum pump will draw air through each of the fluid and waste manifolds (ie. by creating a negative pressure) and the exhaust air from the vacuum is then used to create a positive pressure within the fluid manifold. As a result, as the system is substantially sealed, air within the system will be substantially recycled. It should however be noted that as a result of resistances and leakages within the system, some make up air 50b will be required and/or an air outlet 50c is required. Preferably, a degree of air exchange is desired to decrease the humidity of the system as well as to enable the removal of volatile gases and/or volatile organic compounds (VOC). Appropriate gas sensors and/or valve and vents may be configured to the system to both monitor and control gas concentrations in the event that unsafe concentrations of particular gases are measured. VOCs may be removed from the system in a controlled manner for subsequent combustion. Importantly, and from an environmental perspective, the subject system can be used to prevent the release of environmentally damaging VOCs to the environment.

Furthermore, a substantially closed system will preserve heat which depending on atmospheric conditions may be helpful in increasing the temperature of the system and thereby reduce fluid viscosities (in the case of oil-based drilling fluids) and thereby enable finer screens to be run. This may also be particular important when operating the system in cold climates where the ambient air temperature may in the range of −30 to −40° C. in which case the closed system can maintain a higher temperature within the system which will have a positive effect on fluid viscosities (i.e. lower viscosities) within the system that will improve separation efficiencies. The air may also be directly heated by an external heat source if desired (not shown). As noted above, as the air being used within the system will often contain volatile organic compounds (VOCs), the VOCs may be directed to a combustion chamber/system 60 (eg. a furnace or diesel engine) where they are burnt without being released to the atmosphere. In addition, this combustion may be used as a heat source to provide heating to the RVT or other equipment.

As also shown in FIG. 14, the system includes an electronic control system (ECS) 80 that generally enables the speed of rotation and vacuum pressures within the one or more vacuum systems to be set. In the embodiment where the fluid manifold may have zones, the ECS may also be used to set the vacuum pressures in each zone. It should be noted that while FIG. 14 shows a single vacuum system, separate vacuum systems may be utilized with an appropriate manifold to enable the control of vacuum in each location of the system.

It should also be noted that the ECS may enable control of other operational parameters including the angle of tilt, the introduction of air currents within the drum, vacuum pressures and other parameters that may be adjusted singly or in combination to effect a desired cleaning level.

Multiple RVT systems may also be configured in parallel to enable higher processing volumes. Systems may also be configured in series if necessary to enable processing in stages. RVT systems having different drum diameters and lengths may be used to provide control over a wider range of processing parameters. That is, a smaller secondary system in series may be used to provide additional cleaning to recovered drill cuttings.

Importantly, in the embodiment where a waste manifold only extends along a portion of the drum, particles are subjected to a rolling motion as they move up and fall down the rotating drum. This has the effect of ensuring that particles randomly come into contact with the drum and otherwise are continuously being separated from one another during the separation process. In one embodiment, in order to prevent particles from impacting with one another if they are dropping from a higher region of the drum to a lower region of the drum, the interior of the drum may be provided with a distribution plate 80 (as described above) extending across the length and width of the drum that absorbs the impact and/or directs a falling particle from one side of the drum to another. Experimentally, it has been observed that liquid-saturated particles subjected to a tumbling process in a gas environment (i.e. a combined solid/liquid/gas process within a rotating drum) will dry more rapidly (particularly within a heated or partially heated chamber) as compared to a liquid/solid separation process as may be observed on a shaker screen where the particles are not subjected to movement through a gas phase.

Figure 13:
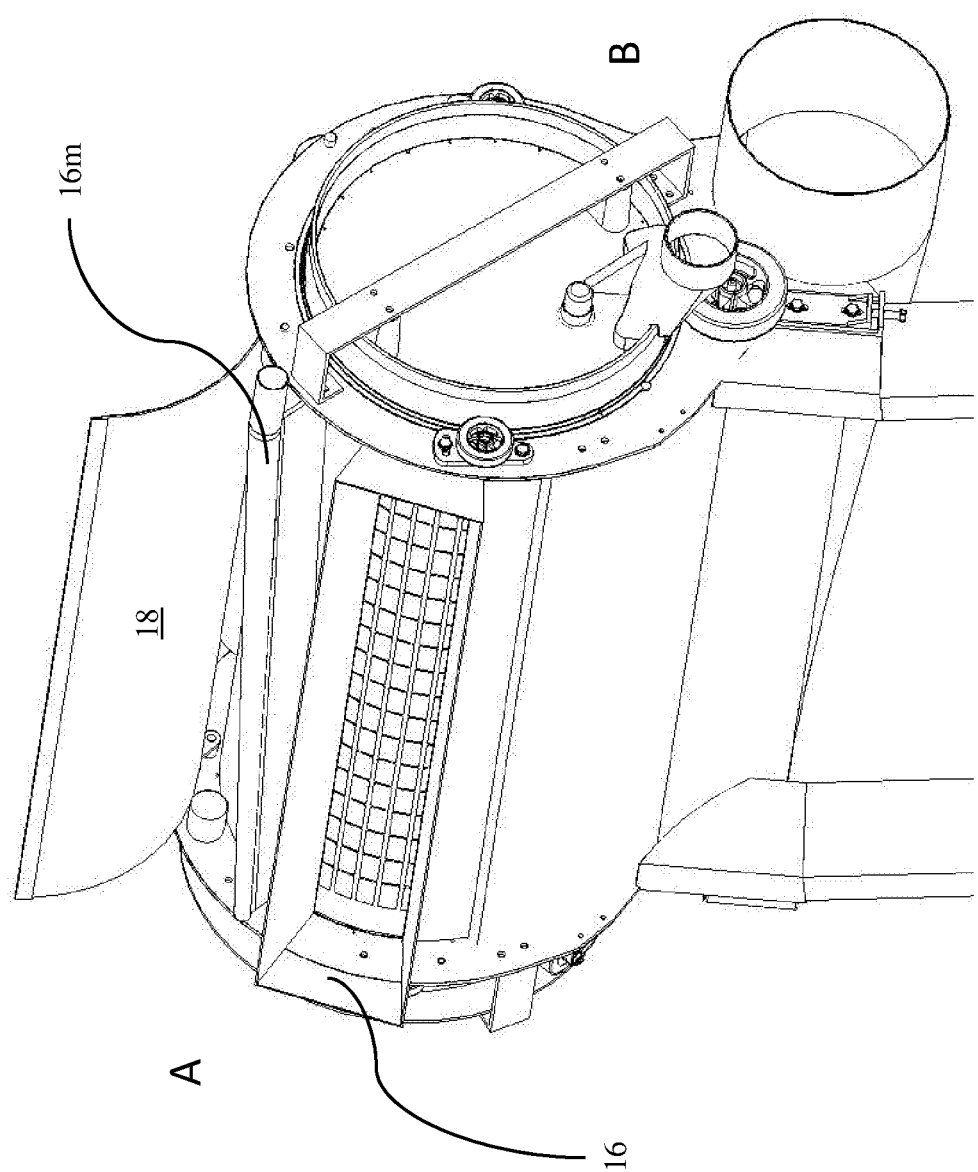
FIG. 13 is a perspective view of an RVT system in accordance with another embodiment of the invention.

Further still, as shown in FIG. 13, a compressed air source may be configured within or after the cleaning manifold to apply a high pressure air source to the exterior of the screen to assist in cleaning the screen, if necessary. In particular, if a very fine screen is being run, additional cleaning force may be required to ensure that solid particles do not adhere to the screen.

As shown in FIG. 13, a cleaning nozzle 16m is configured after the cleaning manifold to apply a high pressure air to the exterior of the screen. FIG. 13 also shows an embodiment of the cleaning manifold where the cleaning manifold is not connected to an air pressure system. In this case, with or without the cleaning nozzle 16m, air will simply be drawn through the cleaning manifold as a result of the generally negative pressure exerted by the fluid and waste manifolds.

RVTA General Operation and Design

With reference to FIGS. 15-22, embodiments of a rotating vacuum table (RVTA) separator 100 are described. While the rotating table separator is described as a system for separating drilling fluid and drill cuttings, it is understood that the RVTA may be used to separate other fluids/solids from one another.

General Design and Operation

Figure 16:
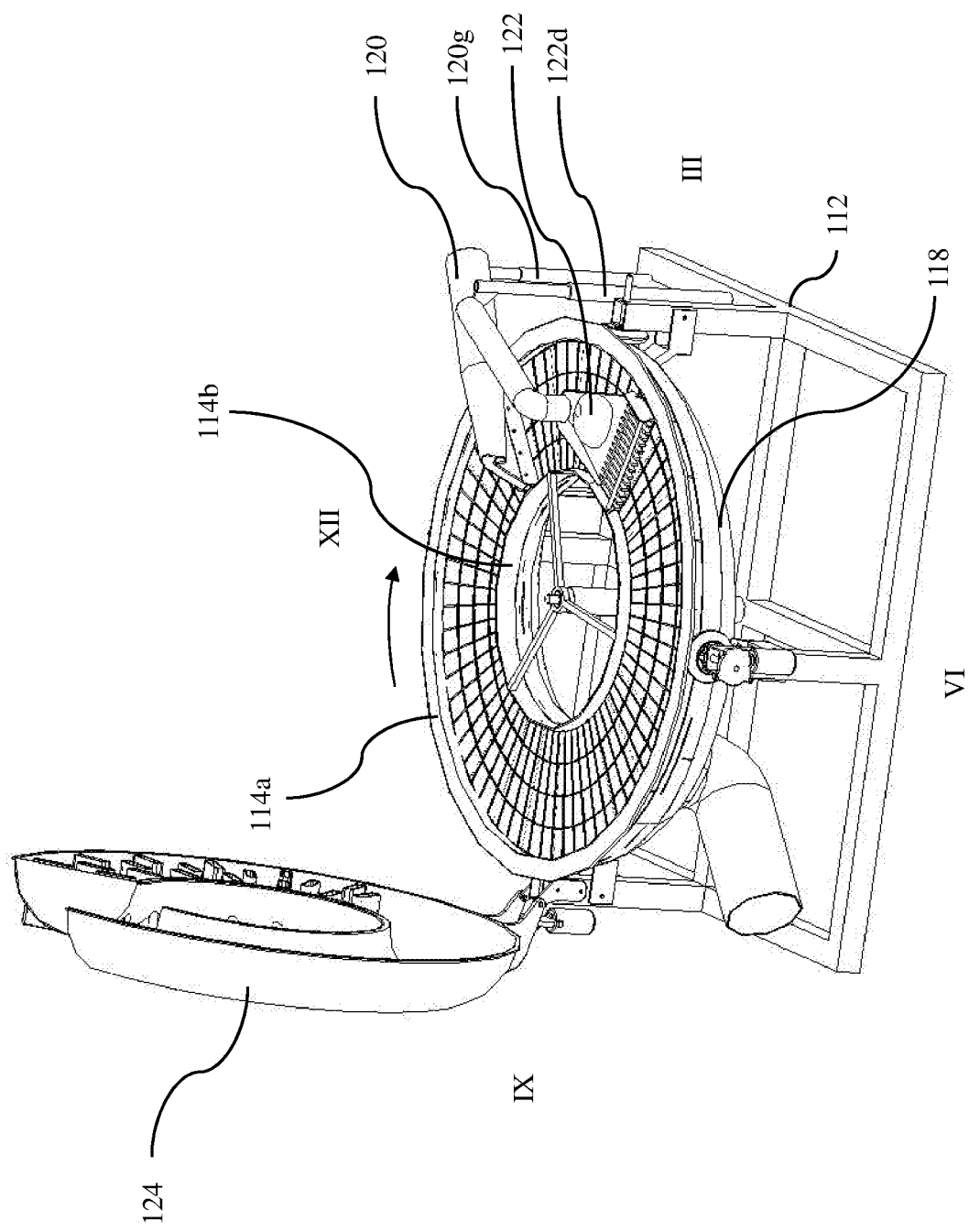
FIG. 16 is a front perspective view of a RVTA in accordance with one embodiment of the invention showing a cover in an open position.
Figure 16A:
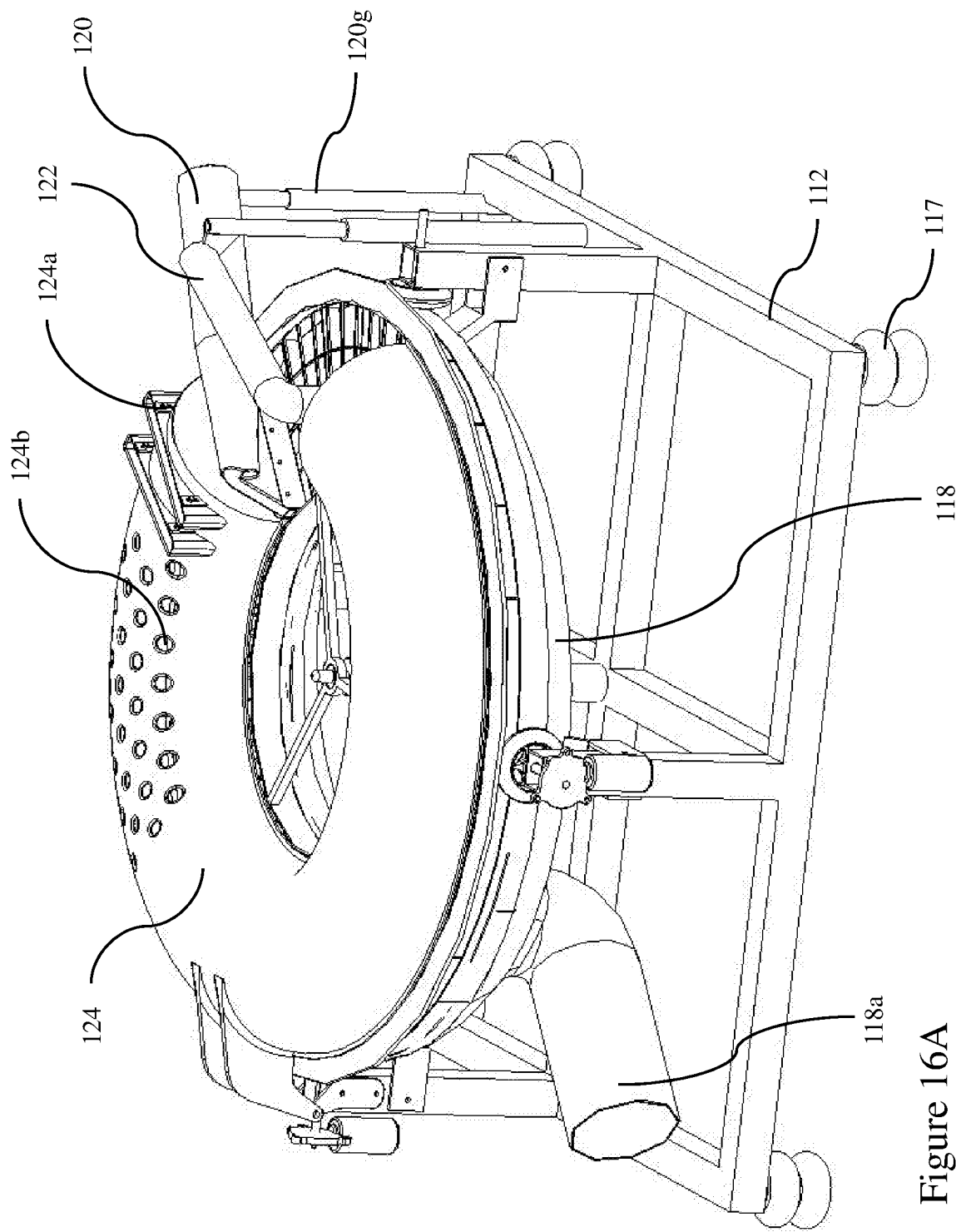
FIG. 16A is a front perspective view of a RVTA in accordance with one embodiment of the invention showing a cover in a closed position. An optional vibration system is also shown.

As shown in the Figures, a rotating table separator (RVTA) 100 generally includes a support frame 112, a rotating screen support 114 configured to the support frame 112, a screen 116 supported by the rotating screen support 114, a fluid manifold 118 configured to the underside of rotating screen support 114, a waste manifold 120 operatively positioned above the screen 116 surface and an inflow sluice 122 operatively positioned above the screen surface. The RVTA may also include a cover 124 connected to the frame 112 that is moveable from an open position (FIG. 16) to a closed position (FIG. 16A). In operation, the rotating screen support 114 and screen 116 rotate relative to the fluid manifold 118, waste manifold 120 and inflow sluice 122. At least one vacuum source 150 (FIG. 22) is configured to each of the waste manifold 120 and fluid manifold 118 to apply vacuum to the upper and lower sides of the screen 116 respectively as the screen is rotating relative to each of the waste manifold 120 and fluid manifold 118.

A slurry of drill cuttings and drilling fluid is introduced onto the screen 116 at a position of the rotating table 100 via the inflow sluice 122. As shown in FIG. 16, the screen support 114 of the RVTA 100 is rotated in a clockwise direction such that the slurry is carried along the screen in the clockwise direction while vacuum is being applied to both the fluid manifold 118 and to the waste manifold 120.

Of course, the screen can be rotated in the opposite direction if the system is set up for counter-clockwise rotation.

For the purposes of illustration in this description, positions of the RVTA 100 are correlated to the positions of a clock with the "top" of the rotary table being generally referred to as the 12 o'clock position (designated XII in FIG. 16 together with III, VI and IX representing other clock positions). As shown, the waste manifold 120 is configured to the top of the screen at approximately the 2 o'clock position and the inflow sluice 122 is configured to the top of the screen 116 at the 4 o'clock position.

The fluid manifold 118 (FIG. 15) extends around the underside of the rotary table and is designed to collect fluids passing through the screen 116. Generally, the fluid manifold will only enable vacuum to be applied between the inflow sluice 122 position and before the waste position i.e. from approximately the 4 o'clock position to approximately the 1 o'clock position. With vacuum being applied to the fluid manifold, liquid within the slurry is drawn through the screen leaving solids within the slurry on the upper surface of the screen. As the solids reach the waste manifold 120, an upward vacuum pressure is applied by the waste manifold to the upper surface of the screen 116 that causes the solid materials to be removed from the screen through the waste manifold 120. Thus, the RVTA provides a fluid removal phase between the inflow sluice 122 and waste manifold 120 and a solids removal phase at the waste manifold.

In addition, by applying vacuum in opposite directions (i.e downwards within the fluid collection zone and upwards in the waste removal zone) at different positions of the rotary table 100, both fluids and solids are effectively removed from the RVTA thus enabling continuous operation for the separation of solids and liquids. Moreover, the application of vacuum pressure in opposite directions during a single revolution of the screen provides continuous cleaning of the screen as each section of the screen passes the waste manifold during a single revolution whereby air is drawn upwardly through the screen to dislodge smaller particles that may have become lodged within the screen during the fluid removal phase.

In one embodiment of the RVTA, the RVTA may be made to vibrate in a manner similar to that of a conventional shaker in order to impart additional separation forces on drilling fluid and drill cuttings. In this case, the drive system and/or frame may be mounted on a vibration source to impart a vibration to the screen. Thus, the RVTA can operate in a manner similar to that of a conventional shaker whilst still providing continuous cleaning of the screen which is not possible with a conventional shaker.

As shown in FIG. 16A, a vibration suspension and source 117 may be configured to the RVTA. In this case, the clearance between the inflow sluice and waste manifold may be increased relative to the screen as necessary to prevent impact with the screen.

Additional details of the design and operation of the RVTA are described below.

Frame 112

Figure 15:
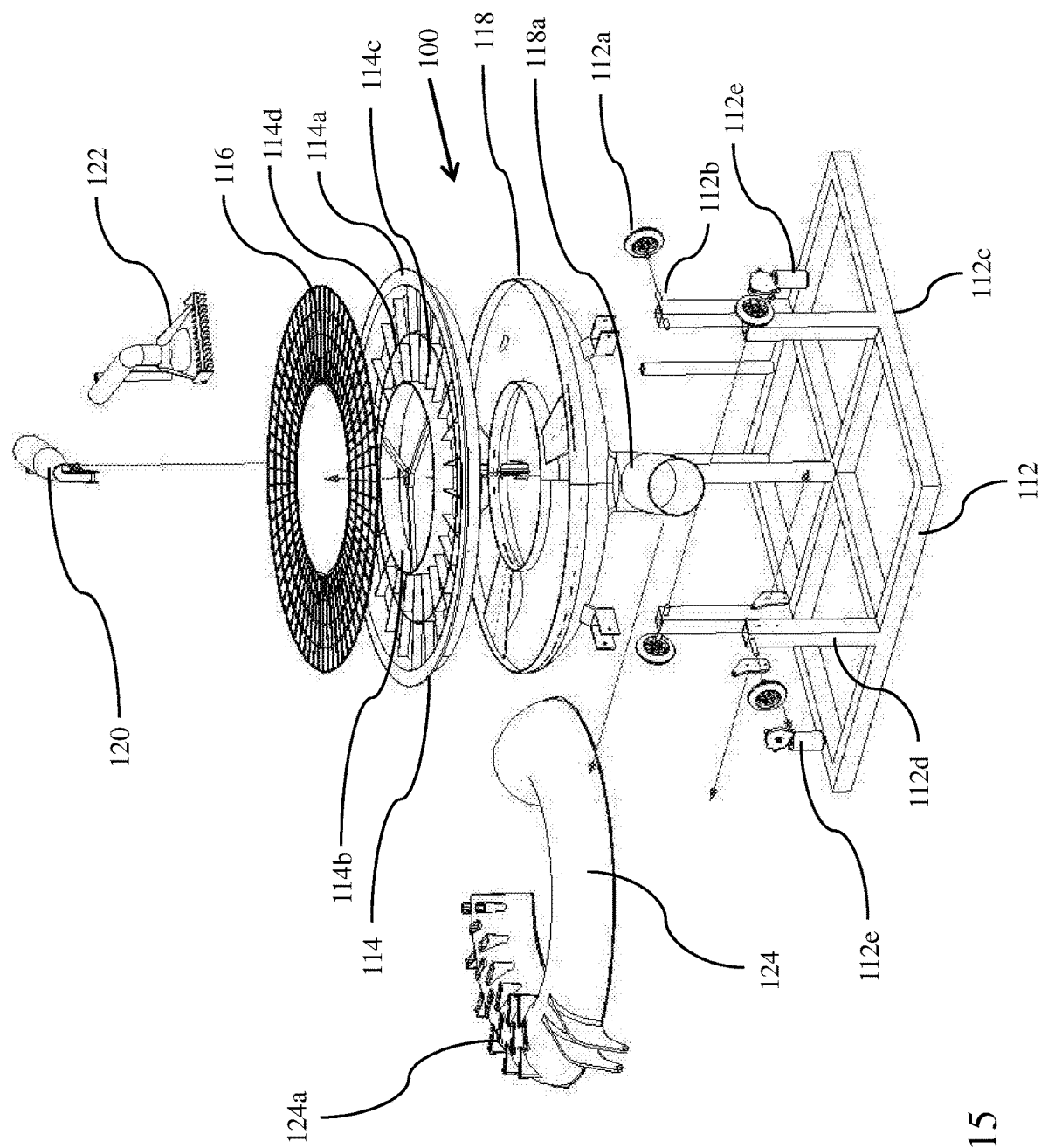
FIG. 15 is an exploded perspective view of a rotary vacuum table (RVTA) separation system in accordance with one embodiment of the invention.

The frame 112 generally supports the rotating screen support 114 through a roller support system such as roller wheels 112a supported on axles 112b. The frame may include a base 112c and vertical support members 112d. One or more roller wheels 112a will be actively driven by at least one drive motor 112e operatively connected to at least one of the roller wheels 112a. It should be understood that various drive mechanisms can be employed including drive belts/chains/gears/sprockets etc. as may be understood by those skilled in the art. However, preferably in order to ensure that the rotating screen support 114 remains balanced on the drive system, if two drive motors are employed, it is preferred that such drive motors are configured to adjacent rollers (i.e at 90 degrees relative to one another) as opposed to diametrically opposed rollers. That is, as driven rollers may wear more quickly that non-driven rollers, it is preferred that the driven rollers remain in contact with the rotating screen support 114 as they wear which is ensured if the rollers are adjacent to one another on a four leg frame system 112 as shown in FIG. 15.

In one embodiment, the frame 112 may also include means enabling the screen 116 to be inclined during operation. If the system is to be inclined, it will generally be inclined in a direction such the waste manifold 120 is at the lowest position such that gravity enhances removal of solid materials from the screen surface. Inclining means could include various hydraulic or mechanical tilting means that may enable inclination of the system from 0 to about 30 degrees. As with the RVT, inclination can promote tumbling of particles through a gas phase.

Figure 16B:
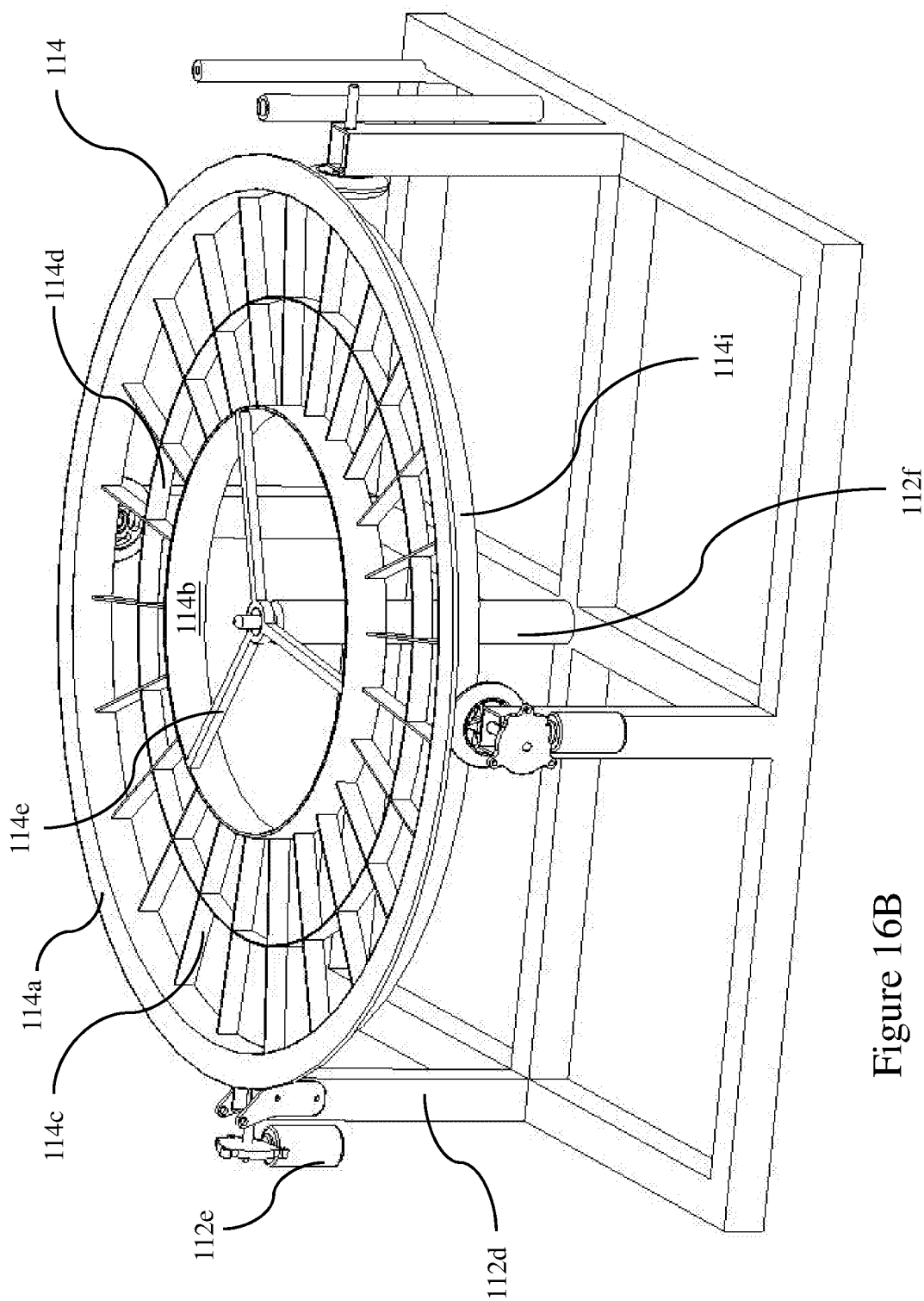
FIG. 16B is a perspective view of a RVTA showing a support system for a rotating screen support with a central spindle in accordance with one embodiment of the invention.
Figure 16C:
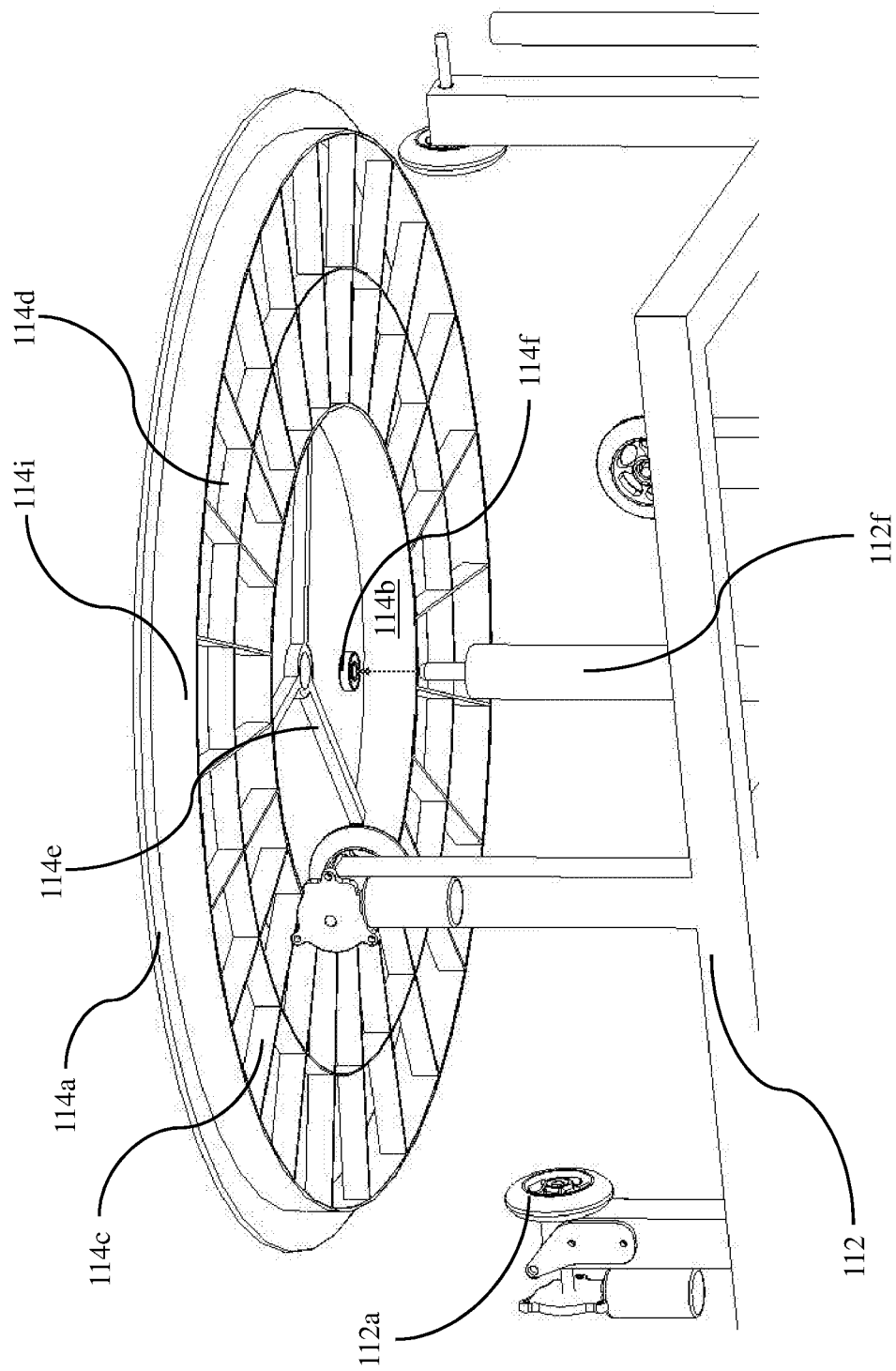
FIG. 16C is a lower perspective view of a RVTA showing a support system for a rotating screen support with a central spindle in accordance with one embodiment of the invention.

As shown in FIGS. 16B and 16C, the frame may also include a central spindle 112f that is used for centering rotating screen support 114 within the frame in which case the rotating screen support will include appropriate supports 114e and bearing 114f.

Screen Support 114

The screen support 114 generally includes an outer support flange 114a that engages with the roller wheels 112a. The outer support flange 114a has an under surface that rests on top of the roller wheels 112a allowing the outer support flange 114a to rotate about a vertical axis. The screen support 114 also includes an outer flange ring 114i, and an inner hoop 114b connected to the outer flange ring 114i via ribs 114c. In one embodiment, the inner hoop 114b may be a flange that is also supported by additional roller wheels (not shown) or by spindle 112f.

Additional inner hoops 114d may be provided as necessary for appropriate screen support and structural stiffness.

Preferentially, the outer flange ring 114i, outer support flange 114a and inner hoop 114b extend above the ribs 114c such that when a screen 116 is placed on top, the screen 116 is also below the outer support flange 114a and inner hoop 114b, so as to prevent spillage of slurry materials off the sides of the system 100 during operation.

As shown, the screen support 114 is a ring with a void interior, however, it is understood that the screen support 114 may be a disk without an interior void opening adjacent the axis of rotation. In this case, the screen 116 would be a corresponding disk. Similarly, in this case the fluid manifold 118 would also be configured to the complete underside of the disk.

Screen 116

Figure 18:
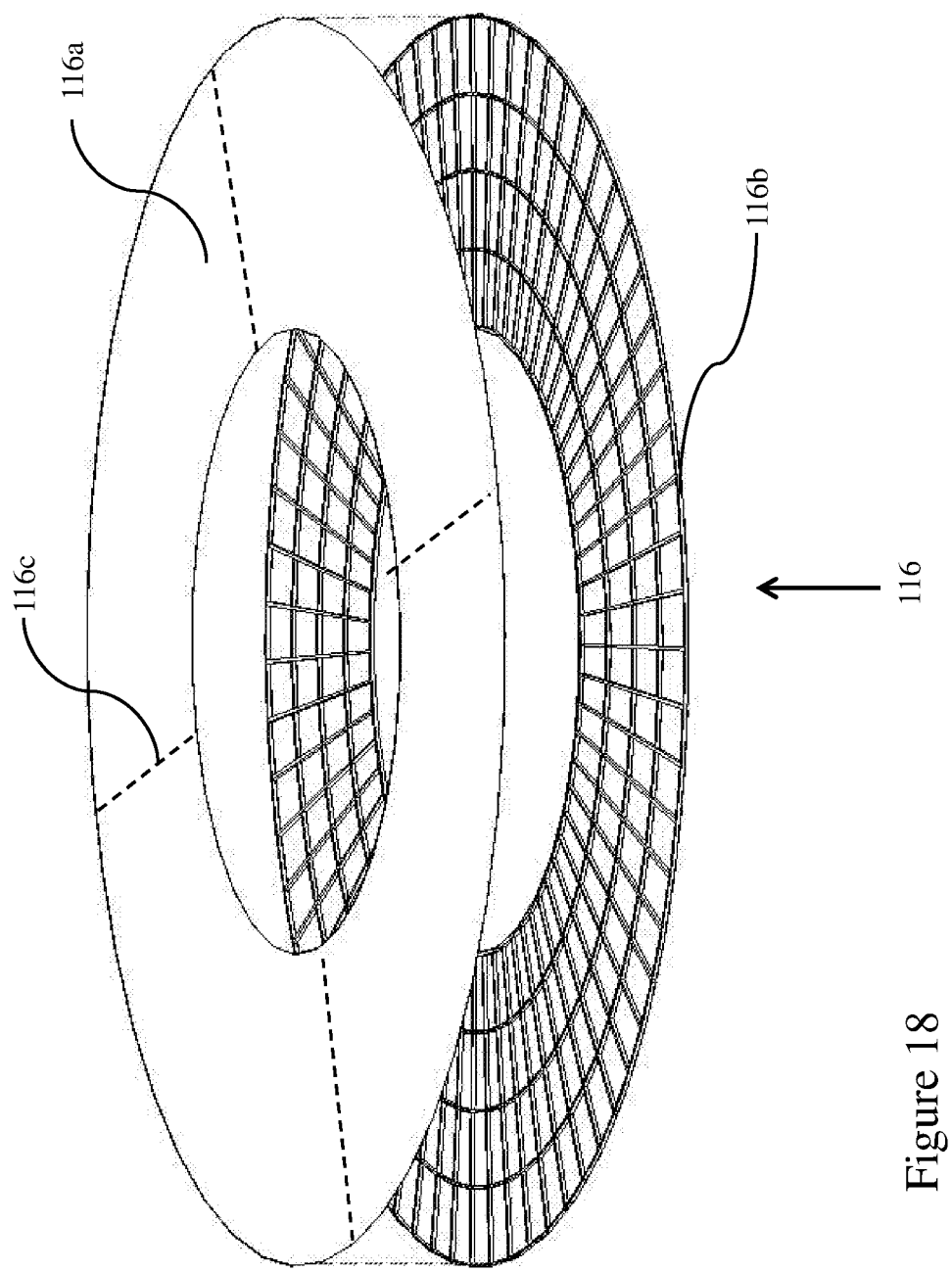
FIG. 18 is an exploded perspective view of a screen and screen backing in accordance with one embodiment of the invention.

The screen 116 is supported by the screen support 114 and corresponds in shape and size by the area defined by the inner dimensions of the outer flange ring 114i and inner hoop 114b. As shown in FIG. 18, the screen 116 generally comprises an upper small mesh size screen 116a adhered to a perforated backing 116b that provides support and strength to the screen. For the purposes of clarity, the drawings generally only show the perforated backing 116b.

In the case of a system designed for drilling fluid separation, the screen will typically have a mesh size smaller than 200 mesh, typically 200-400+ mesh. However, in other fluid/solid separations, larger screen mesh sizes (less than 200 mesh) may be used (eg. approximately 80 mesh).

In one embodiment, the upper screen 116a is supported by a metal backing material. In other embodiments, the screen may be configured to a polymeric backing material including rubbers or plastics.

The screen 116 may also be segmented into multiple sections as shown by dotted lines 116c to facilitate screen replacement.

Fluid Manifold 118

The fluid manifold 118 is configured to the underside of the rotating screen support 114 and connected to the frame 112 with brackets 118h so as to collect fluids passing through the screen 116. In the design shown in FIG. 15, the fluid manifold 118 is configured to the complete underside of the rotating screen support 114 primarily for the purposes of manufacturing simplicity but also to allow the capture of any stray fluids that remain adhered to the screen, rotating screen support including the ribs. However, importantly, the fluid manifold need only be configured from the slurry entry point (i.e. slurry sluice 122) to the waste manifold 120. Preferably, at the waste manifold position, a venturi plenum 118b is provided for direct air flow from the underside of the fluid manifold 18 to the screen.

The fluid manifold will preferably have a non-horizontal or inclined lower surface such that fluids contacting the fluid manifold will naturally flow to the fluid manifold outlet 118a. Vacuum pressure is also applied through fluid manifold outlet 118a. In order to prevent build-up of materials within the fluid manifold, cleaning systems including compressed air as described below may be provided within fluid manifold to assist in the removal of such materials.

Figure 17:
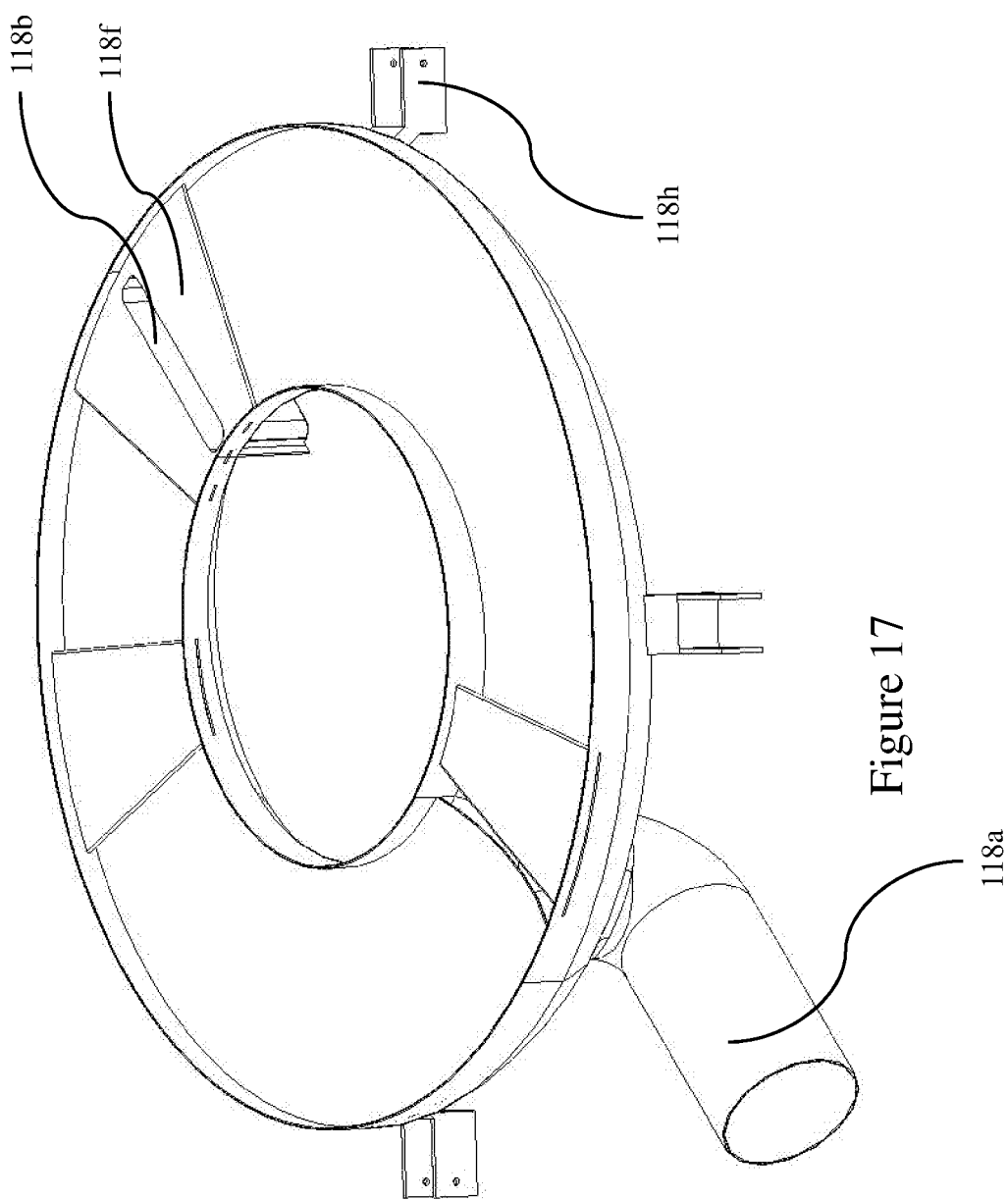
FIG. 17 is a perspective view of a fluid manifold of a RVTA in accordance with one embodiment of the invention.
Figure 17A:
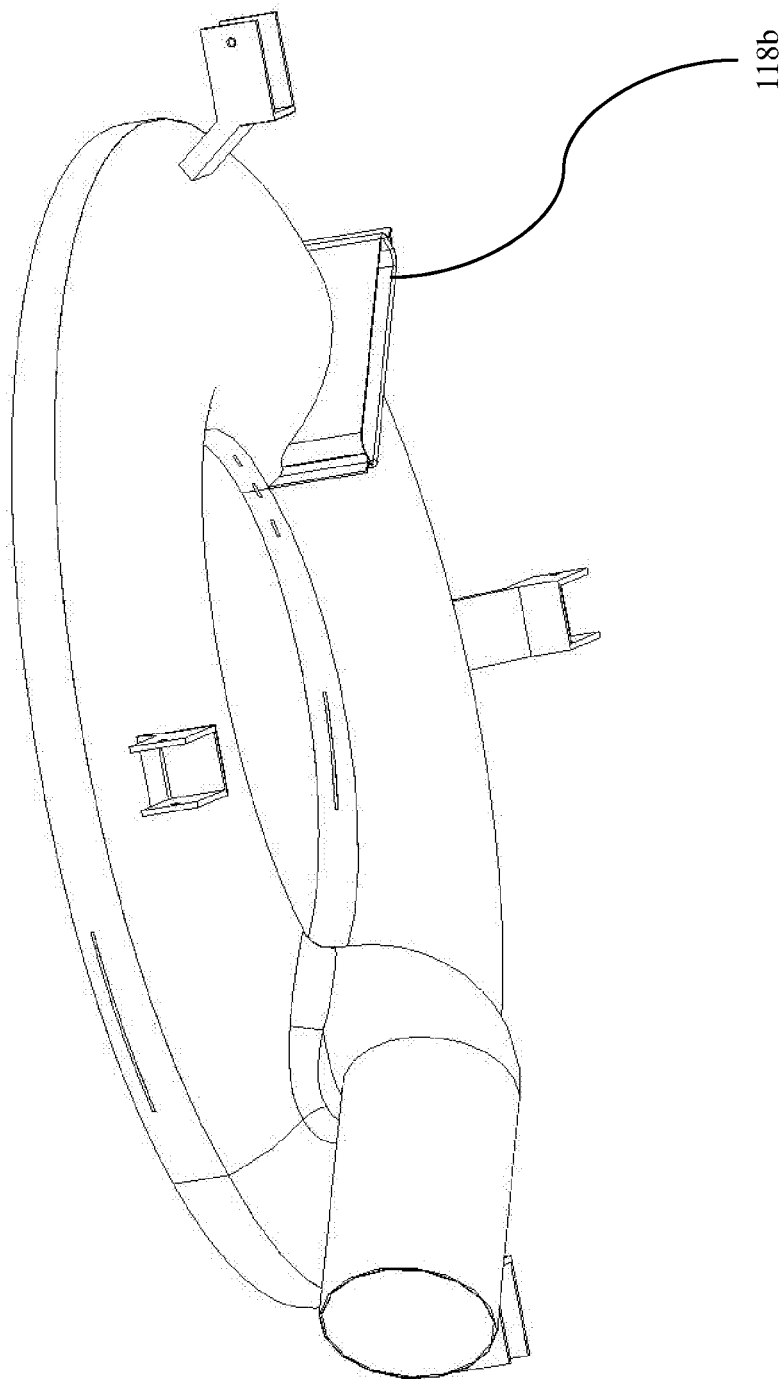
FIG. 17A is an underside perspective view of a fluid manifold of a RVTA in accordance with one embodiment of the invention.

FIGS. 17 and 17A show a fluid manifold with relatively shallow sides and the fluid manifold outlet configured to one side of the fluid manifold. However, it is understood that the fluid manifold can be constructed with a substantially greater depth and with steeper sides so as to facilitate the flow of fluid from the fluid manifold. Similarly, the fluid manifold outlet can be configured at any lower position of the fluid manifold. It is understood that the height of the frame can be adjusted to accommodate different heights of fluid manifolds.

In order to enable different strengths of vacuum to be applied to different zones of the fluid manifold, the fluid manifold may also include a series of baffles that restrict air flow through the fluid manifold. That is, in one embodiment, it may be preferred to apply a stronger, higher volume/air flow vacuum force through the sections of the fluid manifold closest to the waste manifold to ensure final cleaning of the solids before removal. Accordingly, baffles can be utilized to ensure different forces in different zones.

Figure 17B:
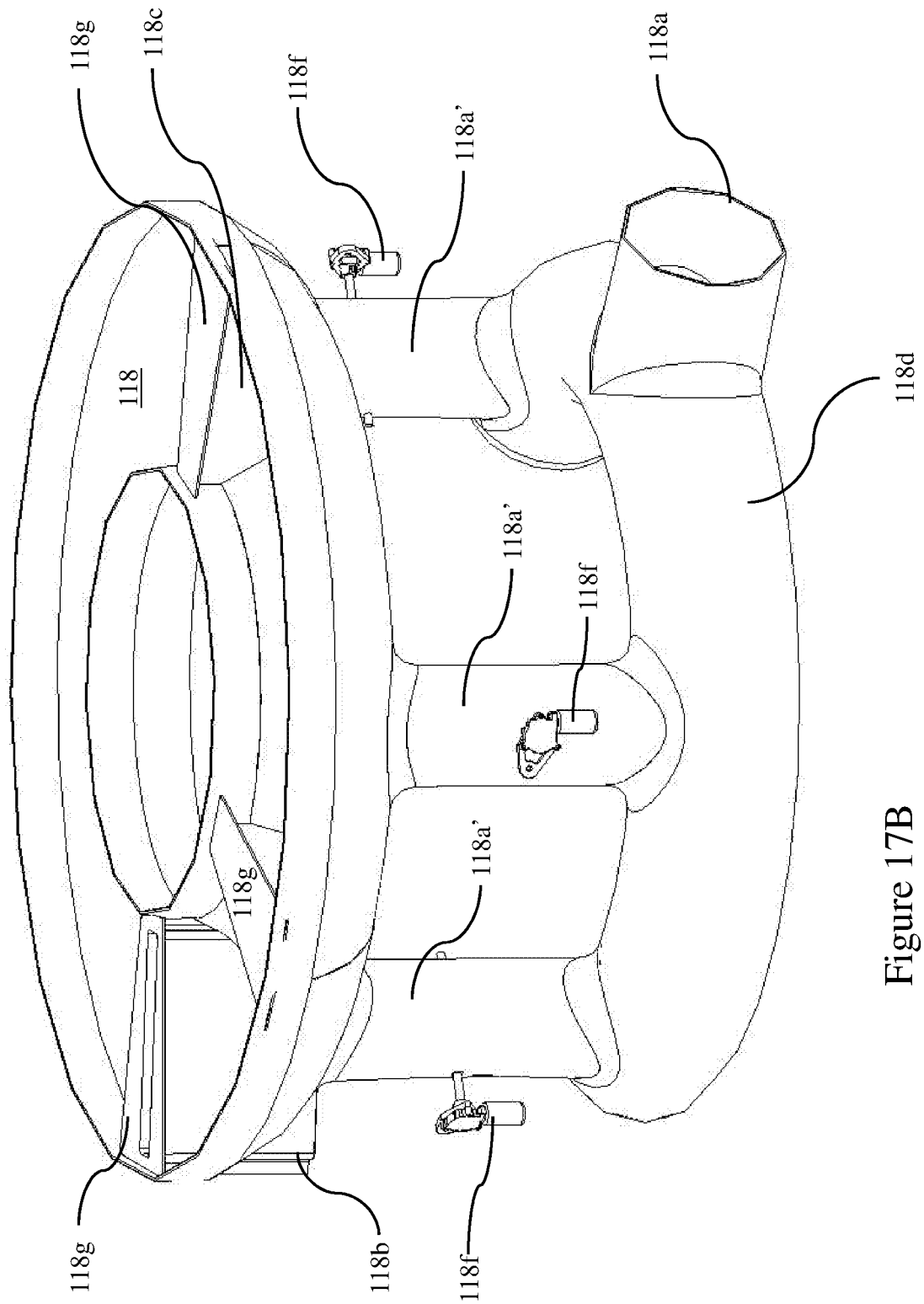
FIG. 17B is a perspective view of a fluid manifold of a RVTA having different vacuum zones in accordance with one embodiment of the invention.
Figure 17C:
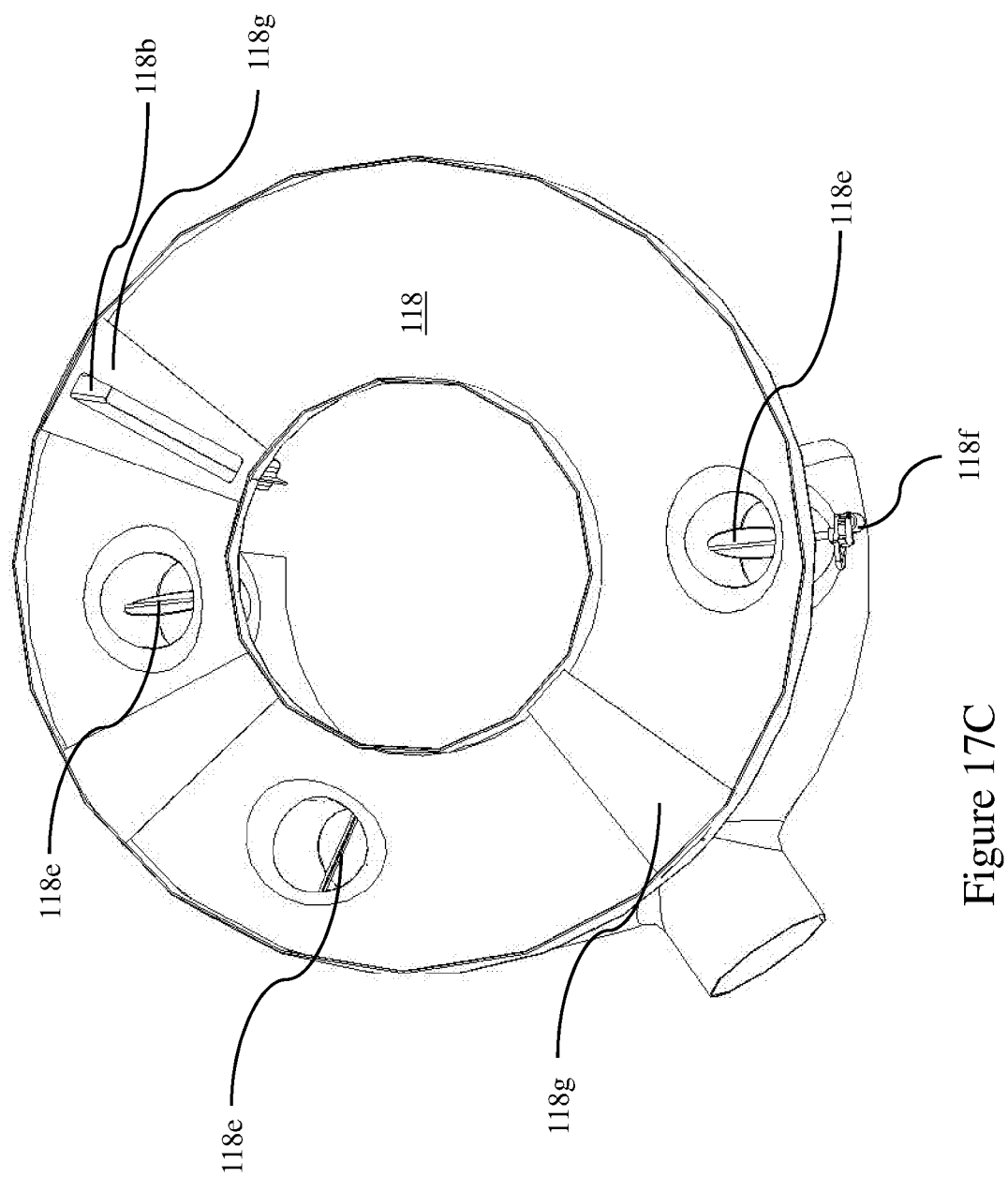
FIG. 17C is a perspective top view of a fluid manifold of a RVTA having different vacuum zones in accordance with one embodiment of the invention.
Figure 17D:
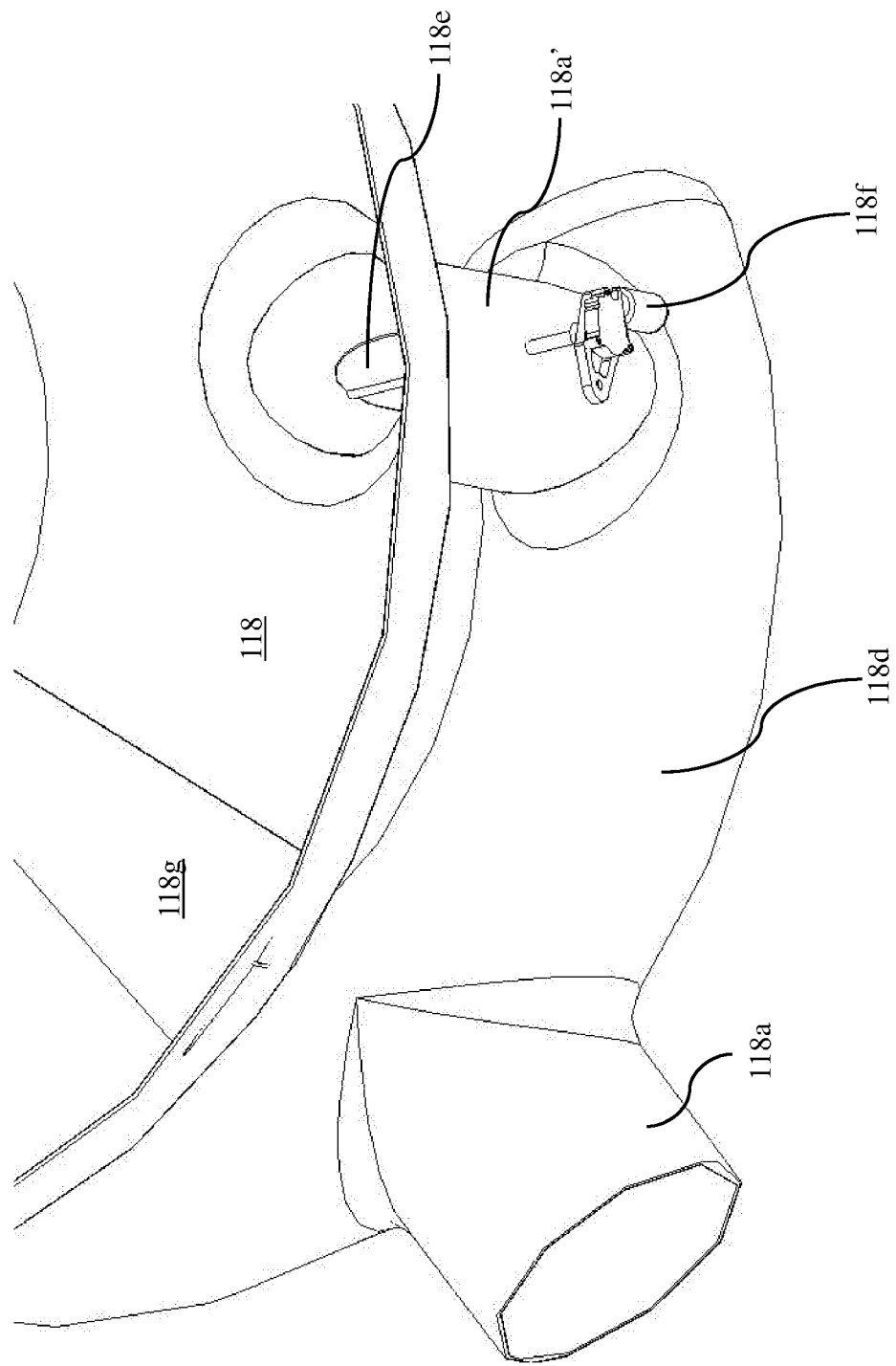
FIG. 17D is a perspective view of a throttle within one vacuum zone of a fluid manifold in accordance with one embodiment of the invention.
Figure 17E:
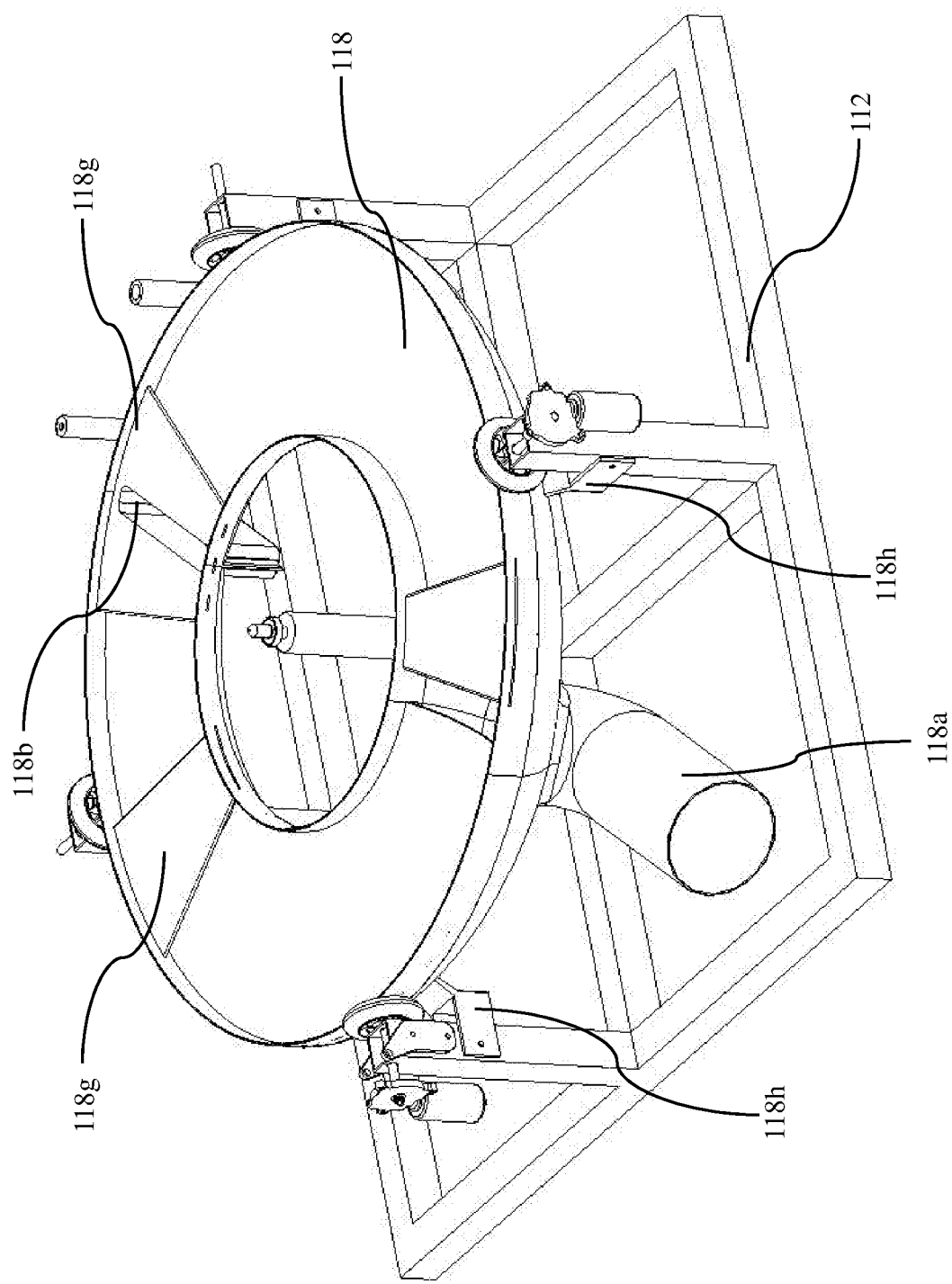
FIG. 17E is a perspective view of a fluid manifold configured to a frame with the rotating screen support removed.

In one embodiment, as shown in FIGS. 17B, 17C, 17D, baffles 118c fully seal off different zones of the fluid manifold. In this case, the fluid manifold 118 would be provided with individual outlets 118a' for each zone and each connected to a common manifold 118d which is connected to the vacuum source. In addition, as shown, each outlet 118a' may be provided with a throttle 118e and throttle control 118f be configured to each outlet allowing the vacuum in each zone to be controlled.

In those zones where fluid is not being collected, appropriate venturi plenums 118b will be provided to enable upward air flow through the screen and into the waste manifold 120.

As shown in FIGS. 17-17D, in order to ensure effective "sealing" of one zone to another, a horizontal plate 118g is provided atop a baffle that is designed to engage with at least one rib 114c of the screen support 114 at any particular moment during screen rotation. That is, in order to ensure that different vacuums can be applied to different zones, there must be minimal inter-zone openings to enable a desired vacuum pressure to be maintained in one zone relative to another. The horizontal plates 118g will generally have tapered sides that are substantially parallel to ribs 114c passing over them.

Figure 16D:
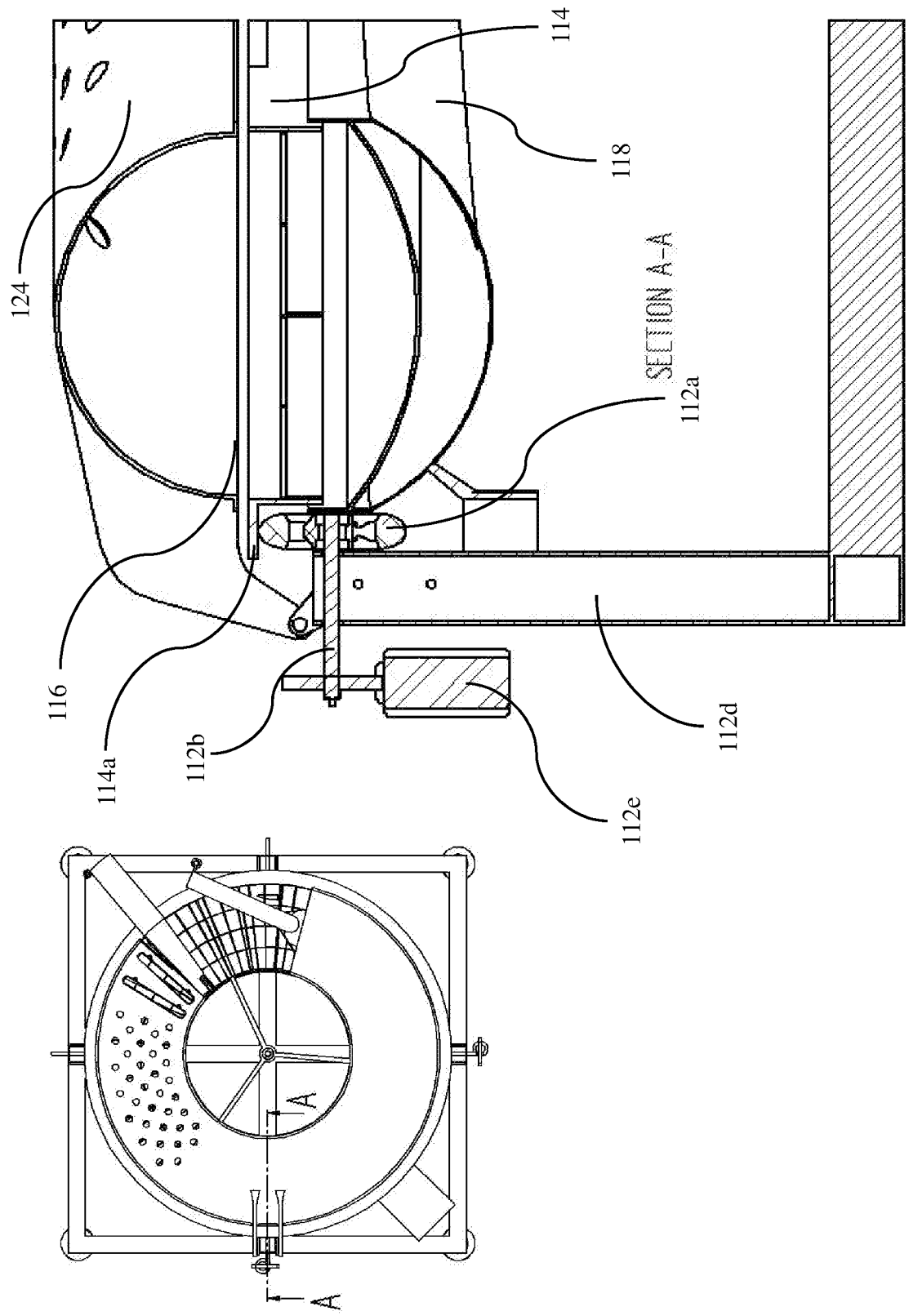
FIG. 16D is a cross-sectional view of RVTA at line A-A.

FIG. 16D shows a cross section of the RVTA with the cover 124 in the closed position.

Waste Manifold 120

Figure 19:
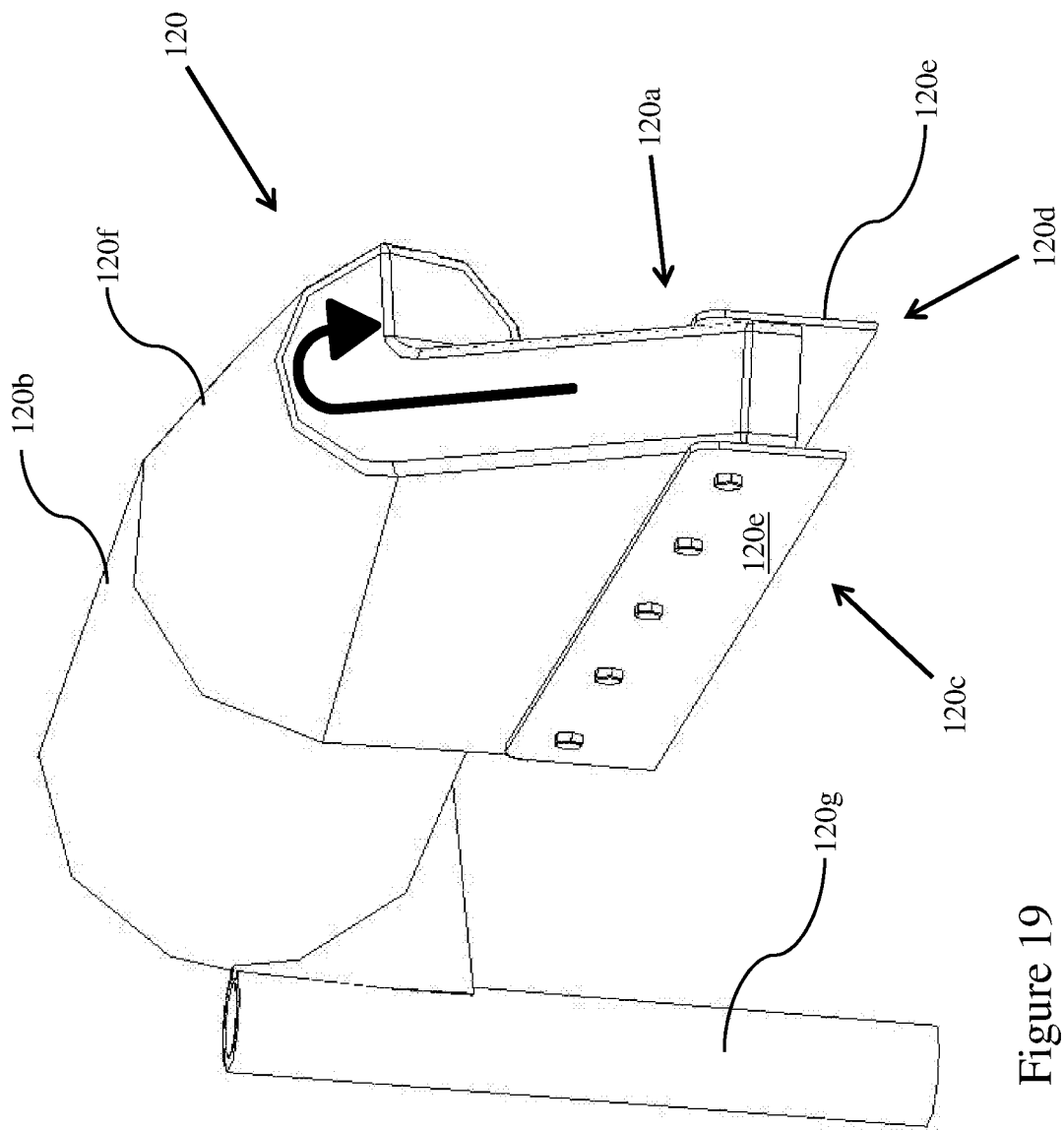
FIG. 19 is a perspective view of a waste manifold of a RVTA in accordance with one embodiment of the invention.

The waste manifold 120 generally comprises a plenum for operative engagement with the upper surface of the screen. As shown in FIG. 19, the waste manifold 120 includes an inlet plenum 120a and conveying plenum 120b.

The inlet plenum 120a has an upstream edge blade 120c and a downstream edge blade 120d that are generally parallel to one another and transverse to the direction of screen movement when positioned on the screen. The upstream edge and downstream edge include resiliently flexible blades 120e whose respective heights may be adjusted relative to the screen. Typically, the upstream edge blade will be positioned higher than the downstream edge blade to enable any larger particles to pass into the waste manifold without causing damage to the screen.

The conveying plenum 120b is connected to the inlet plenum in a manner to facilitate the generally upward movement of particles through the inlet plenum 120a to the generally horizontal movement of particles through the conveying plenum 120b in a manner that maintains movement through both. As such, it is preferred that the inlet plenum promotes cyclonic flow through the conveying plenum by means of a tangential inflow direction relative to the conveying plenum. This feature is important to prevent or minimize the deposit of material within the conveying plenum. The conveying plenum may also have tapering surfaces 120f to assist in the creation of cyclonic flows within the waste manifold.

In one embodiment, the waste manifold includes a second manifold adjacent the primary waste manifold that will serve primarily to induce airflow through the screen to effect thorough screen cleaning. A second waste manifold (not shown) may be substantially identical to the primary waste manifold and may simply be located in a downstream position, for example at the 3 o'clock position. A compressed air manifold (not shown) may also be configured to the underside of the screen in conjunction with the second waste manifold.

The waste manifold is preferably pivotable between an engaged and disengaged position to enable ready access to the screen for replacement. As shown in FIGS. 16 and 19, the conveying manifold 120b may be supported by a support member 120g that allows lifting and pivotal movement of the waste manifold between an engaged and disengaged position.

Inflow Sluice 122

Figure 21:
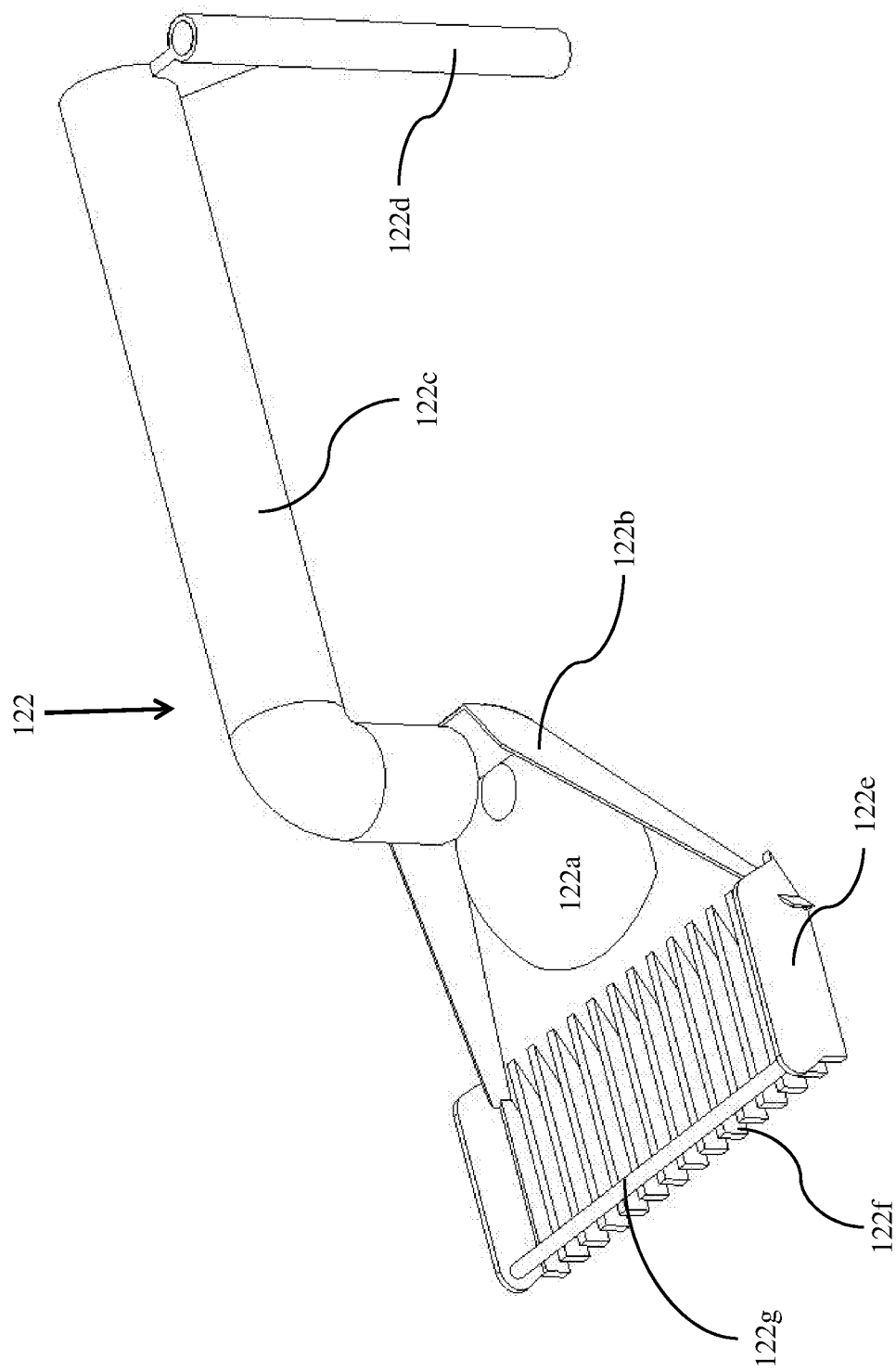
FIG. 21 is a perspective view of an inflow sluice in accordance with one embodiment of the invention.

The inflow sluice 122 operates to distribute a liquids/solids slurry on the screen. As shown in FIG. 21, the inflow sluice is generally an inclined pan 122a having sides 122b that spread the slurry over the width of the screen. An inflow duct/hose 122c receives the slurry from an appropriate source. The inflow sluice can be lifted and pivoted into position by sluice support arm 122d connected to the frame 112.

In one embodiment, the inflow sluice 122 further includes a large particle entrapment system 122e (LPES) that can prevent particles above a particular size to drop onto the screen which can be helpful in prolonging the life of a screen. The LPES, in one embodiment, includes a plurality of parallel tines 122f that are spaced apart at a desired spacing and that are parallel to the screen. A bar 122g provides an end stop at the end of the tines. As larger particles travel down the inclined pan, the spacing of the tines 122f prevents such particles from dropping on to the screen.

The LPES will also preferably be detachable from the inflow sluice to enable an operator to periodically remove the system for emptying. Generally, the LPES will not require frequent emptying but periodic monitoring by personnel can prevent potentially damaging particles from contacting the screen.

Cover 124

The system will preferably include a cover 124 that covers the upper surface of the screen during operation. The cover 124 serves to prevent the escape of potentially dangerous gases released from the slurry as well as to provide venting orifices that may be positioned to assist in the flow of air through the screen at particular locations.

The cover is preferably connected to the frame 112 in such a manner to enable ready access to the screen for replacement such as by a hinging mechanism. The cover or sections of the cover are preferably transparent to enable operators to observe the screen.

Figure 20:
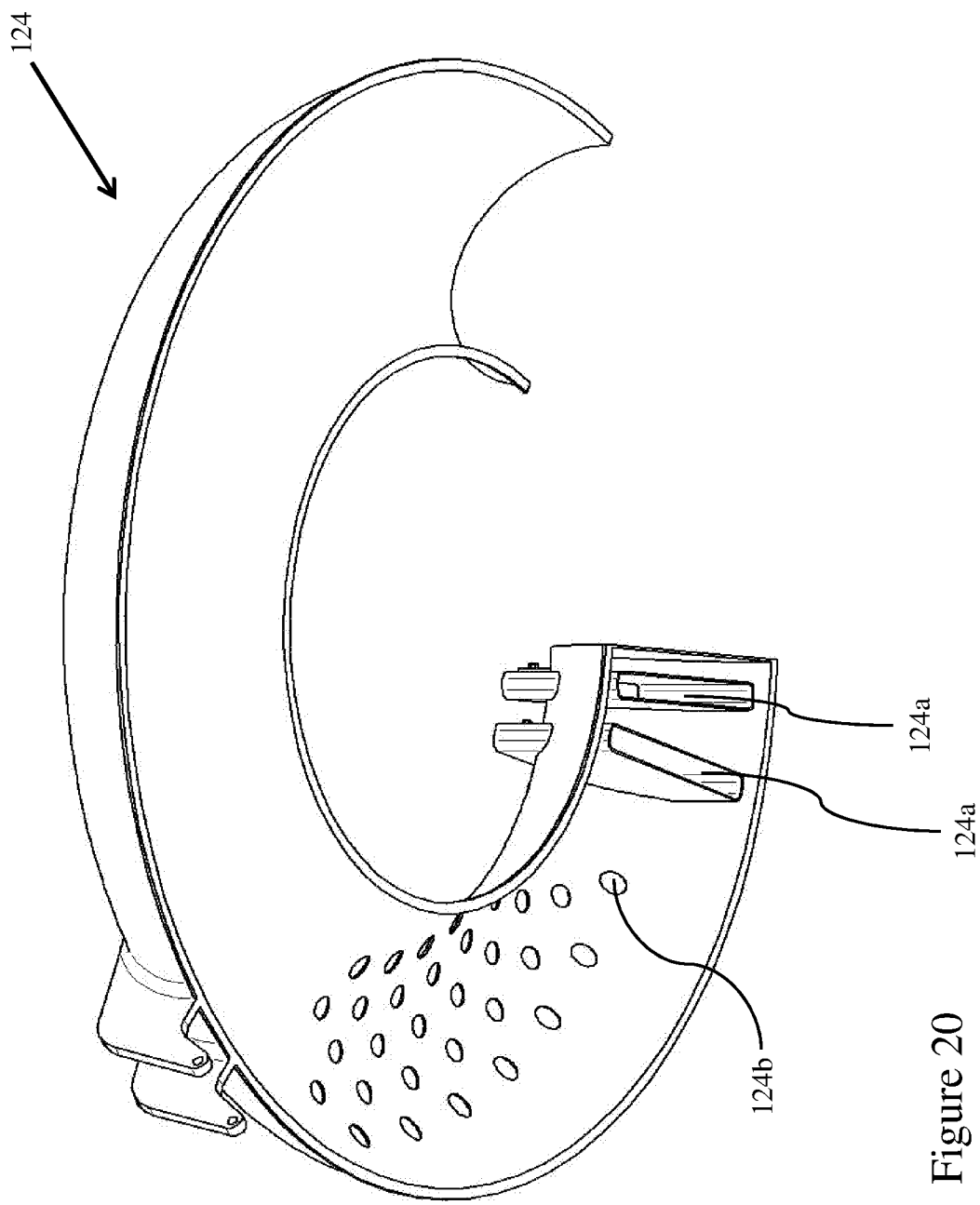
FIG. 20 is a perspective view of a cover of a RVTA in accordance with one embodiment of the invention.

One or more venturi plenums 124a may form part of the cover. As shown in FIG. 20, the venturi plenums 124a generally correspond to the width of the screen and form a passageway between the outside of the cover and the screen. The venturi plenums may be vertically adjustable such that the distance between the bottom end of the plenum and screen can be adjusted. In operation, if higher or lower airflow is required at a particular location on the screen, the height of the plenum can be adjusted to cause an increase or decrease in airflow that can effect fluid transport through the screen. Other figures show multiple venturi plenums.

The cover may also be provided with a series of air orifices 124b that ensure sufficient air flow to the screen when the cover is closed.

Operation and Auxiliary Equipment

Figure 22:
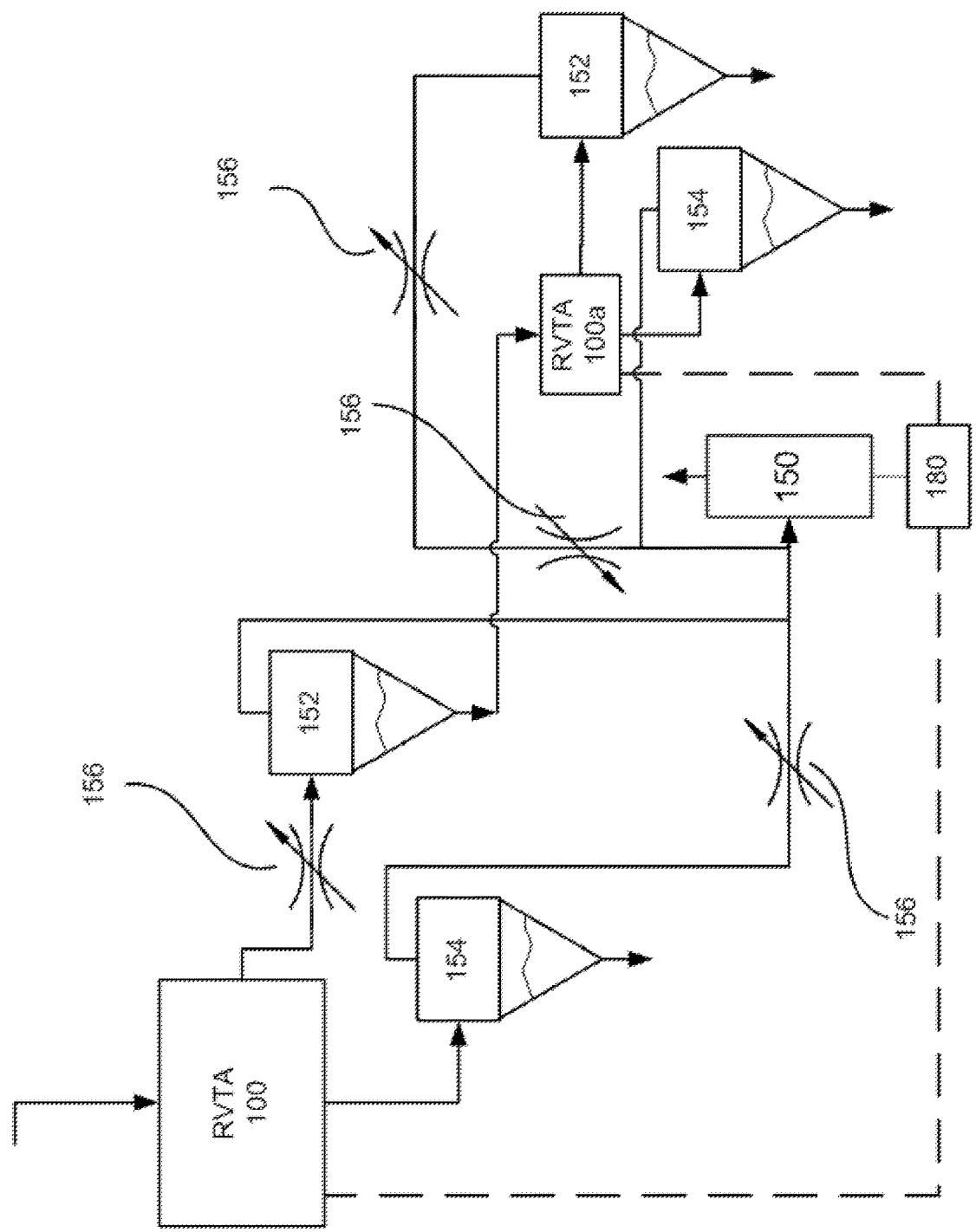
FIG. 22 is a schematic diagram of a deployment of RVTA configured in accordance with one embodiment of the invention.

As shown in FIG. 22, auxiliary equipment required to operate the system includes appropriate gas/liquid separators 154, gas/solid separators 152, vacuum pumps 150 and electronic control 180 systems configure to one or more RVTAs.

The gas/liquid and gas/solids separators are configured to the fluid and waste manifolds respectively to prevent contamination of the vacuum pumps with fluids and solids.

In a typical drilling operation, the system is operated with sufficient vacuum pressures and air flow rates to effect high fluid/solid separations (typically greater than 90% and more preferably greater than 95% fluid recovery from the cuttings) with a single unit for a particular drilling fluid flow rate. Residence time of particles on the screen can be adjusted by screen rotation rate and will be balanced against air flow rates within the fluid removal zone, the processing volume and slurry characteristics. Localized air pressure flow through the screen may be fine tuned by the venturi plenums.

For example, and in the case of well drilling, at a higher rate of penetration (ROP) where drill cuttings particle sizes may be bigger and the mass of particles relative to a volume of drilling fluid is higher, for a given air flow rate, the speed of rotation may be increased. That is, for a situation where drilling particles are larger, the surface area of cuttings covered with drilling fluid may be relatively lower compared to a situation with finer drill cuttings. Moreover, the surface tension of drilling fluid adhered to a drill cutting is generally lower with a larger radius particle size (will also depend of the shape and roughness), thus the vacuum required for separation is less and hence, the residence time can be decreased by a faster screen rotation.

Conversely, if ROP is slower and particle sizes are smaller, for a given air flow rate, the speed of rotation may be slowed to ensure more effective separation of fluid from the smaller particles whose relative surface is substantially higher within a volume of fluid.

It should be noted, however, that other operational parameters may be considered including the angle of tilt, the introduction of air currents above or below the screen to induce tumbling, vacuum pressures and other parameters that may be adjusted singly or in combination to effect a desired cleaning level.

As also shown in FIG. 22, two or more RVTAs 100 may be configured in series to effect a higher degree of separation. In this case, a larger RVTA 100 may provide primary solid/liquid separation whereas a smaller RVTA unit 100a may be used for additional cleaning of the solids recovered from the larger RVTA. In this case, the primary separator may be run with a very fine mesh to ensure that high quality fluid is recovered. In this case, the solids recovered from the waste manifold may be wetter when introduced into a secondary separator. The second separator would ensure that the solids recovered off the secondary separator are dry.

The electronic control system (ECS) 180 will generally enable the speed of rotation and vacuum pressures within the one or more vacuum systems to be set. In the embodiment where the fluid manifold may have zones, the ECS may also be used to set the vacuum pressures in each zone through the manifold valves as described above. It should be noted that while FIG. 22 shows a single vacuum system, separate vacuum systems may be utilized with appropriate piping and valve system to enable the control of vacuum in each location of the system. The ECS may also control the angle of tilt.

The system may also be connected with the RVT system as described above. In addition, multiple RVTs and/or RVTAs systems may also be configured in parallel and/or in series.

Other Design Considerations
Screen Configured to Inside of Drum

Figure 23:
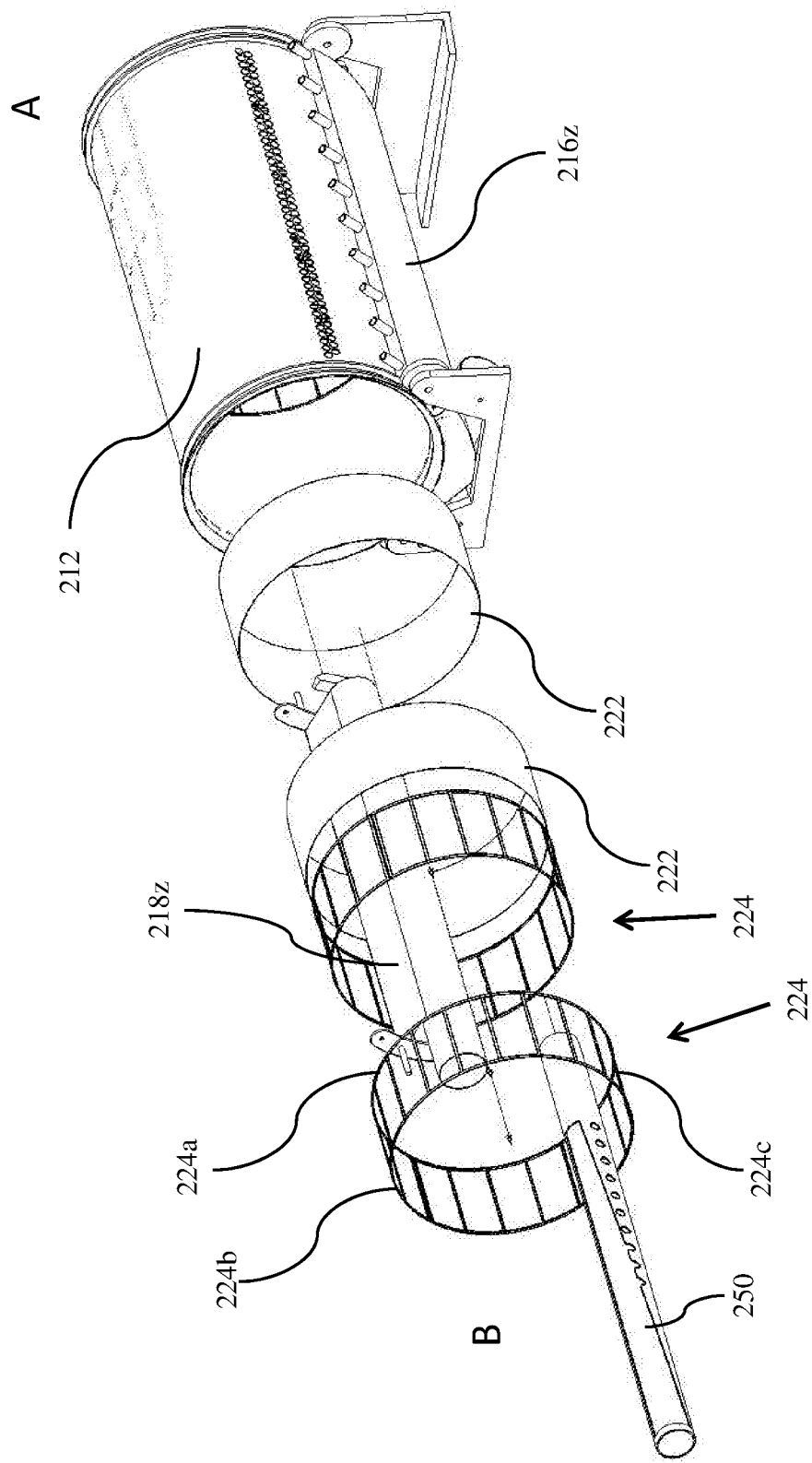
FIG. 23 is an exploded diagram showing the assembly of a screen on the interior of a drum in accordance with one embodiment.

As shown in FIG. 23, a screen 222 may be configured to an inside surface of a drum 212 via a support frame 224 that is used to bias the screen to the interior of a drum. Generally, a support frame will include two circular support hoops 224a, 224b and series of hoop supports 224c that interconnect the support hoops. In one embodiment, the support hoops 224a, 224b are manufactured from a spring steel as an open hoop and having a diameter slightly larger than the inner diameter of the drum 212 such that when configured to the interior surface of the drum, the support frame biases the screen against the drum. In other embodiments, the support frame may be rigidly connected to the drum through appropriate fastening devices including bolts and/or clips. The support hoops 224a, 224b will generally be fabricated with a low vertical profile so as to not interfere with the passage of drilling fluid and cuttings over the screen towards the downstream end B of the drum. However, the hoop supports 224c may have a higher vertical profile in order to assist in the holding cuttings against the screen during rotation of the drum. To facilitate ease of installation and/or replacement multiple screens 222 and support frames 224 may be utilized.

Venturi and Manifold Cleaning (Anti-Caking)

Figure 25:
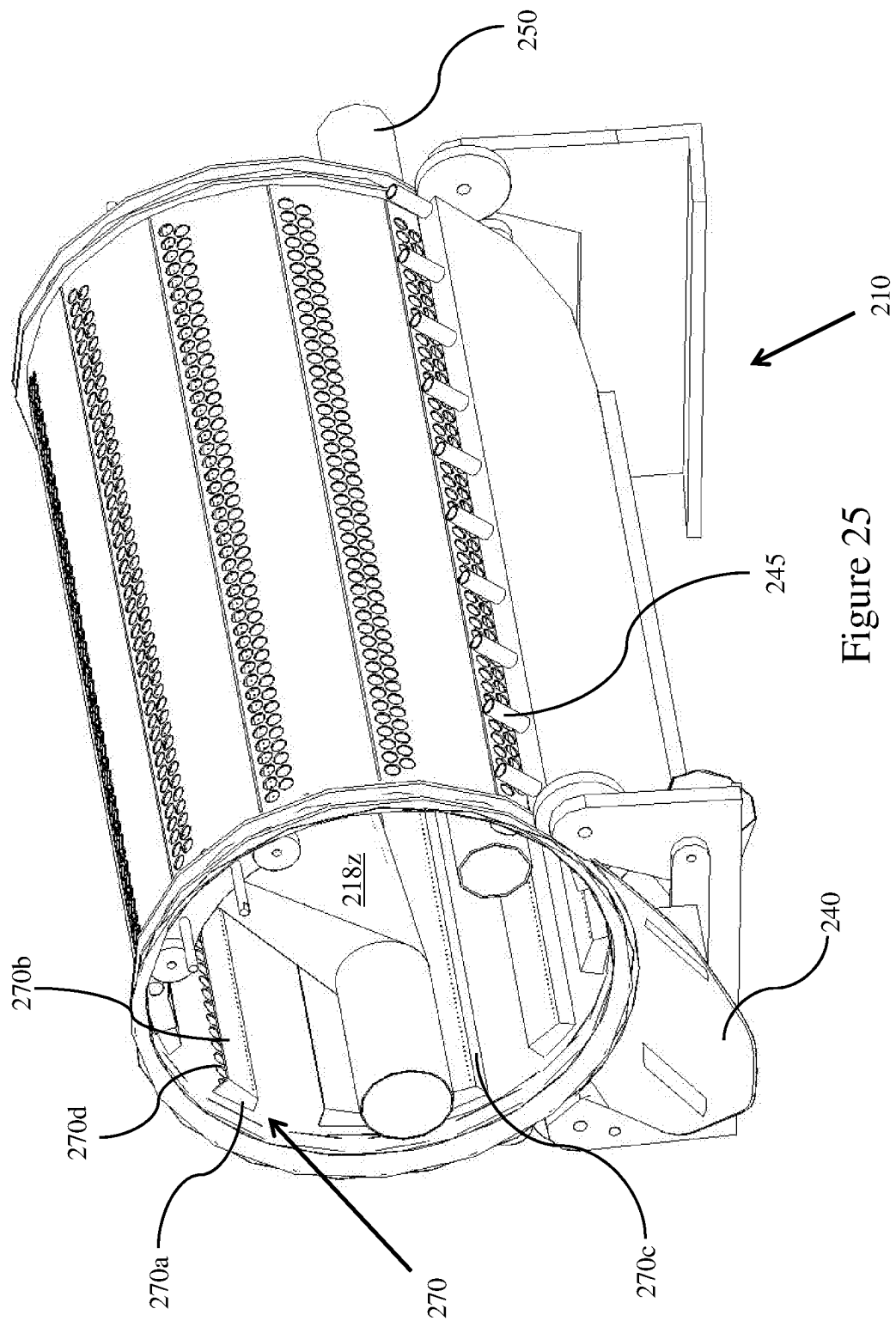
FIG. 25 is a perspective view of a drill cuttings separator having drum scoops in accordance with an alternate embodiment of the invention.

In another embodiment, the fluid and waste manifolds are configured with one or more air nozzles 245 (FIG. 25) that may be configured to a compressed air system 16a (FIG. 14) to assist in enhancing air flow through the manifolds. Generally, if compressed air is incorporated, the purpose of the compressed air is primarily to prevent the build-up of fines on the lower surfaces of the manifold in the event that vacuum air flow through the system is not sufficient to prevent the build up of fines. As such, the compressed air system may only be operated intermittently. The cleaning system may also utilize high pressure fluids that may be circulated through the system. Recovered drilling fluid may be used as a cleaning fluid in some circumstances.

That is, during operation, the system may be periodically flushed with compressed air or fluids to prevent the build up of any fines on the manifold surfaces. In particular, as the flow of drill cuttings to solid separation equipment is generally cyclical during drilling as mud pumps are turned on and off to allow new sections of pipe to be added to a drill string, the system may periodically apply compressed air or fluids to assist in flushing the manifold.

Figure 24:
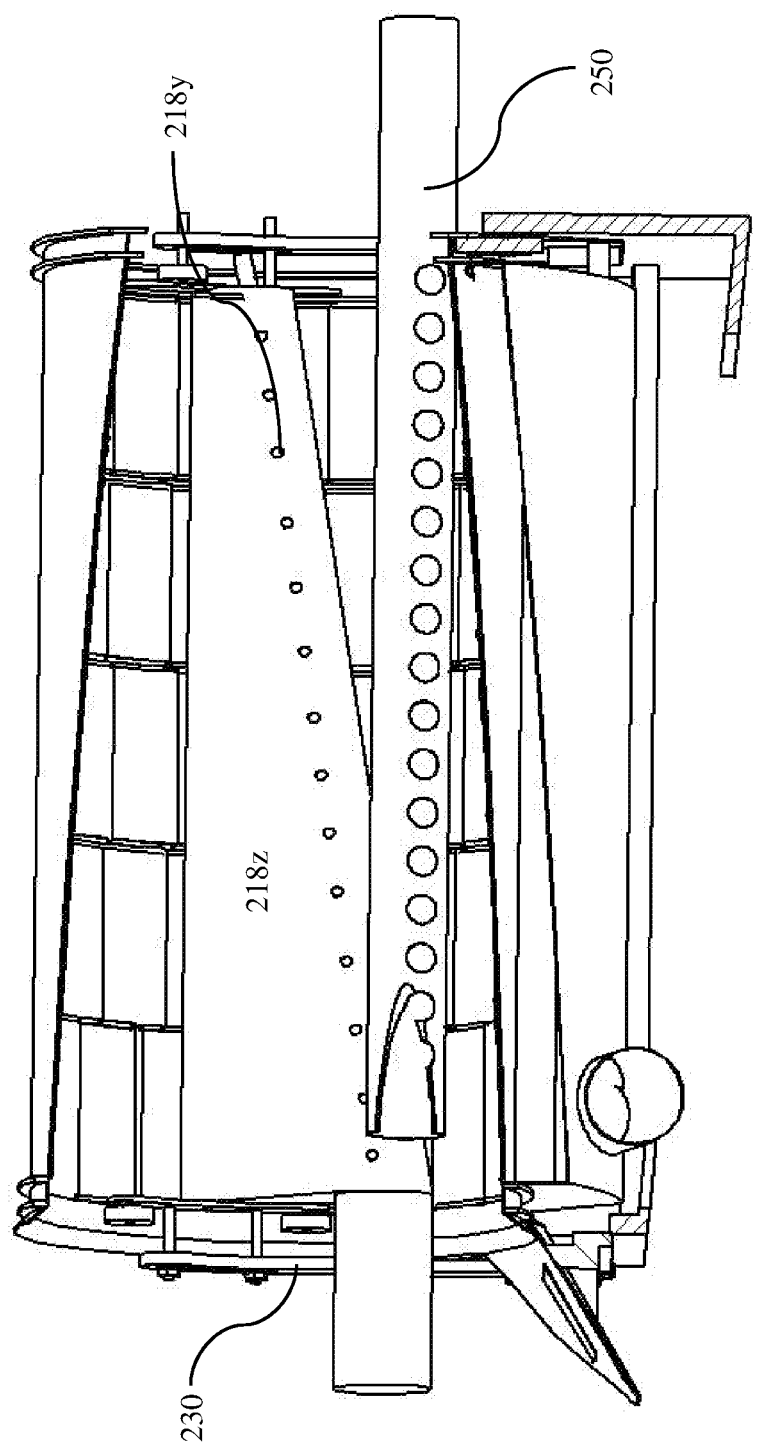
FIG. 24 is a cutaway drawing showing an interior of an RVT with a tapered waste manifold in accordance with one embodiment of the invention.

FIG. 24 shows an embodiment where the waste manifold 218z is tapered so as to facilitate the downward flow/movement of recovered drill cuttings. A plurality of bleed ports 218y is also shown which may be used as a means of introducing additional air flow into the manifold. A delivery chute 250 without an open upper surface is also shown. An overflow chute 240 (FIG. 25) may also be provided.

Scoops and Air path design

FIGS. 25-30 describe another embodiment of an RVT 210. In this embodiment, the inner surface of the drum is provided with a series of scoops 270 that collect and carry drill cuttings to the waste manifold while applying vacuum to the drill cuttings within each scoop 270. In a preferred embodiment, the scoops extend longitudinally along the length of the drum; however, smaller scoops may be utilized and may be distributed differently about the drum. As shown, the scoops will typically include two end walls 270a, a back wall 270b and a base wall 270c and defining an open face 270d.

In this embodiment, as a slurry of drill cuttings/drill fluid flow onto the rotating drum, the rotation of the drum will cause the slurry to be contained within the scoops, thereby lifting a volume of drill cuttings/drill fluid. As above, a fluid manifold applies an outward radial pressure to the inner surface of each scoop such that drilling fluid is drawn through the screen. In this case, the waste manifold 218z is configured to the drum at a location past vertical (eg. about 30 degrees to vertical) due to the presence of the back wall 270b and in order to enable the cuttings to fall by gravity and vacuum into the waste manifold.

Figure 26:
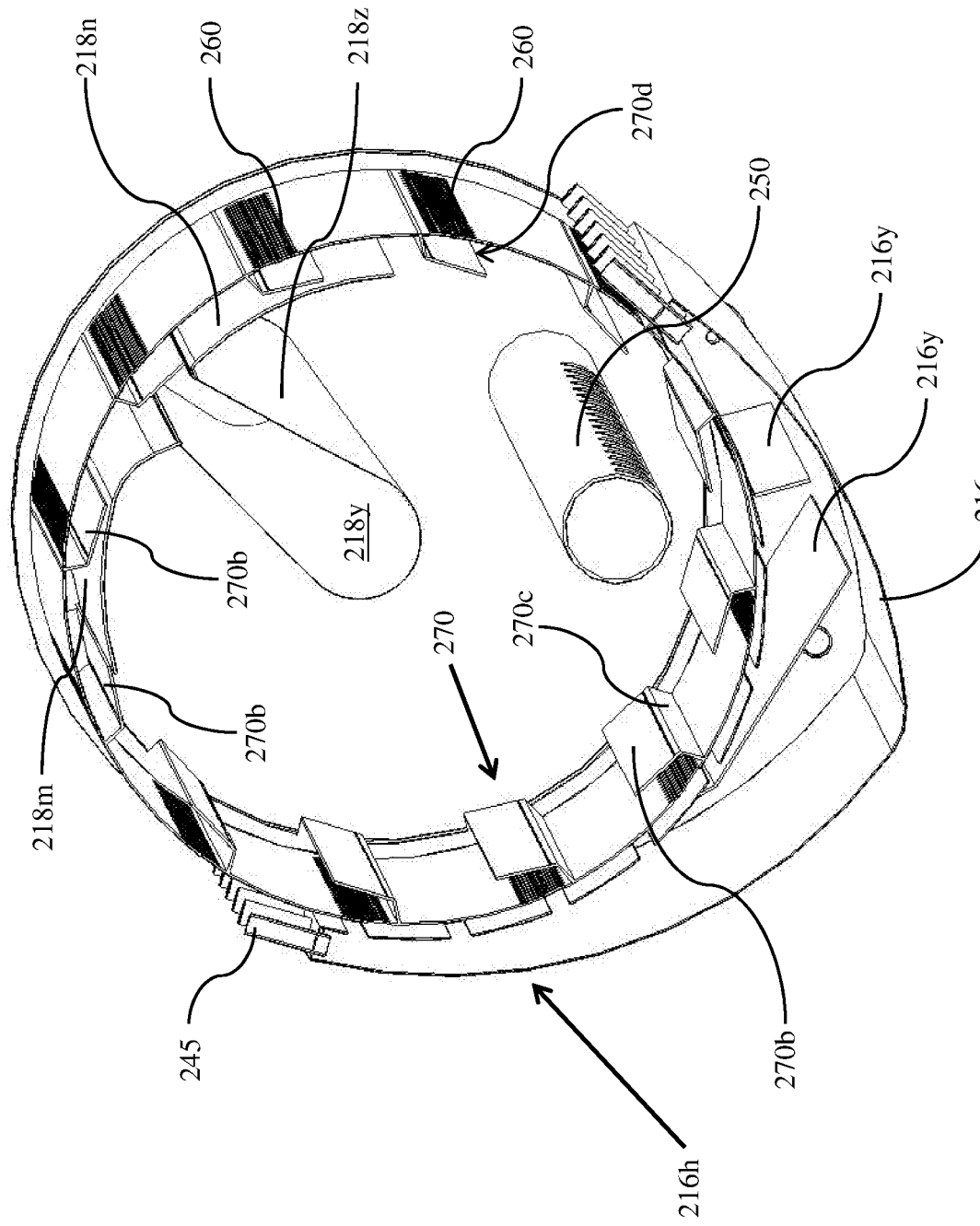
FIG. 26 is an isometric and cross-sectional view of the embodiment shown in FIG. 25 showing details of the fluid manifold, scoops and waste manifold.

As best shown in FIG. 26, which is a cross-sectional segment of this embodiment, the waste manifold 218z will preferably include sealing arms 218m,n on the upstream and downstream sides of the waste manifold to ensure that the internal volume 218y is generally sealed as successive scoops pass by the waste manifold. That is, as shown at a given moment, the sealing arms 218m,n are each in contact (or very close to being in contact) with two (or more) back walls 270b of two or more scoops, such that the waste manifold 218z is not directly open to the atmosphere. Appropriate wear surfaces may be provided.

As described above, as a scoop enters the waste manifold and the preceding scoop opens the path to vacuum, a reversal in vacuum pressure occurs such that cuttings contained in the scoop fall into the waste manifold and air flow is reversed through the screen to clean it. After the cuttings have fallen out of the scoop, the scoop continues its rotation through the sealing arm 218n which similarly provide a seal at the downstream side.

Also, as shown in FIG. 26, the fluid manifold 216z may include one or more baffles within its volume to assist in the distribution of vacuum in the fluid manifold. That is, it may be desirable for a higher vacuum pressure to be applied to the downstream B side 216h of the fluid manifold in which case the baffles 216y may restrict air flow behind the baffles thereby reducing vacuum pressure at those locations.

As shown in FIG. 26, in one embodiment, the drum is not a continuous screen but instead includes openings 260 to support a plurality of smaller generally rectangular screens positioned within a scoop (not shown). The screens may be connected to the drum and/or openings 260 by any suitable means as known to those skilled in the art.

Figure 26A:
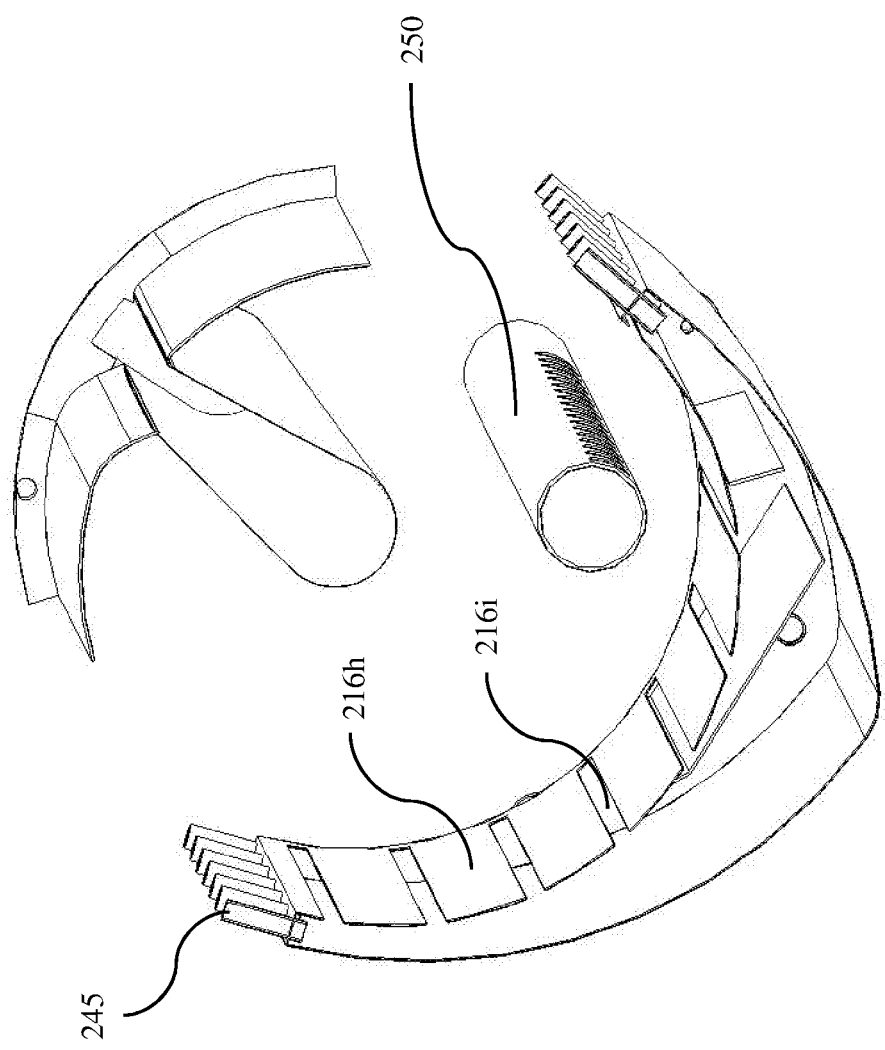
FIG. 26A is an isometric and cross-sectional view of the embodiment shown in FIG. 25 showing details of the fluid manifold, scoops and waste manifold with the drum removed.
Figure 27:
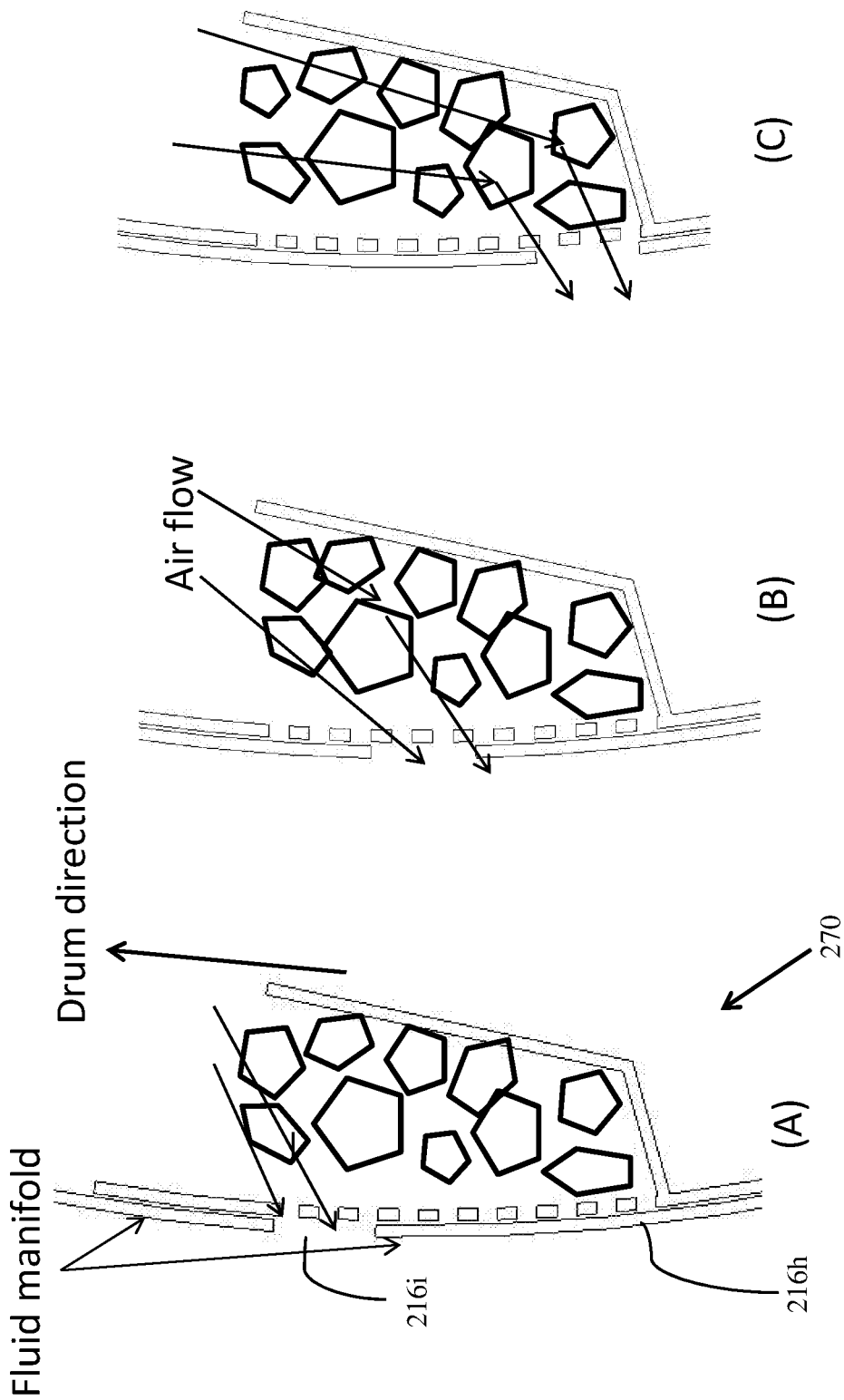
FIG. 27 is a schematic diagram showing details of the air flow through the scoops in accordance with one embodiment of the invention.

Similarly, as shown in FIG. 26A, the fluid manifold may also be provided with an upper drum contacting surface 216h having a plurality of openings 216i. This enables a higher vacuum pressure to be specifically applied within a scoop and can induce high velocity air flow through the scoop as the scoop moves past an opening 216i. As shown in FIG. 27, the air flow through a scoop will initiate as the upper portion of a scoop passes an opening (see FIG. 27(A)). The air flow will then successively pass through the middle and lower sections of the scoop (see FIGS. 27(B) and (C)). If each of the scoops is aligned with respective fluid manifold openings, the fluid manifold will be effectively closed off to the screens at regular positions in the rotation cycle. Thus, initially, as a scoop begins to pass the fluid manifold opening 216i, the initial air flow through the scoop will be high as only a small slit of screen will be exposed to vacuum. As a greater amount of screen is exposed, the air velocity will decrease and then increase again as the scoop passes the opening 216i. This will have the effect of applying a substantially higher pressure to the surfaces of the drill cuttings in a pseudo-pulsed manner.

Figure 28:
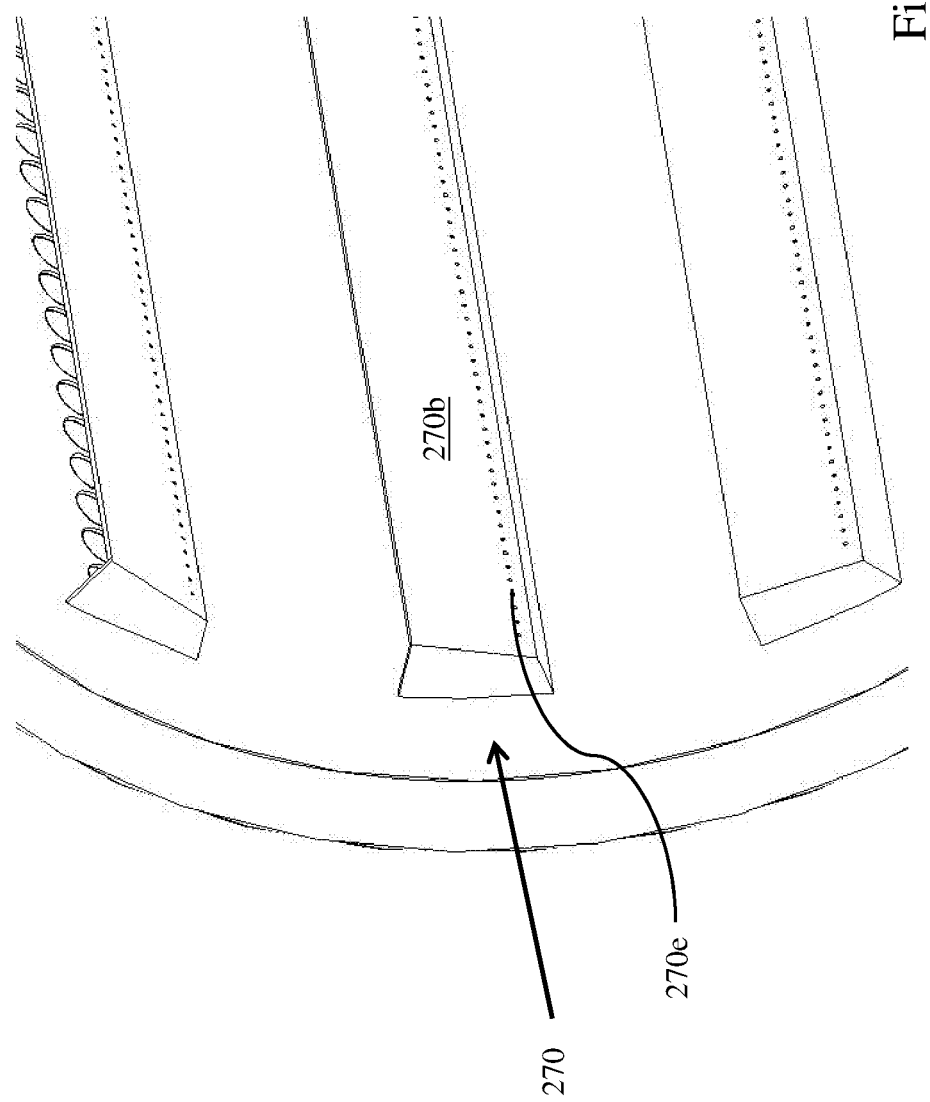
FIG. 28 is a perspective view showing details of scoops having bleed holes in accordance with one embodiment of the invention.
Figure 29:
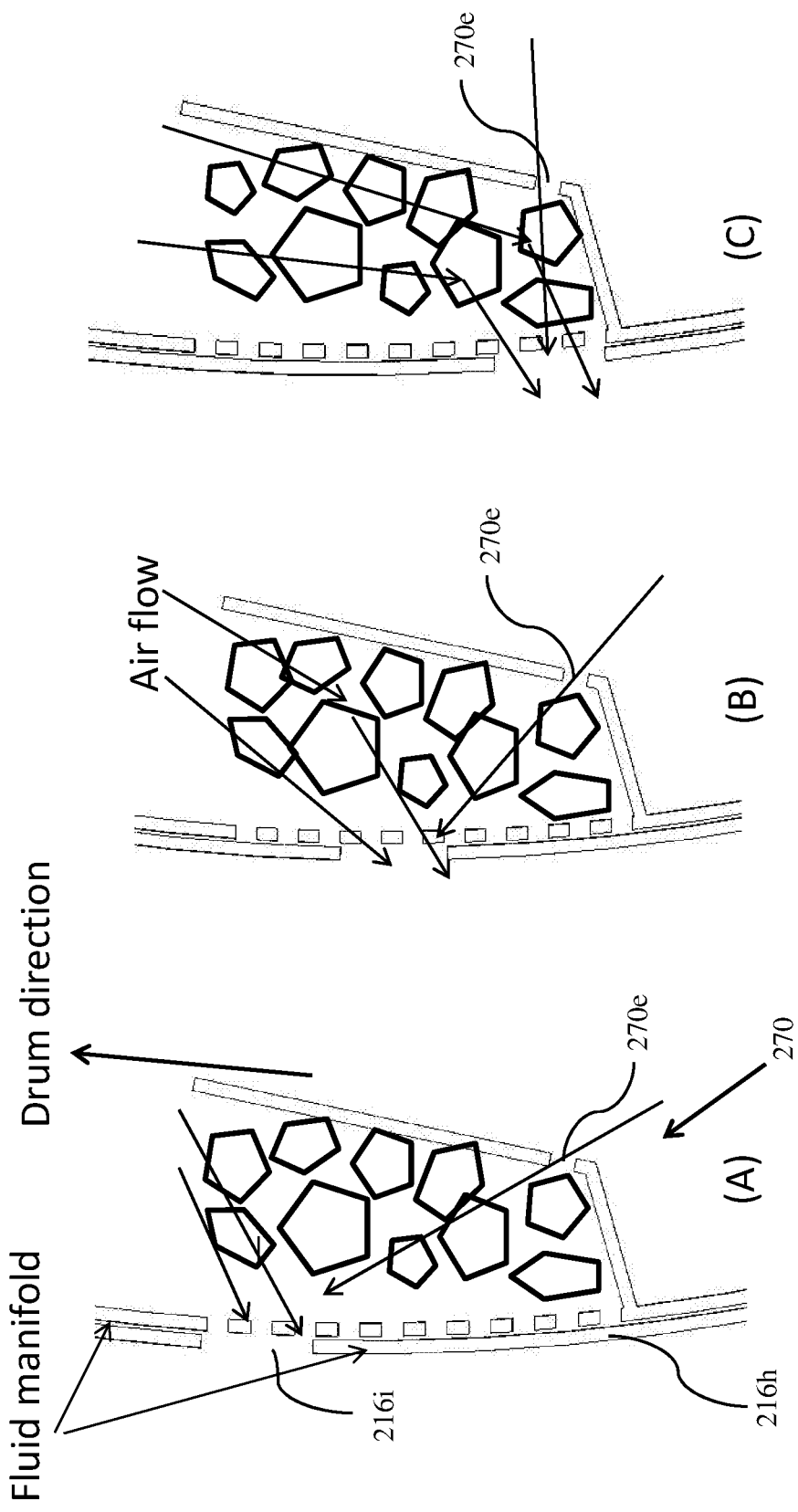
FIG. 29 is a schematic diagram showing details of the air flow through scoops having bleed holes in accordance with one embodiment of the invention.
Figure 30:
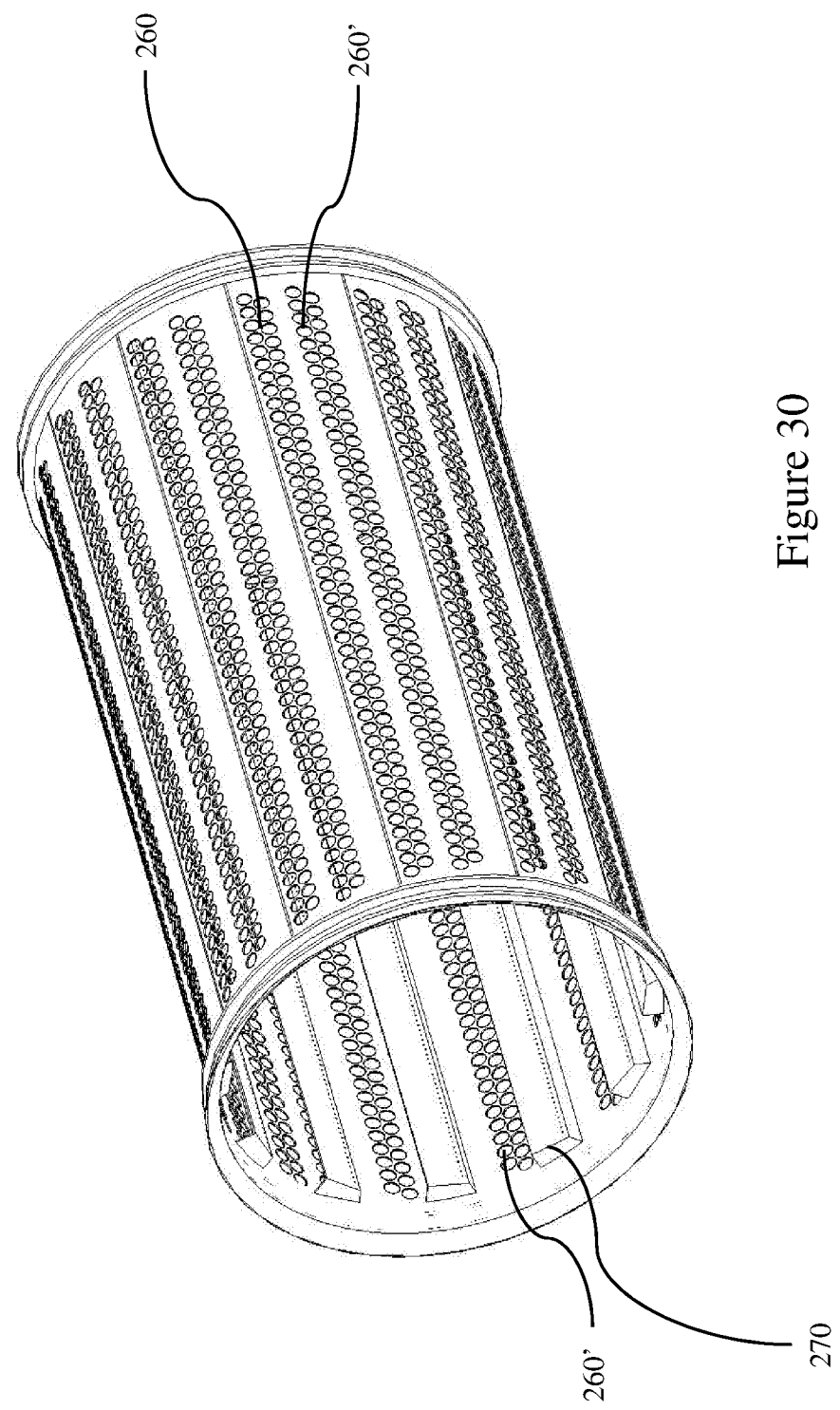
FIG. 30 is a perspective diagram of a drum having scoops in accordance with one embodiment of the invention.

In another embodiment as shown in FIGS. 28 and 29, the scoops may be provided with a series of bleed holes 270e along the back wall 270b of scoop 270 to provide an alternate path to air flow through the scoop. In this case, the bleed holes 270e enable multi-directional flow of air through the scoops as the scoops move past an opening 216i as shown in FIG. 29.

In another embodiment, the drum 212 is provided with additional openings 260' (FIG. 30) outside a scoop. This particular format may promote fluid removal particularly on the lower surfaces of the drum.

Drilling Rig Operation

Table 1 shows representative cutting volumes (CV) and drilling fluid (DF) flow rates (low, medium and high) for varying rates of penetration (ROP) (10, 20 and 30 m/hr) for different well diameters (6, 9 and 12 inches respectively) when drilling. The CV value indicates the volume of cuttings that may be introduced into and thus processed within the drum per minute and DF flow rate indicates the volume of DF passing into the fluid manifold per minute. As both CV and drilling fluid flow rates increase, the size (length and diameter) of the RVT may need to be increased or require additional systems to be run in parallel. The following assumes a drum having an internal diameter of 1 m and a length of 2 m and that the average volume % of cuttings in returned drilling fluid is approximately 0.15-0.8 vol %.

TABLE 1

Cuttings Volume and Flow Rates for Varying ROP

| | | | |
|---|---|---|---|
| Well Size (inches) | 6 in (0.1524 m) | 9 in (0.2286 m) | 12 in (0.305 m) |
| Well Area (in$^2$) | 28.3 in$^2$ (0.018 m$^2$) | 63.6 in$^2$ (0.041 m$^2$) | 113 in$^2$ (0.073 m$^2$) |
| Low DF Flow Rate | 2 m$^3$/min | 2 m$^3$/min | 2 m$^3$/min |
| Low ROP (10 m/hr) | CV = 0.18 m$^3$/hr = 3 l/min | CV = 0.41 m$^3$/hr = 6.8 l/min | CV = 0.73 m$^3$/hr = 12 l/min |
| Mid DF Flow Rate | 3 m$^3$/min | 3 m$^3$/min | 3 m$^3$/min |
| Medium ROP (20 m/hr) | CV = 0.36 m$^3$/hr = 6 l/min | CV = 0.82 m$^3$/hr = 13.6 l/min | CV = 1.46 m$^3$/hr = 24 l/min |
| High DF Flow Rate | 5 m$^3$/min | 5 m$^3$/min | 5 m$^3$/min |
| High ROP (30 m/hr) | CV = 0.55 m$^3$/hr = 9 l/min | CV = 1.23 m$^3$/hr = 20.5 l/min | CV = 2.19 m$^3$/hr = 36 l/min |

CV = cuttings volume

For example, in a 1 m diameter drum having a 2 m length, the total surface area of screen is approximately 6.28 m$^2$. If the fluid manifold extends from the 4 o'clock to 9 o'clock positions, 41% or 2.6 m$^2$ of screen will have vacuum pressure being applied to it at a given moment. If the drum is rotating at 6 rpm, the screen is moving at 19 m/min, thus exposing the slurry to 38 m$^2$ of clean screen per minute.

Liquid studies were undertaken to determine the relative rates of flow of liquid through different size screens with different applied vacuum and with varying hydrostatic pressures on the top-side of a screen. The studies were completed in a test cell having a known area and the results extrapolated to the RVT design.

Test 1—Water Flow Study

A test cell was built that included a water reservoir and a valved outlet at the bottom of the reservoir supporting a small section of screen. The underside of the outlet was configured to a lower reservoir and to a vacuum source. The valve could be opened and closed at the initiation and termination of each experiment.

As the area of the screen was relatively small compared to the volume of water, a relatively consistent hydrostatic pressure on the screen was maintained throughout each experiment.

Individual experiments included adjusting the height of water in the upper reservoir, the screen size (mesh) and the vacuum pressure to measure the flow rate of liquid through the screen for a fixed hydrostatic pressure, screen size and vacuum pressure.

Tables 2 and 3 show a comparison of liquid flow rates for a 200 and 325 mesh screen, respectively. For the purposes of calculation, it was assumed that a liquid contacting a rotating screen from a central inlet will disperse across the screen such that the liquid height will be greatest at the middle relative to the inlet and lower as the distance from the inlet becomes greater. In other words, a liquid contacting a screen will generally disperse across the screen such that the hydrostatic pressure of the liquid against the screen will be greatest where the height of the liquid is greatest and lower where the height of the liquid is lower. The dispersion profile of the liquid was assumed to be 50 mm in a central zone (A), 25 mm in a middle zone (B) and 2 mm in a peripheral zone (C). Further, it was assumed that the total area of each of zones A, B and C were 0.04, 0.12 and 0.18 m² respectively.

TABLE 2

Water Flow through 200 Mesh Screen having Zones A, B, and C at different Applied Vacuum Pressures

| Zone | Screen Mesh 200 Vacuum = ambient (no vacuum applied under screen) | Screen Mesh 200 Vacuum 2 = 250 Pa applied under screen | Screen Mesh 200 Vacuum 3 = 500 Pa applied under screen |
|---|---|---|---|
| A = 0.04 m² | 11 * | 13.5* | 16 * |
| B = 0.12 m² | 23.5 * | 33.5 * | 41 * |
| C = 0.18 m² | 10 * | 37 * | 51 * |
| Total (liters/second) (total flow through Zones A, B, C) | 44.5 | 84 | 108 |
| Total (m³/minute) (total flow through Zones A, B, C) | 2.6 | 5.0 | 6.5 |

\* total liters/s flow of water through Zone

TABLE 3

Water Flow through 325 Mesh Screen having Zones A, B, and C at different Applied Vacuum Pressures

| Zone | Screen Mesh 325 Vacuum = ambient (no vacuum applied under screen) | Screen Mesh 325 Vacuum 2 = 250 Pa applied under screen | Screen Mesh 325 Vacuum 3 = 500 Pa applied under screen |
|---|---|---|---|
| A = 0.04 m² | 9 * | 30.5 * | 13 * |
| B = 0.12 m² | 19 * | 27.5 * | 33.5 * |
| C = 0.18 m² | 8 * | 30.5 * | 42 * |
| Total (liters/second) (total flow through Zones A, B, C) | 36 | 69 | 88.5 |
| Total (m³/minute) (total flow through Zones A, B, C) | 2.2 | 4.1 | 5.3 |

\* total liters/s flow of water through Zone

Tables 2 and 3 show that as hydrostatic pressure within the test cell increases, the flow rate of liquid through the screen increases. The data also show that the flow rate is generally proportional to the square root of the height. Similarly, as vacuum is increased, the flow rate for a given hydrostatic pressure increases. It was noted that as screen pore size decreased, higher vacuum was required to effect fluid transport across the screen.

These results were based on the assumption that liquid transport across the screen occurs predominantly towards the upstream end A of the drum and the hydrostatic pressure drops towards the downstream end B of the drum. Importantly, these results show that a relatively small area of the drum (eg. 0.34 m²; zones A, B, C) is capable of processing approximately 4 m³/min of liquid (water) with only 250 Pa of vacuum. This is substantially smaller than the total area of screen available that is under vacuum at a given moment as described above. Accordingly, the subject system removes a relatively high percentage of fluid towards the upstream section of the RVT whereas the downstream section removes a relatively smaller volume of fluid but results in a substantially lower fluid retained on cuttings wt % as compared to conventional shakers. In other words, the upstream section results in "bulk" fluid removal whereas the downstream section provides an effective "finishing" or "polishing" of the solid particles resulting in solid particles with a relatively high degree of dryness. In this sense, polishing refers to fluid removal as opposed to solid particle smoothing.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A solids/liquid separation system for separating solids and liquids within a slurry from one another, the separation system comprising:
   a screen connected to a drum having a plurality of openings, the screen supporting the slurry on an upper surface of the screen when the screen rotates about an axis of rotation, the screen and the drum enabling liquids to pass through the screen and the openings;
   a fluid manifold connected to the drum, the fluid manifold providing a vacuum pressure via a vacuum system to be applied in a first direction and to a first portion of the screen and the drum while the screen is rotating to convey fluids through the screen and the openings;
   a cleaning manifold connected to the drum, the cleaning manifold providing an air flow pressure to be applied to a second portion of the screen in a second direction generally opposite to the first direction while the screen is rotating;
   a waste manifold connected to the drum and the vacuum system to convey solids away from the screen;
   wherein the vacuum pressure in the first direction draws fluids through the screen and the openings into the fluid manifold, wherein the air flow pressure in the second direction induces air flow through the screen in the second direction to clean the screen while the screen is rotating, and wherein vacuum pressure through the waste manifold removes solids from the screen.

2. The separation system as in claim 1 wherein the axis of rotation is substantially horizontal and corresponds to a central axis of the drum, and wherein the slurry is supported within the drum.

3. The separation system as in claim 2 wherein the fluid manifold is connected to an outer surface of the drum, and wherein the fluid manifold is adapted to apply an outward vacuum pressure to the first portion of the screen while the drum is rotating about the substantially horizontal axis of rotation.

4. The separation system as in claim 2 wherein:
   a) the waste manifold conveys solids recovered from an inner surface of the drum away from the drum; and/or
   b) the cleaning manifold positioned at an outer surface of the drum applies the air flow pressure towards the inside of the drum through the screen.

5. The separation system as in claim 2 wherein the screen is connectable to an outside surface of the drum, wherein the screen is a rectangular screen and has a size for covering engagement with the outside surface of the drum, and wherein the screen has first and second connecting edges adapted to engage the screen to the drum.

6. The separation system as in claim 2 further comprising a downstream drum cover connected to a downstream end of the drum and an upstream drum cover connected to an upstream end of the drum, wherein the downstream drum cover and the upstream drum cover include sealing systems to seal each of the downstream drum cover and the upstream drum cover with respect to the drum.

7. The separation system as in claim 6 further comprising an outer cover surrounding a portion of an outer surface of the drum, wherein the cleaning manifold, fluid manifold, and the outer cover fully and collectively surround the screen and substantively seal the drum from the atmosphere.

8. The separation system as in claim 6 wherein the downstream drum cover includes a solids outlet located at a bottom location of the downstream drum cover.

9. The separation system as in claim 2 wherein the drum includes:
- a plurality of scoops distributed about an inner surface of the drum, the scoops being generally parallel to the central axis of the drum for capturing and lifting solids and fluids while the drum is rotating, the drum also including a perforated section within each scoop supporting a scoop screen;

wherein the waste manifold is connected to the inner surface of the drum and positioned to capture solids falling from each scoop when the respective scoop is in an inverted position within the drum;

and wherein the fluid manifold includes a plurality of manifold slots, and the vacuum pressure through the fluid manifold is applied to each scoop screen as each scope rotates past the manifold slots.

10. The separation system as in claim 2 wherein the fluid manifold extends from a 4 to 9 o'clock position on an inner surface of the drum.

11. The separation system as in claim 2 wherein the cleaning manifold extends from a 9-10 o'clock position on an outer surface of the drum.

12. The separation system as in claim 2 wherein the waste manifold extends from a 9-10 o'clock position on an inner surface of the drum.

13. The separation system as in claim 1 further comprising a gas/liquid separator connected between the fluid manifold and the vacuum system.

14. The separation system as in claim 1 further comprising a gas/solids separator connected between the waste manifold and the vacuum system.

* * * * *